US011218933B2

(12) United States Patent
Edge

(10) Patent No.: US 11,218,933 B2
(45) Date of Patent: Jan. 4, 2022

(54) SYSTEMS AND METHODS FOR DEFERRED 5G LOCATION OF A MOBILE DEVICE USING A COMBINED AMF AND LMF BASED LOCATION SOLUTION

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 48 days.

(21) Appl. No.: 16/569,532

(22) Filed: Sep. 12, 2019

(65) Prior Publication Data

US 2020/0092776 A1  Mar. 19, 2020

Related U.S. Application Data

(60) Provisional application No. 62/844,047, filed on May 6, 2019, provisional application No. 62/807,222, filed
(Continued)

(51) Int. Cl.
*H04W 36/08* (2009.01)
*H04W 36/32* (2009.01)
(Continued)

(52) U.S. Cl.
CPC ........... *H04W 36/08* (2013.01); *H04W 4/029* (2018.02); *H04W 8/08* (2013.01); *H04W 36/32* (2013.01); *H04W 76/25* (2018.02)

(58) Field of Classification Search
CPC ..... H04W 36/08; H04W 36/32; H04W 4/029; H04W 76/25; H04W 8/08; H04W 60/04; H04W 64/00; H04W 8/12
See application file for complete search history.

(56) References Cited

U.S. PATENT DOCUMENTS 9,998,856 B2  6/2018 Edge
10,506,543 B1  12/2019 Edge et al.
(Continued)

FOREIGN PATENT DOCUMENTS

WO  2017196510 A1  11/2017
WO  2018085017 A1  5/2018
WO  2018129337 A1  7/2018

OTHER PUBLICATIONS

Qualcomm Incorporated: "Location Reporting Using Control Plane CIOT EPS Optimisation", 3GPP Draft, 23271 CR0424R2 CIOT EXT (REL-14), S2-170513 (CR 23.271—Location Reporting Using CP)—R6, 3rd Generation Partnership Project (3GPP), Mobile Competence Centre, 650, Route Des Lu, F-0, vol. RAN SA WG2, No. Spokane, WA, USA, Jan. 16, 2017-Jan. 20, 2017, Mar. 4, 2017 (Mar. 4, 2017), XP051234963, 15 pages, Retrieved from the Internet: URL: http://www.3gpp.org/ftp/Meetings_3GPP_SYNC/SA/Docs/. [retrieved on Mar. 4, 2017] pp. 7-14 figures 9.1.19.1-1.
(Continued)

*Primary Examiner* — Kevin C. Harper
*Assistant Examiner* — Derrick V Rose
(74) *Attorney, Agent, or Firm* — Thien T. Nguyen

(57) ABSTRACT

Methods and techniques are described for efficiently supporting periodic and triggered location services for a user equipment (UE) in a Fifth Generation wireless network. A serving core network (CN) node, such as an AMF, receives a request for periodic or triggered location for the UE from another CN entity, such as a GMLC, and transfers the request to a location server, such as an LMF, which initiates and establishes the periodic and triggered location session with the UE. The serving CN node then releases all resources for the location request. The UE monitors for periodic or trigger events and reports each event to a location server which forwards an event report, optionally containing a UE location, to an external client via a CN entity, such as
(Continued)

GMLC. The event reporting can be efficient because a serving CN node is not materially involved.

28 Claims, 21 Drawing Sheets

Related U.S. Application Data on Feb. 18, 2019, provisional application No. 62/742,896, filed on Oct. 8, 2018, provisional application No. 62/740,400, filed on Oct. 2, 2018, provisional application No. 62/736,437, filed on Sep. 25, 2018, provisional application No. 62/731,764, filed on Sep. 14, 2018.

(51) Int. Cl.
*H04W 4/029* (2018.01)
*H04W 8/08* (2009.01)
*H04W 76/25* (2018.01)

(56) References Cited

U.S. PATENT DOCUMENTS

| | | | |
|---|---|---|---|
| 2006/0099961 | A1 | 5/2006 | Duan |
| 2006/0293066 | A1 | 12/2006 | Edge et al. |
| 2008/0200182 | A1 | 8/2008 | Shim |
| 2012/0149325 | A1* | 6/2012 | Titus .................. H04M 11/04 455/404.2 |
| 2014/0192737 | A1 | 7/2014 | Belghoul et al. |
| 2018/0054795 | A1 | 2/2018 | Edge |
| 2019/0116483 | A1 | 4/2019 | Ryu et al. |
| 2019/0357129 | A1 | 11/2019 | Park et al. |
| 2020/0045666 | A1 | 2/2020 | Edge et al. |
| 2020/0053638 | A1 | 2/2020 | Edge et al. |
| 2020/0053686 | A1 | 2/2020 | Edge et al. |
| 2020/0236644 | A1 | 7/2020 | Gunnarsson et al. |
| 2020/0367022 | A1* | 11/2020 | Tenny .................. H04W 4/02 |

OTHER PUBLICATIONS

Qualcomm Incorporated: "Low Power Periodic and Triggered Location for the LMF Based Solution", 3GPP Draft, S2-183966, WAS 3623 (P-CR for TR 23.731 for Low Power Triggered Location for the LMF Based Solution), 3rd Generation Partnership Project (3GPP), Mobile Competence Centre, 650, Route Des Lu, SA, F-0, vol. RAN WG2, No. Sanya, China, Apr. 16, 2018-Apr. 20, 2018, Apr. 18, 2018 (Apr. 18, 2018), XP051432437, 12 pages, Retrieved from the Internet: URL: http://www.3gpp.org/ftp/Meetings%5F3GPP%5FSYNC/SA2/%5FUpdate02/. [retrieved on Apr. 18, 2018] figures 1,6.2.3.5-1 pp. 1-5.
"3rd Generation Partnership Project; Technical Specification Group Services and System Aspects; Functional stage 2 description of Location Services (LCS) (Release 15)", 3GPP Standard; Technical Specification; 3GPP TS 23.271, 3rd Generation Partnership Project (3GPP), Mobile Competence Centre ; 650, Route Des Lucioles ; F-06921 Sophia-Antipolis Cedex ; France, vol. SA WG2, No. V15.0.0, Jun. 19, 2018 (Jun. 19, 2018), pp. 1-184, XP051472853, [retrieved on Jun. 19, 2018], paragraph [9.1.12.1]-paragraph [9.1.12. 4].
Huawei et al., "Introduction of early data transmission", 3GPP Draft; 36413_CR1578R4_(REL-15)_R3-183469, 3rd Generation Partnership Project (3GPP), Mobile Competence Centre ; 650, Route Des Lucioles ; F-06921 Sophia-Antipolis Cedex ; France, vol. RAN WG3, No. Busan, Korea; May 21, 2018-May 25, 2018, Jun. 7, 2018 (Jun. 7, 2018), XP051511815, 16 Pages, Retrieved from the Internet: URL:http://www.3gpp.org/ftp/tsg%5Fran/TSG%5FRAN/TSGR%5F80/Docs/RP%2D181242%2Ezip [retrieved on Jun. 7, 2018], p. 1-p. 4.
3GPP TR 23.731: "3rd Generation Partnership Project; Technical Specification Group Services and System Aspects; Study on Enhancement to the 5GC Location Services (Release 16)", 3GPP Standard; Technical Report; 3GPP TR 23.731, 3rd Generation Partnership Project (3GPP), Mobile Competence Centre; 650, Route Des Lucioles; F-06921 Sophia-Antipolis Cedex, France, vol. SA WG2, No. V0.6.0, Sep. 3, 2018 (Sep. 3, 2018), pp. 1-145, XP051475178 [retrieved on Sep. 3, 2018] p. 27, line 12-p. 39, last line; figures 6.2.3.3-1 p. 53, line 12-p. 59, line 34.
International Search Report and Written Opinion—PCT/US2019/051034—ISA/EPO—dated Nov. 20, 2019.
Qualcomm Incorporated: "Enhancements to Solution 2," 3GPP Draft; S2-187097 WAS 7012 WAS 6649 (9-CR for TR 23.731 for Enhancements to Solution 2)—R1, 3rd Generation Partnership Project (3GPP), Mobile Competence Centre; 650, Route Des Lucioles; F-06921, vol. SA WG2, No. Vilnius, Lithuania; Jul. 2, 2018-Jul. 6, 2018, Jul. 6, 2018, XP051538540, 16 pages, Retrieved from the Internet: URL: http://www.3gpp.org/ftp/tsg%5Fsa/WG2%5FArch/TSGS2%5F128%5FVilnius/Docs/S2%2D187097%2Ezip.
Qualcomm Incorporated, et al., "Deferred 5GC-MT-LR Procedure for Solution 14", SA WG2 Meeting #129. 3GPP Draft; S2-1810463 P-CR for TR 23.731 for AMF and LMF Deferred Location Solution—R7. 3rd Generation Partnership Project (3GPP), Mobile Competence Centre; 650, Route Des Lucioles; F-06921 Sophia, vol. SA WG2, No. Dongguan, P. R. China; Oct. 15, 2018-Oct. 19, 2018, Oct. 9, 2018 (Oct. 9, 2018), 10 Pages, XP051539440, Retrieved from the Internet: URL: http://www.3gpp.org/ftp/tsg%5Fsa/WG2%5FArch/TSGS2%5F129%5FDongguan/Docs/S2%.
Qualcomm Incorporated: "Solution for Key Issue 13: UE Location Information Exposure," 3GPP Draft; S2-188064_ENA_UE Location Information Exposure, 3rd Generation Partnership Project (3GPP), Mobile Competence Centre; 650, Route Des Lucioles; F-06921 Sophia-Antipolis Cedex; France, vol. SA WG2, No. Sophia-Antipolis, France; Aug. 20, 2018-Aug. 24, 2018, Aug. 14, 2018, XP051537005, 4 Pages, Retrieved from the Internet: URL: http://www.3gpp.org/ftp/tsg%5Fsa/WG2%5FArch/TSGS2%5F128BIS%.
Qualcomm Incorporated: "Support for Key Issue on Coexistence with the Location Solution in Release 15", SA WG2 Meeting #128, 3GPP Draft; S2-186651 (P-CR for TR 23.731 for Support for Key Issue on Coexistence With Rel-15 Location Solution), 3rd Generation Partnership Project (3GPP), Mobile Competence Centre; 650, Route Des, vol. SA WG2, No. Vilnius, Lithuania; Jul. 2, 2018-Jul. 6, 2018, Jul. 1, 2018 (Jul. 1, 2018), 14 Pages, XP051469798, Retrieved from the Internet: URL: http://www.3gpp.org/ftp/Meetings%5F3GPP%5FSYNC/SA2/Docs.
Qualcomm Incorporated: "Unified Solution for Location Service Exposure," 3GPP Draft; S2-188083 (P-CR for TR 23.731 For Unified Solution for Location Service EXPOSURE)-R2, 3RD Generation Partnership Project (3GPP), Mobile Competence Centre; 650, Route Des Lucioles; F-06921, vol. SA WG2, No. Sophia-Antipolis, France; Aug. 20, 2018-Aug. 24, 2018, Aug. 14, 2018, XP051502926, 8 Pages, Retrieved from the Internet: URL: http://www.3gpp.org/ftp/tsg%5Fsa/WG2%5FArch/TSGS2%5F128BIS%5FSophia%5FAntipolis/Docs/S2%2D188083%2Ezip [retrieved on Aug. 14, 2018] the whole document.

* cited by examiner

SYSTEMS AND METHODS FOR DEFERRED 5G LOCATION OF A MOBILE DEVICE USING A COMBINED AMF AND LMF BASED LOCATION SOLUTION

CROSS-REFERENCE TO RELATED APPLICATIONS

This application claims the benefit of U.S. Provisional Application Nos. 62/731,764, entitled "SYSTEMS AND METHODS FOR DEFERRED 5G LOCATION OF A MOBILE DEVICE USING A COMBINED AMF AND LMF BASED SOLUTION," filed Sep. 14, 2018, 62/736,437, entitled "SYSTEMS AND METHODS FOR DEFERRED 5G LOCATION OF A MOBILE DEVICE USING A COMBINED AMF AND LMF BASED SOLUTION," filed Sep. 25, 2018, 62/740,400, entitled "SYSTEMS AND METHODS FOR DEFERRED 5G LOCATION OF A MOBILE DEVICE USING A COMBINED AMF AND LMF BASED SOLUTION," filed Oct. 2, 2018, 62/742,896, entitled "SYSTEMS AND METHODS FOR DEFERRED 5G LOCATION OF A MOBILE DEVICE USING A COMBINED AMF AND LMF BASED SOLUTION," filed Oct. 8, 2018, 62/807,222, entitled "SYSTEMS AND METHODS FOR DEFERRED 5G LOCATION OF A MOBILE DEVICE USING A COMBINED AMF AND LMF BASED SOLUTION," filed Feb. 18, 2019, and 62/844,047, entitled "SYSTEMS AND METHODS FOR DEFERRED 5G LOCATION OF A MOBILE DEVICE USING A COMBINED AMF AND LMF BASED SOLUTION," filed May 6, 2019, which are assigned to the assignee thereof and which are expressly incorporated herein by reference in their entireties.

BACKGROUND

Background Field

The present disclosure relates generally to communication, and more specifically to techniques for supporting location services for user equipments (UEs).

Relevant Background

Two solutions have been considered in The Third Generation Partnership Project (3GPP) for supporting location of a user equipment (UE) that is accessing a Fifth Generation (5G) wireless network. One solution, sometimes referred to as an Access and Mobility Management Function (AMF) based solution, is closely aligned with the EPC (Enhanced Packet Core) location solution for Long Term Evolution (LTE) access defined in 3GPP Technical Specification (TS) 23.271 and requires all location requests to pass through, and to be managed and coordinated by, a serving AMF for a target UE. The other solution, sometimes referred to as a Location Management Function (LMF) based solution, requires all location requests to pass through, and to be managed and coordinated by an LMF in a serving 5G Core Network (5GCN) for a target UE and has few location specific impacts to a serving AMF. Compared to the AMF based solution, the LMF based solution may improve the distribution of location related functions by including these only (or mainly) in location related entities (like the LMF and a Gateway Mobile Location Center (GMLC)). For a single location of a target UE (e.g. as requested by the UE, an external client or by a network entity), the two solutions may have similar overall efficiency (e.g. similar signaling and processing impacts). For multiple locations of a target UE based on periodic or triggered events, the LMF based solution can be more efficient in terms of requiring less signaling and processing and using fewer network entities and network interfaces. While the LMF based solution may be more efficient and, thus, arguably better than the AMF based solution, the AMF based solution aligns better with the current EPC location solution for LTE access and was chosen by 3GPP to support location of emergency calls for 5G wireless access. However, for commercial location services, the LMF based solution may be more efficient for network operators. However, it is not clear how both solutions might be used to support regulatory and commercial location without implementing both solutions which could substantially increase network complexity and cost.

SUMMARY

Methods and techniques are described for supporting periodic and triggered location services for a user equipment (UE) using a location server, such as a Location Management Function (LMF), and a core network (CN) node, such as an Access and Mobility Management Function (AMF) in a Fifth Generation wireless network. The CN node receives a request for periodic or triggered location for the UE from an entity in the wireless network, such as a Gateway Mobile Location Center (GMLC) and initiates and establishes the periodic and triggered location session and then releases all resources for the request for periodic or triggered location. The location server receives the periodic or triggered location events from the UE and reports the periodic or triggered location events to the entity, e.g., the GMLC.

In one implementation, a method for supporting location services for a user equipment (UE) performed by a first location server in a wireless network, includes receiving a request for a periodic or triggered location for the UE from a first core network (CN) node in the wireless network, wherein the first CN node received the request for the periodic or triggered location for the UE from another entity; sending the request for the periodic or triggered location to the UE; receiving a confirmation from the UE that the periodic or triggered location was activated in the UE; and sending the confirmation to the first CN node that the periodic or triggered location was activated in the UE.

In one implementation, a first location server in a wireless network for supporting location services for a user equipment (UE) includes an external interface for receiving and sending messages to entities in a network; at least one memory; and at least one processor coupled to the external interface and the at least one memory, the at least one processor configured to: receive a request for a periodic or triggered location for the UE from a first core network (CN) node in the wireless network, wherein the first CN node received the request for the periodic or triggered location for the UE from another entity; send the request for the periodic or triggered location to the UE; receive a confirmation from the UE that the periodic or triggered location was activated in the UE; and send the confirmation to the first CN node that the periodic or triggered location was activated in the UE.

In one implementation, a first location server in a wireless network for supporting location services for a user equipment (UE) includes means for receiving a request for a periodic or triggered location for the UE from a first core network (CN) node in the wireless network, wherein the first CN node received the request for the periodic or triggered location for the UE from another entity; means for sending the request for the periodic or triggered location to the UE;

means for receiving a confirmation from the UE that the periodic or triggered location was activated in the UE; and means for sending the confirmation to the first CN node that the periodic or triggered location was activated in the UE.

In one implementation, a non-transitory storage medium including program code stored thereon, the program code is operable to cause at least one processor in a first location server in a wireless network to support location services for a user equipment (UE) includes program code to receive a request for a periodic or triggered location for the UE from a first core network (CN) node in the wireless network, wherein the first CN node received the request for the periodic or triggered location for the UE from another entity; program code to send the request for the periodic or triggered location to the UE; program code to receive a confirmation from the UE that the periodic or triggered location was activated in the UE; and program code to send the confirmation to the first CN node that the periodic or triggered location was activated in the UE.

In one implementation, a method for supporting location services for a user equipment (UE) performed by a core network (CN) node in a wireless network, includes receiving a request for a periodic or triggered location for the UE from another entity; sending the request for the periodic or triggered location for the UE to a first location server in the wireless network, wherein the request for the periodic or triggered location is to be sent by the first location server to the UE and the UE is to confirm to the first location server an activation of the periodic or triggered location in the UE; receiving a confirmation from the first location server that the periodic or triggered location for the UE was activated in the UE; sending the confirmation to the other entity that the periodic or triggered location was activated in the UE; and releasing all resources for the request for periodic or triggered location, wherein the UE is to report a plurality of periodic or triggered location events to a second location server and the second location server is to report the plurality of periodic or triggered location events to the other entity.

In one implementation, a core network (CN) node in a wireless network for supporting location services for a user equipment (UE) includes an external interface for receiving and sending messages to entities in a network; at least one memory; and at least one processor coupled to the external interface and the at least one memory, the at least one processor configured to: receive a request for a periodic or triggered location for the UE from another entity; send the request for the periodic or triggered location for the UE to a first location server in the wireless network, wherein the request for the periodic or triggered location is to be sent by the first location server to the UE and the UE is to confirm to the first location server an activation of the periodic or triggered location in the UE; receive a confirmation from the first location server that the periodic or triggered location for the UE was activated in the UE; send the confirmation to the other entity that the periodic or triggered location was activated in the UE; and release all resources for the request for periodic or triggered location, wherein the UE is to report a plurality of periodic or triggered location events to a second location server and the second location server is to report the plurality of periodic or triggered location events to the other entity.

In one implementation, a core network (CN) node in a wireless network for supporting location services for a user equipment (UE) includes means for receiving a request for a periodic or triggered location for the UE from another entity; means for sending the request for the periodic or triggered location for the UE to a first location server in the wireless network, wherein the request for the periodic or triggered location is to be sent by the first location server to the UE and the UE is to confirm to the first location server an activation of the periodic or triggered location in the UE; means for receiving a confirmation from the first location server that the periodic or triggered location for the UE was activated in the UE; means for sending the confirmation to the other entity that the periodic or triggered location was activated in the UE; and means for releasing all resources for the request for periodic or triggered location, wherein the UE is to report a plurality of periodic or triggered location events to a second location server and the second location server is to report the plurality of periodic or triggered location events to the other entity.

In one implementation, a non-transitory storage medium including program code stored thereon, the program code is operable to cause at least one processor in core network (CN) node in a wireless network to support location services for a user equipment (UE) includes program code to receive a request for a periodic or triggered location for the UE from another entity; program code to send the request for the periodic or triggered location for the UE to a first location server in the wireless network, wherein the request for the periodic or triggered location is to be sent by the first location server to the UE and the UE is to confirm to the first location server an activation of the periodic or triggered location in the UE; program code to receive a confirmation from the first location server that the periodic or triggered location for the UE was activated in the UE; program code to send the confirmation to the other entity that the periodic or triggered location was activated in the UE; and program code to release all resources for the request for periodic or triggered location, wherein the UE is to report a plurality of periodic or triggered location events to a second location server and the second location server is to report the plurality of periodic or triggered location events to the other entity.

In one implementation, a method for supporting location services for a user equipment (UE) performed by an entity in a wireless network, includes receiving a request for a periodic or triggered location for the UE from an external client; querying an other entity in the wireless network for an address of a core network (CN) node associated with the UE; sending the request for the periodic or triggered location for the UE to the CN node, wherein the request for the periodic or triggered location is to be sent by the CN node to a first location server, wherein the first location server is to send the request for the periodic or triggered location to the UE and the UE is to confirm an activation of the periodic or triggered location in the UE; receiving a confirmation from the CN node that the periodic or triggered location for the UE was activated in the UE; sending a confirmation to the external client that the periodic or triggered location was activated in the UE; receiving a plurality of periodic or triggered location event reports for the UE from a second location server, wherein each of the plurality of periodic or triggered location event reports comprises at least one of location measurements, a location estimate, a type of detected triggering event, or a combination thereof; and sending a plurality of corresponding periodic or triggered location event reports to the external client.

In one implementation, an entity in a wireless network for supporting location services for a user equipment (UE) includes an external interface for receiving and sending messages to entities in a network; at least one memory; and at least one processor coupled to the external interface and the at least one memory, the at least one processor configured to: receive a request for a periodic or triggered location for the UE from an external client; query an other entity in the wireless network for an address of a core network (CN) node associated with the UE; send the request for the periodic or triggered location for the UE to the CN node, wherein the request for the periodic or triggered location is to be sent by the CN node to a first location server to the UE and the UE is to confirm an activation of the periodic or triggered location in the UE; receive a confirmation from the CN node that the periodic or triggered location for the UE was activated in the UE; send a confirmation to the external client that the periodic or triggered location was activated in the UE; receive a plurality of periodic or triggered location event reports for the UE from a second location server, wherein each of the plurality of periodic or triggered location event reports comprises at least one of location measurements, a location estimate, a type of detected triggering event, or a combination thereof; and send a plurality of corresponding periodic or triggered location event reports to the external client.

In one implementation, an entity in a wireless network for supporting location services for a user equipment (UE) includes means for receiving a request for a periodic or triggered location for the UE from an external client; means for querying an other entity in the wireless network for an address of a core network (CN) node associated with the UE; means for sending the request for the periodic or triggered location for the UE to the CN node, wherein the request for the periodic or triggered location is to be sent by the CN node to a first location server, wherein the first location server is to send the request for the periodic or triggered location to the UE and the UE is to confirm an activation of the periodic or triggered location in the UE; means for receiving a confirmation from the CN node that the periodic or triggered location for the UE was activated in the UE; means for sending a confirmation to the external client that the periodic or triggered location was activated in the UE; means for receiving a plurality of periodic or triggered location event reports for the UE from a second location server, wherein each of the plurality of periodic or triggered location event reports comprises at least one of location measurements, a location estimate, a type of detected triggering event, or a combination thereof; and means for sending a plurality of corresponding periodic or triggered location event reports to the external client.

In one implementation, a non-transitory storage medium including program code stored thereon, the program code is operable to cause at least one processor in an entity in a wireless network to support location services for a user equipment (UE) includes program code to receive a request for a periodic or triggered location for the UE from an external client; program code to query an other entity in the wireless network for an address of a core network (CN) node associated with the UE; program code to send the request for the periodic or triggered location for the UE to the CN node, wherein the request for the periodic or triggered location is to be sent by the CN node to a first location server, wherein the first location server is to send the request for the periodic or triggered location to the UE and the UE is to confirm an activation of the periodic or triggered location in the UE; program code to receive a confirmation from the CN node that the periodic or triggered location for the UE was activated in the UE; program code to send a confirmation to the external client that the periodic or triggered location was activated in the UE; program code to receive a plurality of periodic or triggered location event reports for the UE from a second location server, wherein each of the plurality of periodic or triggered location event reports comprises at least one of location measurements, a location estimate, a type of detected triggering event, or a combination thereof; and program code to send a plurality of corresponding periodic or triggered location event reports to the external client.

In one implementation, a method for supporting location services for a user equipment (UE) performed by the UE, includes receiving a request for a periodic or triggered location for the UE from a first location server in a wireless network, wherein the first location server received the request for the periodic or triggered location for the UE from a first Core Network (CN) node, wherein the first CN node received the request for the periodic or triggered location for the UE from another entity; sending a confirmation to the first location server that the periodic or triggered location was activated in the UE; detecting a plurality of trigger events; and sending, for each detected trigger event, a corresponding event report to a second location server, each corresponding event report comprising at least one of location measurements, a location estimate, a type of detected triggering event, or a combination thereof, wherein the second location server sends each corresponding event report to the other entity.

In one implementation, a user equipment (UE) for supporting location services for the UE, includes at least one wireless transceiver configured to wirelessly communicate with at least one wireless network; at least one memory; and at least one processor coupled to the at least one wireless transceiver and the at least one memory, the at least one processor configured to: receive a request for a periodic or triggered location for the UE from a first location server in the wireless network, wherein the first location server received the request for the periodic or triggered location for the UE from a first Core Network (CN) node, wherein the first CN node received the request for the periodic or triggered location for the UE from another entity; send a confirmation to the first location server that the periodic or triggered location was activated in the UE; detect a plurality of trigger events; and send, for each detected trigger event, a corresponding event report to a second location server, each corresponding event report comprising at least one of location measurements, a location estimate, a type of detected triggering event, or a combination thereof, wherein the second location server sends each corresponding event report to the other entity.

In one implementation, a user equipment (UE) for supporting location services for the UE, the UE includes means for receiving a request for a periodic or triggered location for the UE from a first location server in a wireless network, wherein the first location server received the request for the periodic or triggered location for the UE from a first Core Network (CN) node, wherein the first CN node received the request for the periodic or triggered location for the UE from another entity; means for sending a confirmation to the first location server that the periodic or triggered location was activated in the UE; means for detecting a plurality of trigger events; and means for sending, for each detected trigger event, a corresponding event report to a second location server, each corresponding event report comprising at least one of location measurements, a location estimate, a type of detected triggering event, or a combination thereof, wherein the second location server sends each corresponding event report to the other entity.

In one implementation, a non-transitory storage medium including program code stored thereon, the program code is operable to cause at least one processor in a user equipment (UE) to support location services for the UE includes program code to receive a request for a periodic or triggered location for the UE from a first location server in a wireless network, wherein the first location server received the request for the periodic or triggered location for the UE from a first Core Network (CN) node, wherein the first CN node received the request for the periodic or triggered location for the UE from another entity; program code to send a confirmation to the first location server that the periodic or triggered location was activated in the UE; program code to detect a plurality of trigger events; and program code to send, for each detected trigger event, a corresponding event report to a second location server, each corresponding event report comprising at least one of location measurements, a location estimate, a type of detected triggering event, or a combination thereof, wherein the second location server sends each corresponding event report to the other entity.

BRIEF DESCRIPTION OF THE DRAWINGS

An understanding of the nature and advantages of various embodiments may be realized by reference to the following figures.

Like reference numbers and symbols in the various figures indicate like elements, in accordance with certain example implementations. In addition, multiple instances of an element may be indicated by following a first number for the element with a letter or with a hyphen and a second number. For example, multiple instances of an element 110 may be indicated as 110-1, 110-2, 110-3 etc. Similarly, multiple instances of an element 152 may be indicated as 152A, 152B, 152C etc. When referring to such an element using only the first number, any instance of the element is to be understood (e.g. elements 110 in the previous example would refer to elements 110-1, 110-2 and 110-3, and element 152 in the previous example would refer to elements 152A, 152B and 152C).

DETAILED DESCRIPTION

Two solutions have been considered in 3GPP for supporting location of a UE that is accessing a 5G wireless network. One solution, referred to here as an AMF based location solution (also referred to as an AMF solution or an AMF based solution), is closely aligned with the location solution for LTE access defined in 3GPP TS 23.271 and requires all location requests to pass through, and to be managed and coordinated by, a serving AMF for a target UE. The other solution, referred to here as an LMF based location solution (also referred to as an LMF solution or an LMF based solution), requires all location requests to pass through, and to be managed and coordinated by an LMF in a serving 5GCN for a target UE and has few location specific impacts to a serving AMF.

As described later herein, an AMF based location solution has a number of limitations which can be overcome by an LMF based location solution. However, an AMF based location solution does have an advantage in being more closely aligned to the location solution defined in 3GPP TS 23.271 for a UE with LTE wireless access to an Evolved Packet System (EPS). Consequently, an AMF based location solution was defined by 3GPP to support location of a UE that has instigated an emergency call to a public safety answering point (PSAP). A location solution for commercial services could thus also be (or be based on) an AMF based solution at potential the cost of various limitations mentioned above and described in more detail below. To overcome these limitations while still preserving alignment with the AMF based location solution defined by 3GPP for location of a UE with an emergency call, a combined AMF and LMF based location solution is introduced here and described in detail further down.

Figure 1:
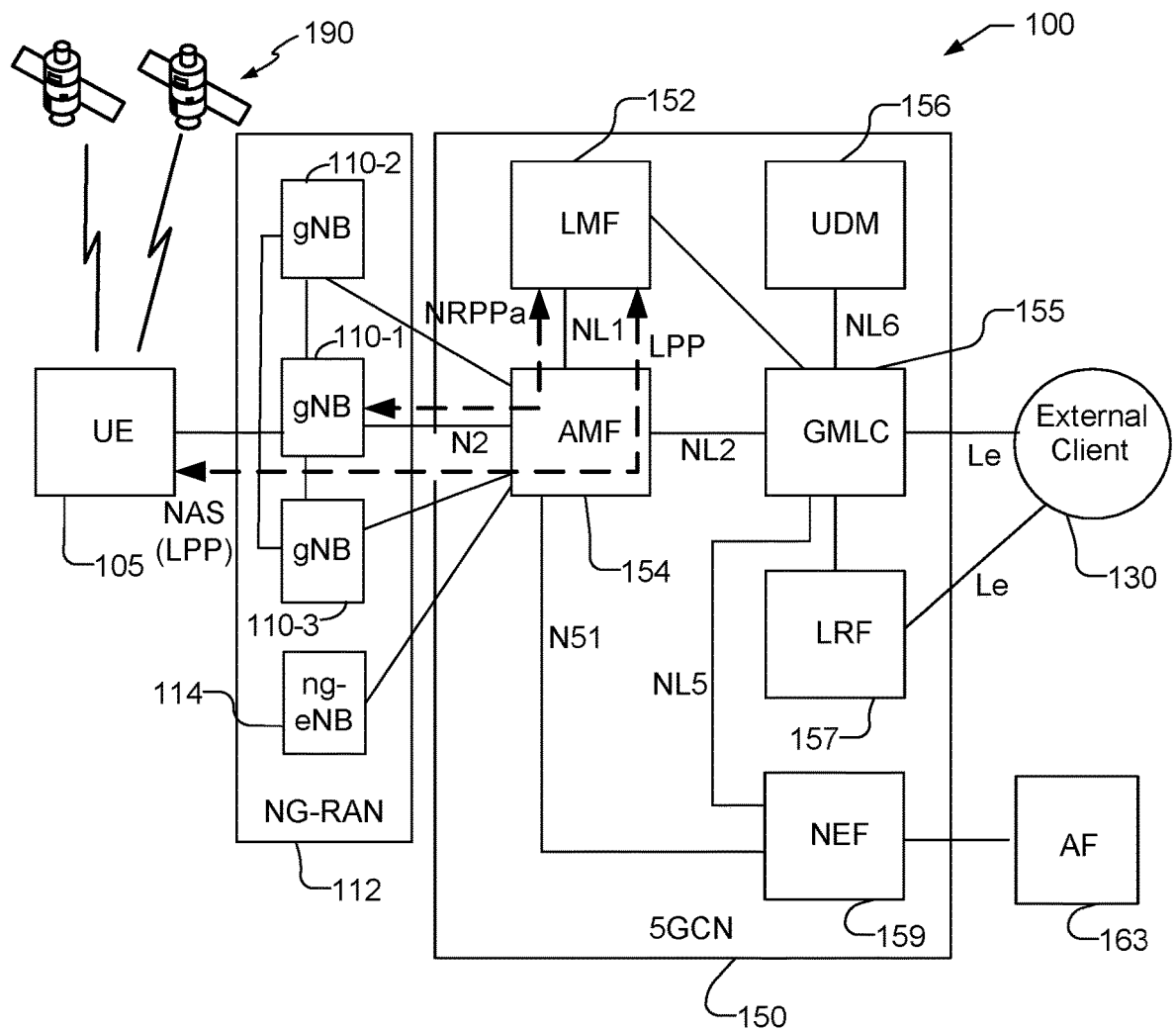
FIG. 1 is a simplified block diagram illustrating a communication system for non-roaming support of UE location using a combined AMF and LMF based location solution.

FIG. 1 is a simplified block diagram illustrating a communication system 100 for non-roaming support of an AMF based location solution, an LMF based location solution and the combined AMF and LMF based location solution defined later herein. The communication system 100 comprises a UE 105 and components of a Fifth Generation (5G) network comprising a Next Generation Radio Access Network (NG-RAN) 112, which includes base stations (BSs), sometimes referred to as New Radio (NR) NodeBs or gNBs 110-1, 110-2 and 110-3 (collectively and generically referred to herein as gNBs 110), and a 5G Core Network (5GCN) 150 that is in communication with an external client 130 and/or an Application Function (AF) 163. A 5G network may also be referred to as a New Radio (NR) network; NG-RAN 112 may be referred to as an NR RAN or a 5G RAN; and 5GCN 150 may be referred to as an Next Generation (NG) Core network (NGC). The communication system 100 may further utilize information from space vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

It should be noted that FIG. 1 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger or smaller number of SVs 190, gNBs 110, external clients 130, AFs 163, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE) (4G), and IEEE 802.11 WiFi etc. For example, where a Wireless Local Area Network (WLAN), e.g., IEEE 802.11 radio interface, is used, the UE 105 may communicate with an Access Network (AN), as opposed to an NG-RAN, and accordingly, component 112 is sometimes referred to herein as an AN or as a Radio Access Network (RAN), denoted by the term "(R)AN" or "(R)AN 112". In the case of an AN (e.g. IEEE 802.11 AN), the AN may be connected to a Non-3GPP Interworking Function (N3IWF) (e.g. in 5GCN 150) (not shown in FIG. 1), with the N3IWF connected to AMF 154.

The UE 105, as used herein, may be any electronic device and may be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a smart watch, digital glasses, fitness monitor, smart car, smart appliance, cellphone, smartphone, laptop, tablet, PDA, tracking device, control device or some other portable or moveable device. The UE 105 may include a single entity or may include multiple entities such as in a personal area network where a user may employ audio, video and/or data I/O devices and/or body sensors and a separate wireline or wireless modem. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR) (e.g., using the NG-RAN 112 and 5GCN 150), etc. The UE 105 may also support wireless communication using a Wireless Local Area Network (WLAN), which may connect to other networks (e.g. the Internet) using a Digital Subscriber Line (DSL) or packet cable for example. The use of one or more of these RATs may allow the UE 105 to communicate with an external client 130 (e.g. via elements of 5GCN 150 not shown in FIG. 1, or possibly via a Gateway Mobile Location Center (GMLC) 155), and/or allow the external client 130 to receive location information regarding the UE 105 (e.g., via the GMLC 155).

The UE 105 may enter a connected state with a wireless communication network that may include the NG-RAN 112. In one example, the UE 105 may communicate with a cellular communication network by transmitting wireless signals to, or receiving wireless signals from a cellular transceiver, in the NG-RAN 112, such as a gNB 110. A transceiver such as a gNB 110 provides user and control plane protocol terminations toward the UE 105 and may be referred to as a base station, a base transceiver station, a radio base station, a radio transceiver, a radio network controller, a transceiver function, a base station subsystem (BSS), an extended service set (ESS), or by some other suitable terminology.

In particular implementations, the UE 105 may have circuitry and processing resources capable of obtaining location related measurements. Location related measurements obtained by UE 105 may include measurements of signals received from SVs 190 belonging to an SPS or Global Navigation Satellite System (GNSS) such as GPS, GLONASS, Galileo or Beidou and/or may include measurements of signals received from terrestrial transmitters fixed at known locations (e.g., such as gNBs 110). UE 105 or a separate location server (e.g. LMF 152), to which UE 105 may send the measurements, may then obtain a location estimate for the UE 105 based on these location related measurements using any one of several position methods such as, for example, GNSS, Assisted GNSS (A-GNSS), Advanced Forward Link Trilateration (AFLT), Observed Time Difference Of Arrival (OTDOA), Real Time Kinematic (RTK), Angle of Arrival (AOA), Angle of Departure (AOD), Round Trip signal propagation Time (RTT), WLAN (also referred to as WiFi) positioning, or Enhanced Cell ID (ECID) or combinations thereof. In some of these techniques (e.g. A-GNSS, AFLT and OTDOA), pseudoranges or timing differences may be measured at UE 105 relative to three or more terrestrial transmitters (e.g. gNBs 110) fixed at known locations or relative to four or more SVs 190 with accurately known orbital data, or combinations thereof, based at least in part, on pilots, positioning reference signals (PRS) or other positioning related signals transmitted by the transmitters or satellites and received at the UE 105.

A location server, such as the LMF 152, may be capable of providing positioning assistance data to UE 105 including, for example, information regarding signals to be measured (e.g., expected signal timing, signal coding, signal frequencies, signal Doppler), locations and identities of terrestrial transmitters (e.g. gNBs 110) and/or signal, timing and orbital information for GNSS SVs 190 to facilitate positioning techniques such as A-GNSS, AFLT, OTDOA and ECID. The facilitation may include improving signal acquisition and measurement accuracy by UE 105 and, in some cases, enabling UE 105 to compute its estimated location based on the location measurements. For example, a location server (e.g. LMF 152) may comprise an almanac which indicates locations and identities of cellular transceivers and/or local transceivers in a particular region or regions such as a particular venue, and may provide information descriptive of signals transmitted by a cellular base station or AP (e.g. a gNB 110) such as transmission power and signal timing. A UE 105 may obtain measurements of signal strengths (e.g. received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), an angle of arrival (AOA), or a round trip signal propagation time (RTT) between UE 105 and a cellular transceiver (e.g. a gNB 110) or a local transceiver (e.g. a WiFi access point (AP)). A UE 105 may transfer these measurements to a location server, such as LMF 152, to determine a location for UE 105, or in some implementations, may use these measurements together with assistance data (e.g. terrestrial almanac data or GNSS satellite data such as GNSS Almanac and/or GNSS Ephemeris information) received from a location server (e.g. LMF 152) or broadcast by a base station (e.g. a gNB 110) in NG-RAN 112 to determine a location for UE 105.

In the case of OTDOA, UE 105 may measure a Reference Signal Time Difference (RSTD) between signals such as a Positioning Reference Signal (PRS), Cell specific Reference Signal (CRS), or Tracking Reference Signal (TRS) transmitted by nearby pairs of transceivers and base stations (e.g. gNBs 110). An RSTD measurement may provide the time of arrival difference between signals (e.g. TRS, CRS or PRS) received at UE 105 from two different transceivers. The UE 105 may return the measured RSTDs to a location server (e.g. LMF 152) which may compute an estimated location for UE 105 based on known locations and known signal timing for the measured transceivers. In some implementations of OTDOA, the signals used for RSTD measurements (e.g. PRS or CRS signals) may be accurately synchronized by the transceivers to a common universal time such as GPS time or Coordinated Universal Time (UTC), e.g., using a GPS or GNSS receiver at each transceiver to accurately obtain the common universal time.

An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

As shown in FIG. 1, pairs of gNBs 110 in NG-RAN 112 may be connected to one another, e.g., directly as shown in FIG. 1 or indirectly via other gNBs 110. Access to the 5G network is provided to UE 105 via wireless communication between the UE 105 and one or more of the gNBs 110, which may provide wireless communication access to the 5GCN 150 on behalf of the UE 105 using 5G (e.g. NR). In FIG. 1, the serving gNB for UE 105 is assumed to be gNB 110-1, although other gNBs (e.g. gNB 110-2 and/or gNB 110-3) may act as a serving gNB if UE 105 moves to another location or may act as a secondary gNB to provide additional throughout and bandwidth to UE 105. Some gNBs 110 in FIG. 1 (e.g. gNB 110-2 or gNB 110-3) may be configured to function as positioning-only beacons which may transmit signals (e.g. directional PRS) to assist positioning of UE 105 but may not receive signals from UE 105 or from other UEs.

As noted, while FIG. 1 depicts nodes configured to communicate according to 5G communication protocols, nodes configured to communicate according to other communication protocols, such as, for example, LTE protocols, may be used. Such nodes, configured to communicate using different protocols, may be controlled, at least in part, by the 5GCN 150. Thus, the NG-RAN 112 may include any combination of gNBs, evolved Node Bs (eNBs) supporting LTE, or other types of base stations or access points. As an example, NG-RAN 112 may include one or more next generation eNBs (ng-eNBs) 114 which provide LTE wireless access to UE 105 and may connect to entities in 5GCN 150 such as AMF 154.

The gNBs 110 and/or the ng-eNB 114 can communicate with the Access and Mobility Management Function (AMF) 154, which, for positioning functionality, communicates with a Location Management Function (LMF) 152. The AMF 154 may support mobility of the UE 105, including cell change and handover and may participate in supporting a signaling connection to the UE 105 and possibly helping establish and release Protocol Data Unit (PDU) sessions for UE 105. Other functions of AMF 154 may include: termination of a control plane (CP) interface from NG-RAN 112; termination of Non-Access Stratum (NAS) signaling connections from UEs such as UE 105, NAS ciphering and integrity protection; registration management; connection management; reachability management; mobility management; access authentication and authorization.

The LMF 152 may support positioning of the UE 105 when UE 105 accesses the NG-RAN 112 and may support position procedures/methods such as Assisted GNSS (A-GNSS), Observed Time Difference of Arrival (OTDOA), Real Time Kinematic (RTK), Precise Point Positioning (PPP), Differential GNSS (DGNSS), Enhanced Cell ID (ECID), angle of arrival (AOA), angle of departure (AOD), WLAN positioning, and/or other position methods. The LMF 152 may also process location service requests for the UE 105, e.g., received from the AMF 154. In some embodiments, a node/system that implements the LMF 152 may additionally or alternatively implement other types of location-support modules, such as an Enhanced Serving Mobile Location Center (E-SMLC) or a Secure User Plane Location (SUPL) Location Platform (SLP). It will be noted that in some embodiments, at least part of the positioning functionality (including derivation of UE 105's location) may be performed at the UE 105 (e.g., using signal measurements for signals transmitted by wireless nodes, and assistance data provided to the UE 105).

The GMLC 155 may support a location request for the UE 105 received from an external client 130 and may forward such a location request to a serving AMF 154 for UE 105, in the case of an AMF based location solution. The AMF 154 may then forward the location request to LMF 152 which may obtain one or more location estimates for UE 105 (e.g. according to the request from external client 130) and may return the location estimate(s) to AMF 154, which may return the location estimate(s) to external client 130 via GMLC 155. In an alternative LMF based location solution, the GMLC 155 may forward a location request received from external client 130 directly to the LMF 152, thereby bypassing and not impacting the serving AMF 154. The LMF 152 may then obtain one or more location estimates for UE 105 similarly to the AMF based location solution and may return the location estimate(s) directly to the GMLC 155, which may return the location estimate(s) (as for the AMF based location solution) to the external client 130.

For either an AMF based location solution or an LMF based location solution, GMLC 155 may contain subscription information for an external client 130 and may authenticate and authorize a location request for UE 105 from external client 130 and verify that any privacy requirement for UE 105 is supported. GMLC 155 may further initiate a location session for UE 105 by sending a location request for UE 105 to either AMF 154 or LMF 152 (e.g. according to whether an AMF based or LMF based location solution is used) and may include in the location request an identity for UE 105 and the type of location being requested (e.g. such as a current location or a sequence of periodic or triggered locations).

As further illustrated in FIG. 1, the LMF 152 and the gNBs 110 may communicate using a New Radio Position Protocol A (which may be referred to as NRPPa). NRPPa may be defined in 3GPP TS 38.455 and may be similar to, or an extension of, the LTE Positioning Protocol A (LPPa) defined in 3GPP TS 36.455, with NRPPa messages being transferred between the gNBs 110 and the LMF 152 via the AMF 154. As further illustrated in FIG. 1, LMF 152 and UE 105 may communicate using the LTE Positioning Protocol (LPP) defined in 3GPP TS 36.355 (and/or in 3GPP TS 37.355), where LPP messages are transferred between the UE 105 and the LMF 152 via the serving AMF 154 and a serving gNB 110-1 for UE 105. For example, LPP messages may be transferred between the LMF 152 and the AMF 154 using a transport protocol (e.g. IP based) or a service based operation (e.g. using the Hypertext Transfer Protocol (HTTP)), and may be transferred between the AMF 154 and the UE 105 using a 5G Non-Access Stratum (NAS) protocol. The LPP protocol may be used to support positioning of UE 105 using UE assisted and/or UE based position methods such as Assisted GNSS (A-GNSS), Real Time Kinematic (RTK), Wireless Local Area Network (WLAN), Observed Time Difference of Arrival (OTDOA), AOA. AOD, RTT and/or Enhanced Cell Identity (ECID). The NRPPa protocol may be used to support positioning of UE 105 using network based position methods such as ECID (when used with measurements obtained by a gNB 110 or received from a gNB 110 from UE 105) and/or may be used by LMF 152 to obtain location related information from gNBs 110 such as parameters defining positioning reference signal (PRS) transmission from gNBs 110 for support of OTDOA and location coordinates for gNBs 110.

With a UE assisted position method, UE 105 may obtain location measurements (e.g. measurements of RSSI, RTT, RSTD, RSRP and/or RSRQ for gNBs 110, ng-eNB 114 or WLAN APs, or measurements of GNSS pseudorange, code phase and/or carrier phase for SVs 190) and send the measurements to a location server (e.g. LMF 152) for computation of a location estimate for UE 105. With a UE based position method, UE 105 may obtain location measurements (e.g. which may be the same as or similar to location measurements for a UE assisted position method) and may compute a location of UE 105 (e.g. with the help of assistance data received from a location server such as LMF 152 or broadcast by gNBs 110, ng-eNB 114 or other base stations or APs). With a network based position method, one or more base stations (e.g. gNBs 110 and/or ng-eNB 114) or APs may obtain location measurements (e.g. measurements of RSSI, RTT, RSRP, RSRQ, AOA or TOA for signals transmitted by UE 105) and/or may receive measurements obtained by UE 105, and may send the measurements to a location server (e.g. LMF 152) for computation of a location estimate for UE 105.

Information provided by the gNBs 110 to the LMF 152 using NRPPa may include timing and configuration information for PRS transmission and location coordinates of the gNBs 110. The LMF 152 can then provide some or all of this information to the UE 105 as assistance data in an LPP message via the NG-RAN 112 and the 5GCN 150.

An LPP message sent from the LMF 152 to the UE 105 may instruct the UE 105 to do any of a variety of things, depending on desired functionality. For example, the LPP message could contain an instruction for the UE 105 to obtain measurements for GNSS (or A-GNSS), WLAN, and/or OTDOA (or some other position method). In the case of OTDOA, the LPP message may instruct the UE 105 to obtain one or more measurements (e.g. RSTD measurements) of PRS signals transmitted within particular cells supported by particular gNBs 110 (or supported by one or more ng-eNBs 114 or eNBs). The UE 105 may send the measurements back to the LMF 152 in an LPP message (e.g. inside a 5G NAS message) via the serving gNB 110-1 and the AMF 154.

In some embodiments, LPP may be augmented by or replaced by an NR or NG positioning protocol (NPP or NRPP) or by a multi-RAT positioning protocol (MRPP) which supports position methods such as OTDOA and ECID for NR radio access and position methods for other access types such as WLAN. For example, an LPP message may contain an embedded NPP message or may be replaced by an NPP or MRPP message.

When NG-RAN 112 includes one or more ng-eNBs 114, an ng-eNB 114 may communicate with LMF 152 using NRPPa in order to support positioning of UE 105 (e.g. using a network based position method) and/or may enable transfer of LPP, NPP and/or MRPP messages between UE 105 and LMF 152 via the ng-eNB 114 and AMF 154. An ng-eNB 114 and/or a gNB 110 in NG-RAN 112 may also broadcast positioning assistance data to UEs such as UE 105.

As illustrated, a Unified Data Management (UDM) 156 may be connected to the GMLC 155. The UDM 156 is analogous to a Home Subscriber Server (HSS) for LTE access, and if desired, the UDM 156 may be combined with an HSS. The UDM 156 is a central database that contains user-related and subscription-related information for UE 105 and may perform the following functions: UE authentication, UE identification, access authorization, registration and mobility management, subscription management and Short Message Service management. Additionally, the GMLC 155 may be connected to a Location Retrieval Function (LRF) 157, which handles retrieval of location information for the UE 105 and may be used to provide location information for UE 105 to an external client 130 that is a Public Safety Answering Point (PSAP), e.g. following an emergency call from UE 105 to the PSAP.

To support services including location services from external clients 130 for Internet of Things (IoT) UEs, a Network Exposure Function (NEF) 159 may be included in 5GCN 150. The NEF 159 may support secure exposure of capabilities and events concerning 5GCN 150 and UE 105 to an AF 163 and may enable secure provision of information from AF 163 to 5GCN 150. In the context of location services, NEF 159 may function to obtain a current or last known location for a UE 105, may obtain an indication of a change in location for a UE 105, or an indication of when a UE 105 becomes available (or reachable). The NEF 159 may be connected to the GMLC 155 to support last known location, current location and/or deferred periodic and triggered location for the UE 105. If desired, the NEF 159 may include, or may be combined with, the GMLC 155 and may then obtain location information for UE 105 directly from LMF 152 (e.g. may be connected to LMF 152). For example, NEF 159 may replace HGMLC 155H or may be combined with HGMLC 155H. NEF 159 may also be connected to AMF 154 which may allow NEF 159 to request location related information for UE 105 from AMF 154. In some implementations, NEF 159 may choose whether to obtain location related information for UE 105 (e.g. a current location estimate for UE 105 or a series of periodic or triggered location estimates for UE 105) by sending a location request to GMLC 155 (which may then forward the location request to AMF 154 or LMF 152) or by sending a location request (or location subscription request) to AMF 154.

As described previously, an AMF based location solution uses an AMF as the main anchor point for location services for a target UE. In the case of communication system 100, this would mean using serving AMF 154 as the main anchor point for obtaining one or more locations of UE 105. The AMF based solution may then require all location requests for UE 105 to pass through, and to be managed and coordinated by, AMF 154. An LMF based location, on the other hand, may require all location requests to pass through, and to be managed and coordinated by an LMF in the serving 5GCN for a target UE. In the case of communication system 100, this would mean using LMF 152 as the main anchor point for obtaining one or more locations of UE 105. An LMF based solution may have fewer location specific impacts to a serving AMF than an AMF based solution. An LMF based solution may further improve assignment of location related functions compared to an AMF based solution by primarily impacting location related entities, such as the LMF 152 and GMLC 155 in the case of communication system 100 and by not impacting (or not significantly impacting) entities which are not dedicated to location support such as AMF 154. For a single location of a target UE 105, e.g. using a Mobile Terminated Location Request (MT-LR), Mobile Originated Location Request (MO-LR) or Network Induced Location Request (NI-LR) (e.g. as defined in 3GPP TS 23.271), AMF and LMF based solutions may have similar overall efficiency (e.g. similar signaling and processing requirements). However, because an AMF based solution aligns better with the current EPC location solution for LTE access defined in 3GPP TS 23.271, an AMF based location solution was chosen by 3GPP to support location of emergency calls for 5G wireless access.

For multiple location estimates of a target UE 105 based on periodic or triggered events, an LMF based solution may be more efficient than an AMF based solution in terms of requiring less signaling and processing and using fewer network entities and network interfaces. This may be a consequence of avoiding transfer of a location request and subsequent location estimates for a UE 105 through a serving AMF 154 and by avoiding establishing and releasing a location session between an AMF 154 and LMF 152 for each periodic or triggered location of the UE 105 which needs to be obtained. Accordingly, an LMF based solution may be a superior solution to support commercial location for 5G, particularly, where multiple locations of a target UE 105 are desired. An LMF based solution, however, may not align with the current EPC location solution for LTE access or the AMF based solution defined for emergency calls for 5G wireless access.

From an efficiency perspective, and as described previously, there may be little difference between an AMF based solution and an LMF based solution for a single location of a target UE using an MT-LR, MO-LR or NI-LR. Therefore, an AMF based solution may be used to support a single location of a target UE 105 for a commercial application as efficiency may not be degraded, and the solution may be consistent with the current EPC location solution for LTE access in 3GPP TS 23.271 as well as aligning with the selected solution for emergency calls in 5G.

With respect to periodic and triggered location, e.g., for commercial applications, and as described previously, an LMF based solution may be superior to an AMF based solution, as it may minimize the number of participating Network Functions (NFs) for each location event report for a target UE 105 and the number of reference points over which a location event report may need to be sent, thereby improving efficiency. Since location event reports are likely to consume the bulk of overall resource utilization for periodic or triggered location requests, optimization of this portion of a procedure using aspects of an LMF based solution may be desirable, whereas a portion of a procedure concerned with initiating a location request and activating a location request in a target UE 105, being performed once only, may be less in need of optimization and may therefore retain aspects of an AMF based solution. Accordingly, to retain consistency with the current EPC location solution and the AMF based location solution defined for support of emergency calls for 5G wireless access, a location solution for periodic and triggered location may combine elements of an LMF based solution which support efficient reporting of location events with elements of an AMF based solution which support the establishment of a location session with the target UE 105. The resulting location solution is referred to here as a "combined AMF and LMF based solution" (or as a "combined AMF and LMF solution", "combined AMF and LMF location solution" or "combined AMF and LMF based location solution"). The solution may be used to support periodic location of a target UE 105 and triggered location of a target UE 105 (e.g. for trigger events such as entry, exit or remaining within a certain target area by a target UE 105 or movement of a target UE 105 by more than a threshold straight line distance). The resulting location solution may also be used to support location of a target UE 105 when the UE 105 first becomes available (or reachable) from a 5G network. These types of location are commonly referred to as "deferred location" of a target UE 105 because the location(s) typically occurs some time (e.g. a few minutes or a few hours) after a location request is sent by an external client 130 and is thus not a current location at the time the location request occurs. The combined AMF and LMF based solution is further described below herein.

The combined AMF and LMF location solution, at a high level, uses elements from an AMF based solution to initiate and establish a deferred (e.g. periodic and triggered) location session and elements of an LMF based solution to obtain and report individual location events. The combined AMF and LMF location solution may be fully compatible with both the AMF based solution defined for location of a UE with an emergency call and with a commercial AMF based solution for a single UE location.

Figure 2:
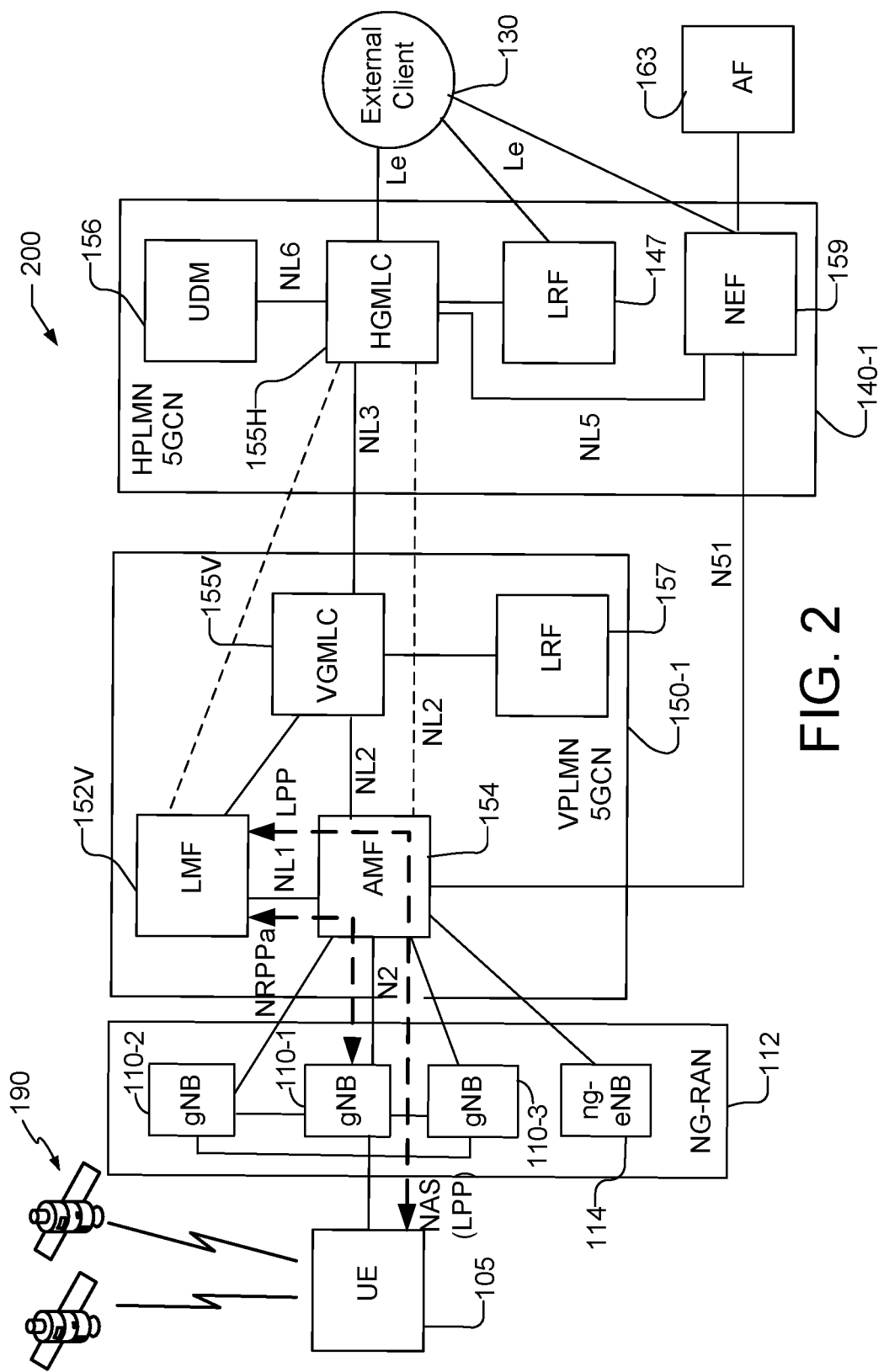
FIG. 2 is a simplified block diagram illustrating a communication system for roaming support of UE location using a combined AMF and LMF based location solution.

FIG. 2 illustrates a communication system 200 that is similar to the communication system 100 shown in FIG. 1, but supports location for a roaming UE 105. Similar to communication system 100, communication system 200 may provide roaming support for an AMF based location solution, an LMF based location solution and the combined AMF and LMF based location solution.

In the communication system 200, the core network 5GCN 150-1 that is in communication with the UE 105 via the NG-RAN 112 is a visited network, i.e., Visited Public Land Mobile Network (VPLMN), which is in communication with a home network 5GCN, i.e., Home Public Land Mobile Network (HPLMN) 140-1. In communication system 200, the VPLMN 5GCN 150-1 includes the Location Management Function (LMF) 152V. Except as discussed below, the LMF 152V performs the same functions and operations as LMF 152 in the non-roaming communication system of FIG. 1, but is designated as LMF 152V to indicate that it is located in a visited network for UE 105. The VPLMN 5GCN 150-1 also includes a Visited Gateway Mobile Location Center (VGMLC) 155V, which is similar to the GMLC 155 in the non-roaming communication system of FIG. 1, and is designated as 155V to indicate that it is located in the visited network for UE 105. As illustrated in FIG. 2, the VGMLC 155V connects to the AMF 154, the LMF 152V and to the LRF 157 in the VPLMN 5GCN 150-1.

As illustrated, HPLMN 5GCN 140-1 may include a Home GMLC (HGMLC) 155H that may be connected to the VGMLC 155V (e.g., via the Internet). Optionally (and as shown by the dashed lines in FIG. 2), HGMLC 155H may be connected to AMF 154 and/or to the LMF 152V (e.g. via the Internet) and may in that case not always be connected to VGMLC 155V. The HGMLC 155H may be similar to the GMLC 155 in the non-roaming communication system of FIG. 1, and is designated as 155H to indicate that it located in the home network for UE 105. The VGMLC 155V and HGMLC 155H may be sometimes collectively and generically referred to herein as GMLC 155. The HGMLC 155H is in communication with the external client 130, as well as the UDM 156 and LRF 147 in the HPLMN 140-1. The LRF 147 may also communicate with the external client 130 and may perform similar functions to LRF 157. The HGMLC 155H may provide location access to UE 105 on behalf of external clients such as external client 130. One or more of HGMLC 155H and LRF 147 may be connected to external client 130, e.g., through another network, such as the Internet. In some cases, a Requesting GMLC (RGMLC) located in another PLMN (not shown in FIG. 2) may be connected to HGMLC 155H (e.g., via the Internet) in order to provide location access to UE 105 on behalf of external clients connected to the RGMLC. HPLMN 5GCN 140-1 also includes NEF 159 which may correspond to NEF 159 in communication system 100 and may be connected to HGMLC 155H, AMF 154 and/or AF 163.

It is noted that the abbreviations HGMLC and H-GMLC herein both refer to a Home GMLC. Similarly, the abbreviations VGMLC and V-GMLC herein both refer to a visited GMLC.

Figure 3:
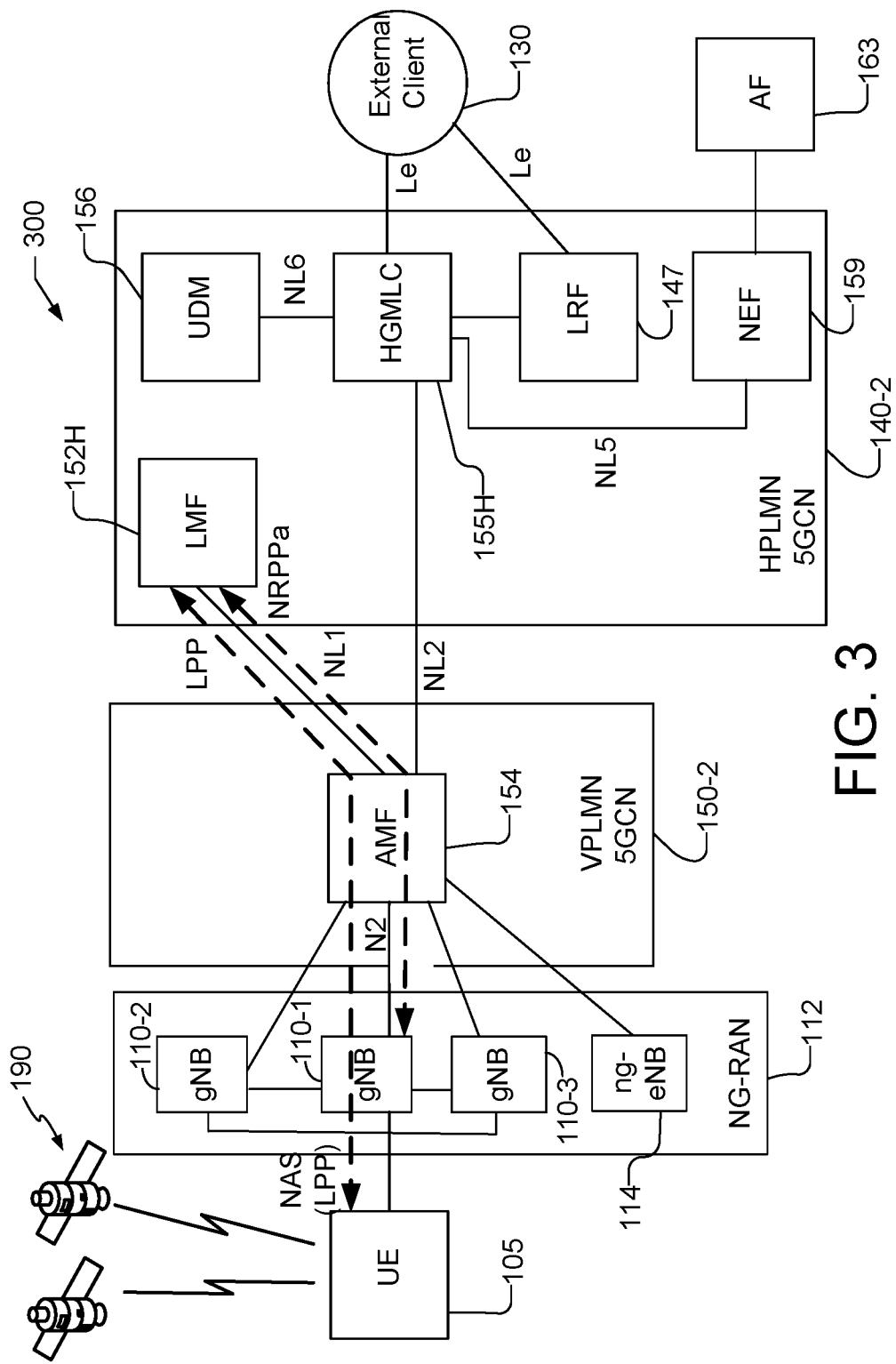
FIG. 3 is a simplified block diagram illustrating another communication system for roaming support of UE location using a combined AMF and LMF based location solution.

FIG. 3 illustrates another communication system 300 that is similar to the communication system 200 shown in FIG. 2 and provides alternative location support for a roaming UE 105. Similar to communication systems 100 and 200, communication system 300 may provide roaming support for an AMF based location solution, an LMF based location solution and the combined AMF and LMF based location solution.

In the communication system 300, however, the LMF 152H is located in the HPLMN 5GCN 140-2 as opposed to the VPLMN 5GCN 150-2. The HGMLC 155H may select the LMF 152H in the HPLMN 5GCN 140-2 and may provide the address of the LMF 152H to the AMF 154 in the VPLMN 5GCN 150-2 in the case of an AMF based location solution or the combined AMF and LMF location solution. The LMF 152H may perform the same or similar functions and operations as LMF 152 in the non-roaming communication system 100 of FIG. 1 and LMF 152V in the roaming communication system 200, but is designated as LMF 152H to indicate that it is located in the home network for UE 105. The LMF 152, 152V and 152H may be sometimes collectively and generically referred to herein as LMF 152. As illustrated in FIG. 3, the HGMLC 155H connects to LMF 152H. The HGMLC 155H and the LMF 152H also connect to the AMF 154 that is in the VPLMN 5GCN 150-2 (e.g. via the Internet). The HGMLC 155H also connects to the UDM 156, the LRF 147 and the NEF 159 in the HPLMN 140-2 and provides access on behalf of the external client 130.

The interfaces (also referred to as reference points) labelled as Le, N2, Nm (where m is a number) and NLn (where n is a number) in FIGS. 1-3 may be interfaces (or reference points) that support control plane signaling and may be associated with control plane protocols that are used over one or more of the interfaces (or reference points) to support the control plane signaling. For example, control plane protocols based on HTTP and supporting service based operations may be used between AMF 154 and a GMLC 155 over an NL2 interface, and between LMF 152 and AMF 154 over an NL1 interface. Similarly, a NAS control plane protocol may be used between AMF 154 and UE 105 on an N1 interface, a CP NG Application Protocol (NGAP) may be used between AMF 154 and a gNB 110 or ng-eNB 114 over an N2 interface, a CP LPP or NPP protocol may be used between UE 105 and LMF 152, and a CP supplementary services protocol (SSP, e.g. as defined in 3GPP TS 24.080) may be used between UE 105 and LMF 152 and/or between UE 105 and AMF 154.

As noted, while the communication systems 100, 200, and 300 are described in relation to 5G technology, the communication systems may be implemented to support other communication technologies, such as GSM, WCDMA, LTE, WiFi IEEE 802.11 etc., that are used for supporting and interacting with mobile devices such as the UE 105 (e.g., to implement voice, data, positioning, and other functionalities). For example, in some embodiments, 5GCN 150, 150-1 and/or 150-2 may be connected to a WLAN using a Non-3GPP Interworking Function (N3IWF, not shown FIGS. 1-3) in the 5GCN 150. For example, the WLAN may support IEEE 802.11 WiFi access for UE 105. Here, the N3IWF may connect to the WLAN and to other elements in the 5GCN 150 such as AMF 154. The combined AMF and LMF location solution described herein may then operate the same as or similarly to that described further down with the difference that an LMF 152 may no longer interact with NG-RAN 112 to obtain location related information for UE 105 and may instead interact with UE 105 by sending and receiving LPP and/or NPP messages with UE 105 via the N3IWF and WLAN.

In other embodiments, the 5GCN cores 140-1 and 140-2 (collectively referred to as 5GCN 140) and 150, 150-1, 150-2 (collectively referred to as 5GCN 150) may be configured to control different air interfaces, such as the Evolved Universal Terrestrial Radio Access Network (E-UTRAN) comprising one or more evolved NodeBs (eNBs) in place of the gNBs 110. In some other embodiments, both the NG-RAN 112 and the 5GCN 140, 150 may be replaced by other RANs and other core networks. For example, in an Evolved Packet System (EPS) defined by 3GPP to support LTE access: the UE 105 may access the EPS rather than the NG-RAN 112 and 5GCN 140/150; the NG-RAN 112 may be replaced by an E-UTRAN containing eNBs in place of the gNBs 110 and ng-eNB 114; and the 5GCN 140/150 may be replaced by an Evolved Packet Core (EPC) comprising a Mobility Management Entity (MME) in place of the AMF 154, an Enhanced Serving Mobile Location Center (E-SMLC) in place of the LMF 152 and a GMLC that may be similar or identical to a GMLC 155. In such an EPS, the E-SMLC may use LPPa in place of NRPPa to send and receive location information to and from the eNBs in the E-UTRAN and may use LPP to support positioning of UE 105. In addition, in some implementations, base stations (e.g. similar to or based on a gNB 110 or ng-eNB 114) may function as positioning only beacons and transmit signals (e.g. PRS) to assist positioning of a UE 105 but not receive signals. An EPS, as just described, may be used to help support the combined AMF and LMF based location solution, e.g. as described below for FIG. 11 to support mobility of UE 105 between 5GS and EPS.

The use of the combined AMF and LMF location solution may avoid undesirable restrictions and limitations for an AMF based solution. For example, one limitation for the AMF based solution may be that the AMF 154 is used as an anchor point for location support and is required to maintain state information for location sessions. Consequently, a location session for a target UE 105 may need to be aborted following any inter-AMF handover or inter-AMF cell change for the UE 105. Moreover, using the AMF 154 as an anchor point for location support and requiring that AMF 154 to maintain state information may present a significant impact to the AMF 154 in terms of resource usage (e.g. processing and signaling) and/or implementation. Another limitation for an AMF based location solution may be that some CP interfaces used by the AMF based solution may not be capable of being removed by combining entities that perform similar functions (e.g. such as combining the LMF 152 and a GMLC 155 in the same 5GCN 150). Combining entities could reduce complexity, but may not be possible in all cases with an AMF based solution. Additionally, in an AMF location solution, location access from an HPLMN (e.g. HPLMN 5GCN 140) may require inclusion of an LMF (e.g. LMF 152V) in a VPLMN (e.g. VPLMN 5GCN 150) and not allow inclusion of an LMF (e.g. LMF 152H) in the HPLMN which may add to impacts for the VPLMN. Consequently, customized HPLMN support for location (e.g. based on special requirements for a UE 105 or external client 130) may be limited, since the LMF 152V that is used to locate a UE 105 is in a VPLMN 150 and may not be under the control of the HPLMN 140. Further, support of periodic or triggered location of a UE 105 by an AMF based location solution may require the UE 105 and an AMF 154 to support supplementary services signaling and procedures (e.g. to enable a Mobile Originated Location Request (MO-LR) to be used by a UE 105 to report periodic or triggered locations as defined for LTE access in 3GPP TS 23.271), which may add additional complexity to the UE 105 and AMF 154.

As illustrated later in FIG. 9, the combined AMF and LMF location solution may differ from an AMF based location solution and other location solutions in that the LMF 152 may generally serve as an anchor point for location of a UE 105. One advantage of this may be that a location session for UE 105 may not need to be aborted following an inter-AMF handover or inter-AMF cell change for the UE 105 because the same LMF 152 may be used as an anchor point for location of the UE 105 both before and after the handover or cell change, and may thus continue to support the location session. In addition, since the AMF 154 is no longer the anchor point for location support (except when a location session is first established), state information in the AMF 154 may not be needed and resource usage (e.g. processing and signaling) and/or implementation impacts may be reduced. As another advantage, an LMF 152 may be combined with a GMLC 155 in the same 5GCN 150 or same 5GCN 140 to reduce complexity—e.g. by avoiding a need to support an interface between the LMF 152 and GMLC 155. Additionally, the LMF 152H can be in the HPLMN 5GCN 140 in the case of a roaming UE 105, as illustrated in FIG. 3, if an external client 130 accesses the HPLMN 5GCN 140 rather than the VPLMN 5GCN 150. This may have several advantages including (i) allowing location support in the HPLMN 5GCN 140 more customized to a UE 105 and/or external client 130 subscription requirements, and (ii) avoiding the need to support an NL3 interface between HGMLC 155H and VGMLC 155V. However, when an external client 130 accesses the VPLMN 5GCN 150 (e.g. for location of an emergency call), the LMF 152V in the VPLMN 5GCN 150 can be used, as illustrated in FIG. 2. Further, support of periodic or triggered location of a UE 105 may not require the AMF 154 to support supplementary services signaling and procedures (e.g. an MO-LR), which may reduce complexity for the AMF 154. These various advantages of the combined AMF and LMF location solution are illustrated in exemplary message flows below. Unless stated otherwise below, the exemplary procedures and techniques described below may be assumed to apply to the combined AMF and LMF location solution for one or more of the communication systems 100, 200 and 300.

Figure 4:
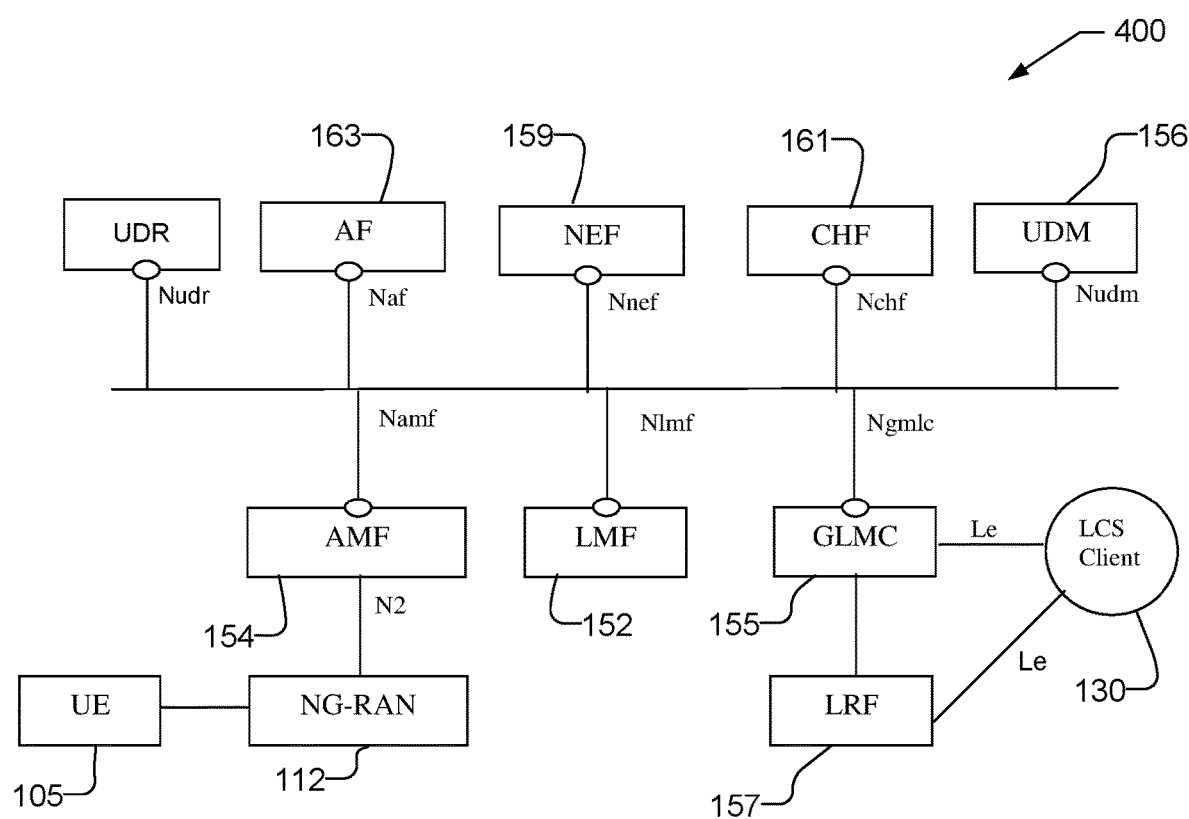
FIG. 4 illustrates an implementation of a non-roaming service based interface based architecture for UE location using a combined AMF and LMF based location solution.
Figure 5:
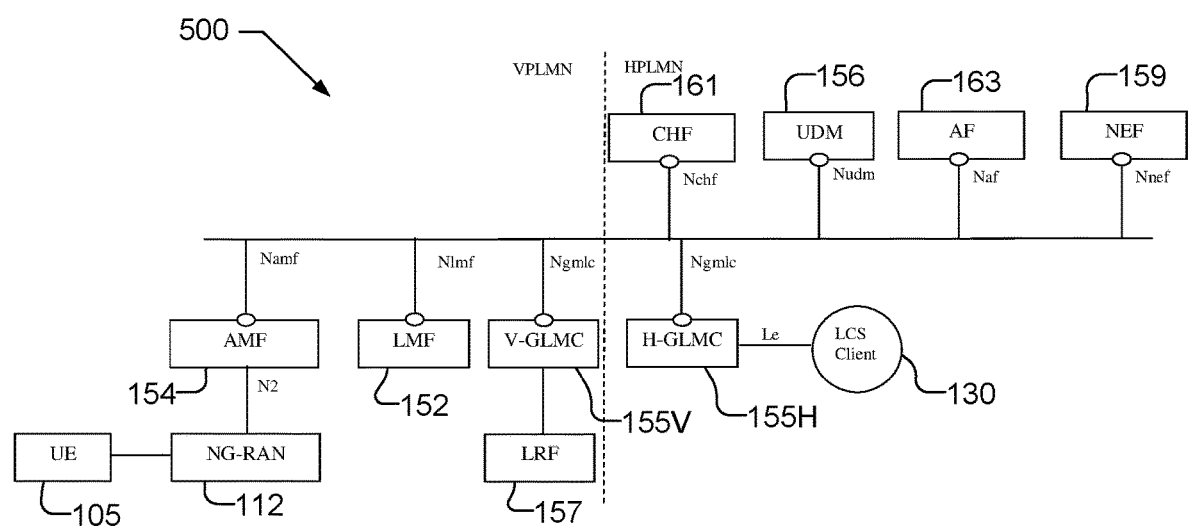
FIG. 5 illustrates an implementation of a roaming service based interface based architecture for UE location using a combined AMF and LMF based location solution.

The use of a service based interface (SBI) architecture for 5GCN may be desirable. FIG. 4 illustrates an implementation of a non-roaming SBI based architecture 400 for a combined AMF and LMF deferred location solution. FIG. 5 similarly illustrates an implementation of a roaming SBI based architecture 500 for a combined AMF and LMF deferred location solution. The non-roaming and roaming SBI based architectures 400 and 500 may also correspond to the non-roaming communication system 100 (shown in FIG. 1) and the roaming communication system 200 (shown in FIG. 2), respectively, with like designated elements being the same. As illustrated in FIGS. 4 and 5, service-based interfaces for location services are identified as Ngmlc for the service-based interface exhibited by a GMLC (e.g. GMLC 155, VGMLC 155V, and HGMLC 155H), Nlmf for the service-based interface exhibited by an LMF (e.g. LMF 152), Nudm for the service-based interface exhibited by a UDM (e.g. UDM 156), and Namf for the service-based interface exhibited by an AMF (e.g. AMF 154).

For the combined AMF and LMF location solution, reference points shown in FIGS. 1-5 that are not realized by service based interfaces may include, e.g., N1 (a reference point between UE 105 and AMF 154 via NAS); N2 (a reference point between NG-RAN 112 and AMF 154); and Le (a reference point between a GMLC 155 and a LCS Client 130 (e.g. based on the Open Mobile Alliance (OMA) Mobile Location Protocol (MLP))). Reference points shown in FIGS. 1-5 that are realized by service based interfaces (and that may be used by the combined AMF and LMF location solution) may include NL3 (a reference point between a GMLC 155 and an AMF 154); a reference point between a GMLC 155 and an LMF 152; NL1 (a reference point between AMF 154 and LMF 152); NL5 (a reference point between a GMLC 155 and NEF 159); and NL6 (reference point between a GMLC 155 and UDM 156).

The combined AMF and LMF based solution may use certain service operations already defined by 3GPP for the Namf and Nudm service based interfaces to support location of emergency calls. For the Nlmf service based interface (i.e. LMF SBI), three new service operations may be added as shown in Table 1.

TABLE 1

Nlmf Service Operations

| Service Name | Service Operation | Operation Semantics | Example Consumer |
|---|---|---|---|
| Nlmf_EventNotify | Report a UE location related event | Notify | GMLC |
| Nlmf_CancelLocation | Cancel an ongoing periodic or triggered location | Request | AMF |
| Nlmf_LocationContextTransfer | Transfer an ongoing periodic or triggered location to a new anchor LMF | Request | LMF |

For example, HTTP based protocols defined in 3GPP TS 29.572 to support LMF service operations for an AMF based location solution may be extended and used to support the new LMF service operations as summarized in Table 1.

Figure 6:
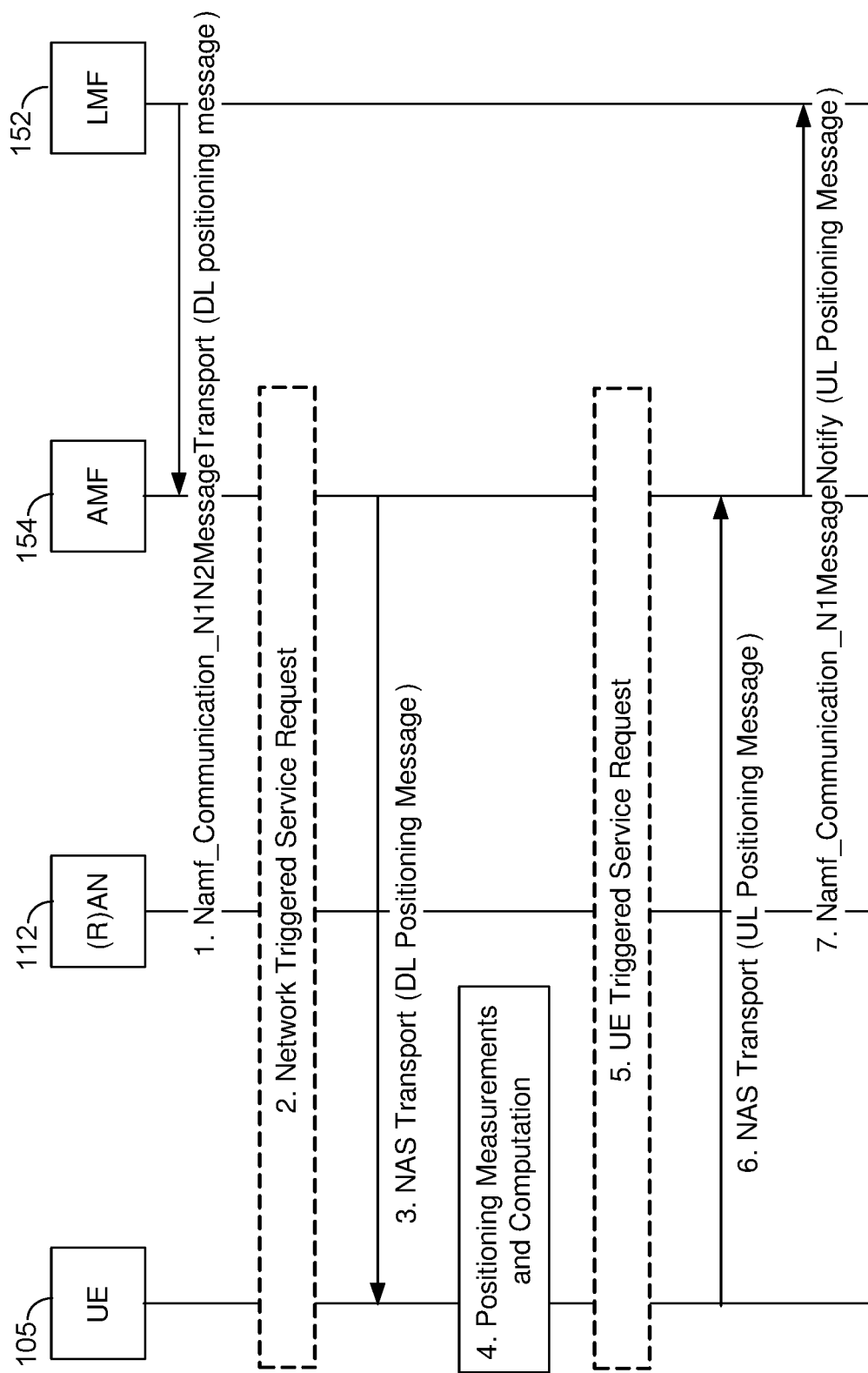
FIG. 6 shows a positioning procedure used by an LMF to support UE based positioning, UE assisted positioning and delivery of assistance data.
Figure 7:
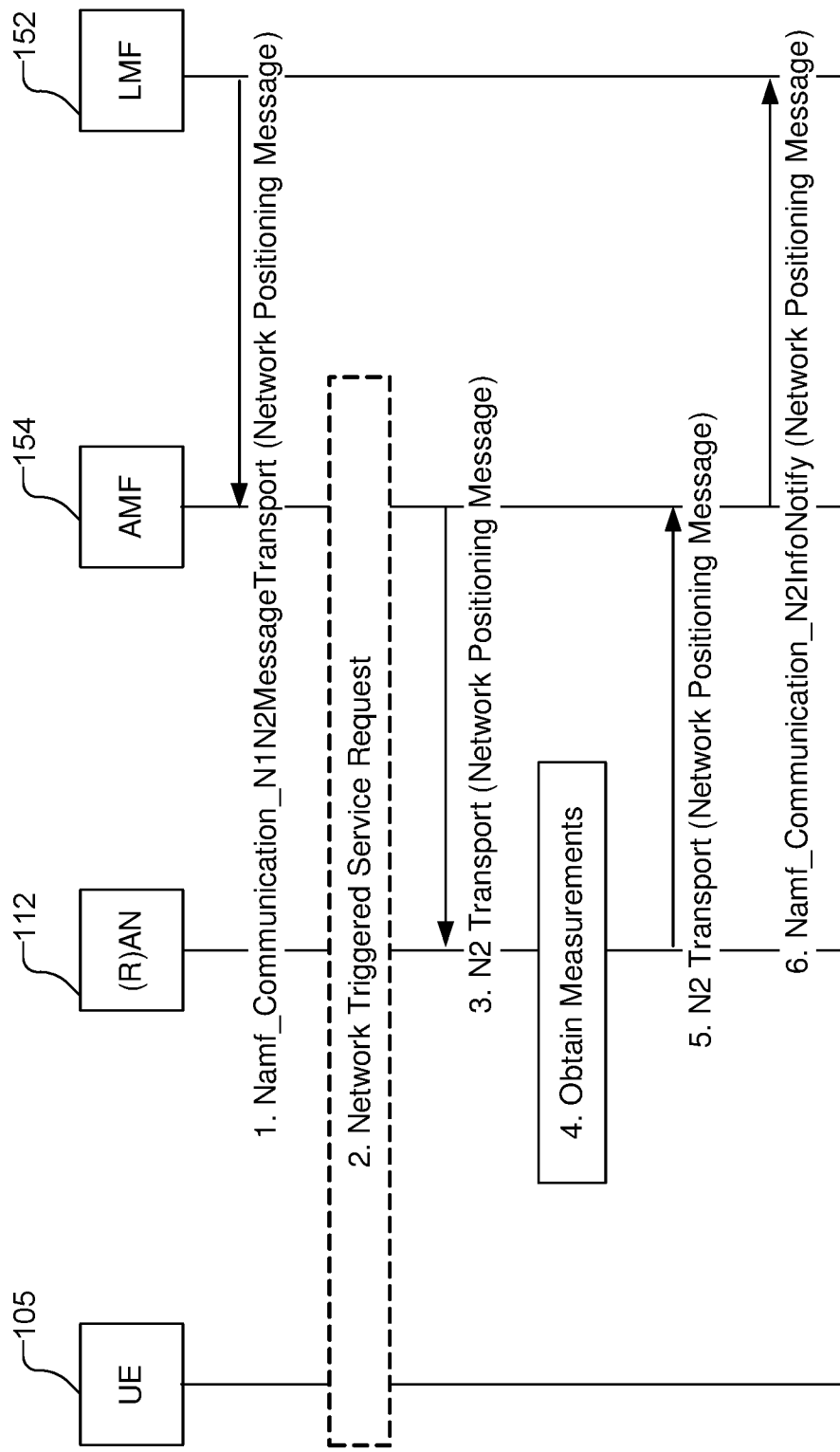
FIG. 7 shows a procedure that may be used by an LMF to support network assisted and network based positioning.
Figure 8:
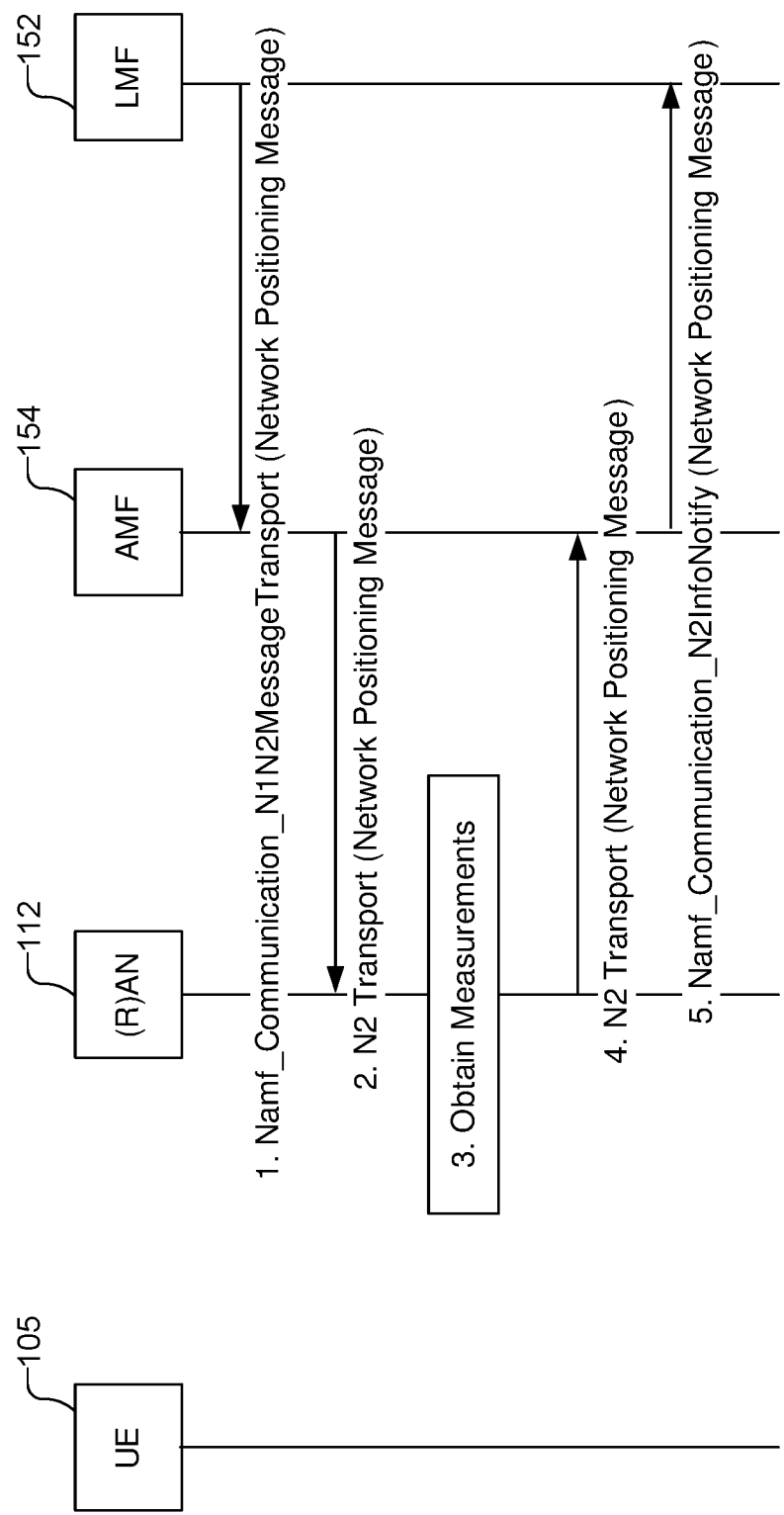
FIG. 8 shows a procedure which may be used by an LMF to obtain location related information from a base station.

FIGS. 6-10, described below, provide exemplary details concerning the operation of the combined AMF and LMF based location solution. For a single location request for a target UE 105, the solution can operate exactly the same as an AMF based location solution—e.g. as described in 3GPP TS 23.502 and TS 23.273 in the case of an NI-LR or MT-LR. For a deferred location request for a target UE 105 (e.g. for periodic or triggered location of the target UE 105 or location of the target UE 105 after the UE 105 becomes available), the solution can operate as described below for FIGS. 9 and 10. FIGS. 6-8 provide exemplary operational details for the combined AMF and LMF based solution which may also be common to an AMF based solution and an LMF based solution. It is noted that in FIGS. 6-10, the communication systems 100, 200 and/or 300 and the SBI architectures shown in FIGS. 4-5 are generally assumed in the description of procedures for locating or helping to locate a target UE 105.

FIG. 6 shows a positioning procedure, referred to here as a UE assisted and UE based positioning procedure, used by an LMF 152 to support UE based positioning, UE assisted positioning and delivery of assistance data. The procedure is based on use of the LPP protocol, defined in 3GPP TS 36.355, "LTE Positioning Protocol (LPP)", between the LMF 152 and UE 105, though could instead be NPP, MRPP or LPP combined with NPP. A precondition for the procedure can be that a UE 105 identifier, an AMF 154 identity and optionally a correlation identity (ID) have been passed to the LMF 152 by the serving AMF 154. The UE identifier may be a Subscription Permanent Identifier (SUPI), a Generic Public Subscription Identifier (GPSI) or a 5G Temporary Mobile Subscription Identifier (5G-TMSI). The UE identifier, AMF 154 identity and optionally the correlation ID may be passed when the AMF 154 informs the LMF 152 of a location request as in stage 14 of FIG. 9, below, or when the AMF 154 transfers a location event report to the LMF 152, as at stage 25 in FIG. 9. If a correlation ID is passed by AMF 154 to LMF 152, AMF 154 stores the correlation ID in association with a UE identifier for UE 105 (e.g. a GPSI or SUPI) and an identity or identifier for LMF 152. It is noted that the terms identity, identifier and address can be the same and are used interchangeably herein.

At stage 1 in FIG. 6, the LMF 152 invokes the Namf_Communication_N1N2MessageTransport service operation towards the AMF 154 to request the transfer of a Downlink (DL) Positioning message (e.g. LPP message) to the UE 105. The service operation includes the DL Positioning message and the UE 105 identifier or the correlation ID (if received by the LMF 152). The Downlink Positioning message may request location information from the UE 105, provide assistance data to the UE 105 or query for the UE 105 capabilities.

At stage 2, if the UE 105 is in a Connection Management (CM) IDLE state, the AMF 154 initiates a network triggered Service Request procedure as defined in 3GPP TS 23.502 to establish a signaling connection with the UE 105.

At stage 3, the AMF 154 forwards the Downlink Positioning message to the UE 105 in a NAS Transport message. The AMF 154 includes either a Routing identifier, in the NAS transport message, identifying the LMF 152 (e.g. a global address of the LMF 152 such as an IP address) or the correlation ID if received at stage 1.

At stage 4, the UE 105 stores any assistance data provided in the Downlink Positioning message and performs any positioning measurements and location computation requested by the Downlink Positioning message.

At stage 5, if the UE 105 is in CM IDLE state, the UE 105 instigates the UE triggered Service Request as defined in 3GPP TS 23.502 in order to establish a signaling connection with the AMF 154.

At stage 6, the UE 105 returns any location information obtained in stage 4 or returns any capabilities requested in stage 3 to the AMF 154 in an Uplink Positioning message (e.g. an LPP message) included in a NAS Transport message. The Uplink Positioning message may alternatively carry a request for further assistance data. The UE 105 also includes the Routing identifier or Correlation ID in the NAS Transport message received in stage 3.

At stage 7, the AMF 154 invokes the Namf_Communication_N1MessageNotify service operation towards the LMF indicated by the routing identifier or Correlation ID received in stage 6 (which in this example is LMF 152). The service operation includes the Uplink Positioning message received in stage 6 and the UE 105 identifier. Stages 6 and 7 may be repeated if the UE 105 needs to send multiple messages to respond to the request received in Stage 3. Stages 1 to 7 may be repeated to send new assistance data, and to request further location information and further UE capabilities.

FIG. 7 shows a procedure, referred to here as a network assisted positioning procedure, that may be used by an LMF 152 to support network assisted and network based positioning. The procedure may be based on an NRPPa protocol defined in 3GPP TS 38.455, "NR Positioning Protocol A (NRPPa)" between the LMF 152 and (R)AN 112. A precondition for the procedure can be that a UE 105 identifier, an AMF 154 identity and optionally a Correlation ID have been passed to the LMF 152 by the serving AMF 154, as described as a precondition for FIG. 6. The UE 105 identifier may be a SUPI, GPSI or a 5G-TMSI.

At stage 1 in FIG. 7, the LMF 152 invokes the Namf_Communication_N1N2MessageTransport service operation towards the AMF 154 to request the transfer of a Network Positioning message (e.g. an NRPPa message) to the serving base station (e.g. gNB 110 or ng-eNB 114) for the UE 105. The service operation includes the Network Positioning message and the UE 105 identifier or Correlation ID. The Network Positioning message may request location information for the UE 105 from the (R)AN 112.

At stage 2, if the UE 105 is in CM IDLE state, the AMF 154 initiates a network triggered Service Request procedure as defined in 3GPP TS 23.502, to establish a signaling connection with the UE 105.

At stage 3, the AMF 154 forwards the Network Positioning message to the serving base station (e.g. gNB 110-1) in an N2 Transport message. The AMF 154 includes a Routing identifier, in the N2 Transport message, identifying the LMF 152 (e.g. a local or global address of the LMF 152).

At stage 4, the serving base station obtains any location information for the UE 105 requested in stage 3.

At stage 5, the serving base station returns any location information obtained in stage 4 to the AMF 154 in a Network Positioning message (e.g. an NRPPa message) included in an N2 Transport message. The serving base station also includes the Routing identifier in the N2 Transport message received in stage 3.

At stage 6, the AMF 154 invokes the Namf_Communication_N2InfoNotify service operation towards the LMF 152 indicated by the routing identifier received in stage 5. The service operation includes the Network Positioning message received in stage 5 and the UE 105 identifier. Stages 1 to 6 may be repeated to request further location information and further (R)AN capabilities.

FIG. 8 shows a procedure for obtaining non-UE associated network assistance data, which may be used by an LMF 152 to support positioning of one or more UEs such as UE 105. This procedure may not be associated with a UE 105 location session. It may be used to obtain network assistance data from a base station (e.g. a gNB 110 or ng-eNB 114). The procedure may be based on an NRPPa protocol defined in 3GPP TS 38.455, "NR Positioning Protocol A (NRPPa)" between the LMF 152 and (R)AN 112.

At stage 1 in FIG. 8, the LMF 152 invokes the Namf_Communication_N1N2MessageTransport service operation towards the AMF 154 to request the transfer of a Network Positioning message (e.g. an NRPPa message) to a base station (e.g. a gNB 110 or ng-eNB 114) in the (R)AN 112. The service operation includes the Network Positioning message and the target base station identity. The Network Positioning message may request position related information from the (R)AN 112.

At stage 2, the AMF 154 forwards the Network Positioning message to the target base station indicated in stage 1 in an N2 Transport message. The AMF 154 includes a Routing identifier, in the N2 Transport message, identifying the LMF 152 (e.g. a local or global address of the LMF 152).

At stage 3, the target base station obtains any position related information requested in stage 2.

At stage 4, the target base station returns any position related information obtained in stage 3 to the AMF 154 in a Network Positioning message (e.g. an NRPPa message) included in an N2 Transport message. The target base station also includes the Routing identifier in the N2 Transport message received in stage 2.

At stage 5, the AMF 154 invokes the Namf_Communication_N2InfoNotify service operation towards the LMF 152 indicated by the routing identifier received in stage 4. The service operation includes the Network Positioning message received in stage 4 and possibly the target base station identity. Stages 1 to 5 may be repeated to request further position related information from the (R)AN 112.

Figure 9:
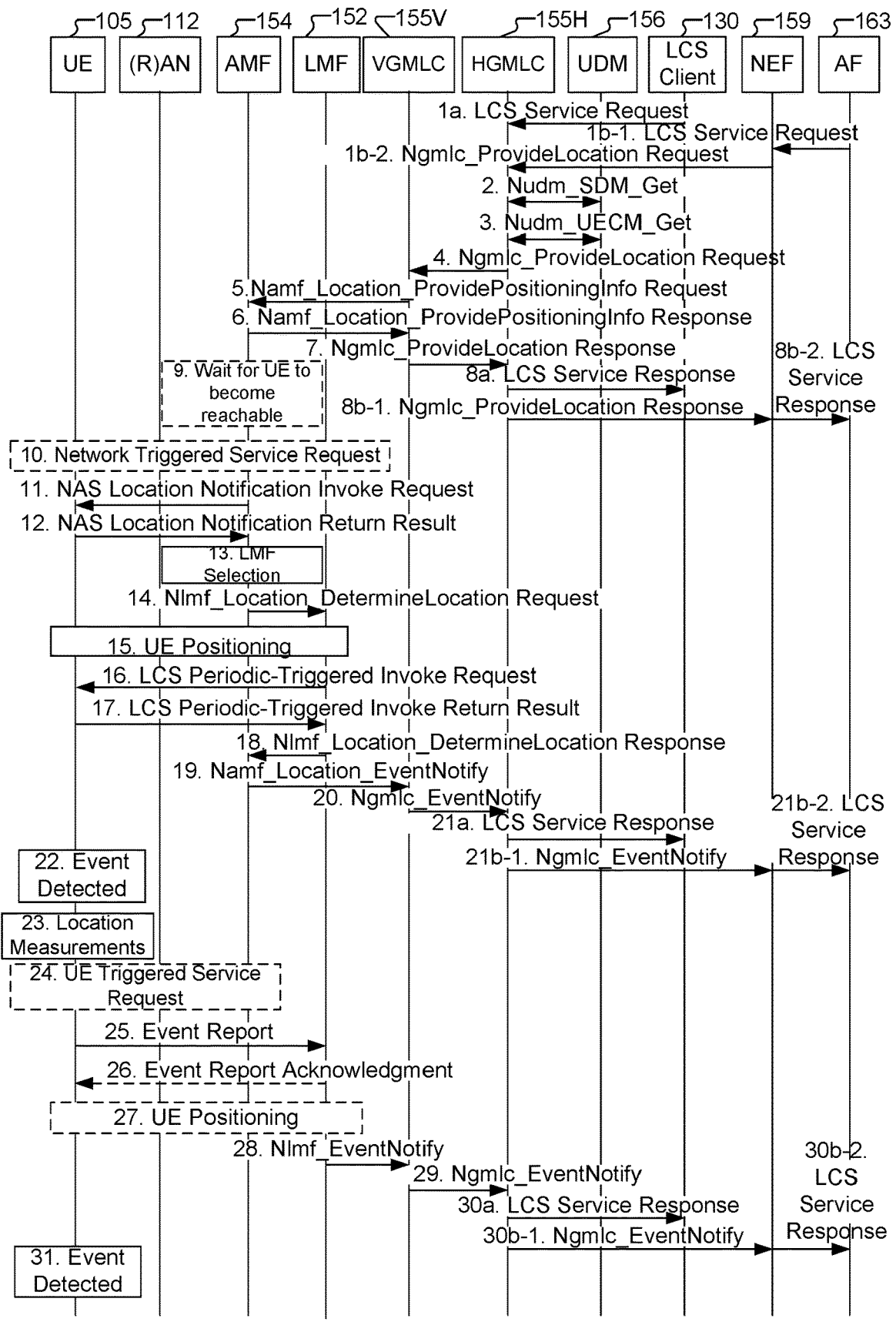
FIG. 9 shows a procedure for deferred UE location using a combined AMF and LMF based location solution.

FIG. 9 shows a deferred 5GC-MT-LR procedure for Periodic, Triggered and UE Available Location Events for a roaming or non-roaming UE 105, according to the combined AMF and LMF based location solution. The procedure exemplified in FIG. 9 can support mobility of the UE 105 within the VPLMN 5GCN 150-1 and from the 5GCN 150-1 to an EPC also belonging to the VPLMN 150-1. References to (H-)GMLC 155H in the description below may refer to HGMLC 155H when UE 105 is roaming as in communication system 200 in FIG. 2 or may refer to GMLC 155 when UE 105 is not roaming as in communication system 100 in FIG. 1.

At stage 1a of FIG. 9, the external location services client 130 or, at stage 1b in FIG. 9, the AF 163 (via NEF 159) sends a location request (also referred to as an LCS service request or LCS request) to the (H-)GMLC 155H for location reporting for UE 105 for periodic, triggered or UE available location events. As an alternative to stage 1a, at stage 1b-1 in FIG. 9, the AF 163 sends the LCS service request to the NEF 159. The NEF 159 then forwards the request to the (H-)GMLC 155H at stage 1b-2.

The location request sent at stage 1a or stage 1b (collectively referred to as stage 1) may include the target UE 105 identity which may be a GPSI or an SUPI. The location request may also include a required location Quality of Service (QoS) such a required location accuracy and/or indication of a response delay, supported Geographic Area Description (GAD) shapes and the LCS client 130 type. The (H-)GMLC 155 (for stage 1a) or the NEF 159 (for stage 1b) may authorize the external client 130 or the AF 163 for the usage of the LCS service. In some cases, the (H-)GMLC 155H may derive the GPSI or SUPI of the target UE 105 and possibly the QoS from either subscription data or other data supplied by the LCS client 130 or AF 163.

The LCS Service Request sent at stage 1 (which comprises stage 1a or stages 1b-1 and 1b-2) further provides the type of periodic or triggered location reporting being requested and associated parameters. For periodic location, the LCS Service Request includes the time interval between successive location reports, the total number of reports and may include location QoS. For area event reporting, the LCS Service Request includes details of the target area, whether the event to be reported is the UE 105 being inside, entering into or leaving the target area, a duration of event reporting, a minimum and a maximum time interval between successive event reports, a maximum event sampling interval, whether location estimates shall be included in event reports (and associated location QoS), and whether only one location report is required or more than one. If the target area is expressed by a local coordinate system or a geopolitical name, the (H-)GMLC 155H may convert the target area to a geographical area expressed by a shape as defined in 3GPP TS 23.032. For motion event reporting, the LCS Service Request includes a threshold linear distance, a duration of event reporting, a minimum and a maximum time interval between successive event reports, a maximum event sampling interval, whether location estimates shall be included in event reports (and associated location QoS), and whether only one location report is required or more than one.

At stage 2 in FIG. 9, the (H-)GMLC 155H may verify UE privacy requirements by querying the UDM 156. If the target UE 105 is not allowed to be located, subsequent stages are skipped.

At stage 3, the (H-)GMLC 155H invokes a Nudm_UECM_Get service operation towards the home UDM 156 of the target UE 105 and includes the GPSI or SUPI of the UE 105 to obtain the serving AMF 154 address and optionally a VGMLC 155 address and current access type(s) for the UE 105.

Stage 4 may be skipped for a non-roaming UE 105. At stage 4 for a roaming UE, the H-GMLC 155H obtains a V-GMLC 155V address if not received at stage 3 and invokes an Ngmlc_Provide Location Request service operation to forward the location request received at stage 1 to the V-GMLC 155V. The H-GMLC 155H also includes a contact address (referred to as an HGMLC contact address) for the H-GMLC 155H (e.g. Notification Target Address or a Uniform Resource Identifier (URI)) and a Location Deferred Request (LDR) reference number (also referred to as a Notification correlation ID) to be used for event reporting at stages 20 and 29. The HGMLC 155H may also include a requirement to notify the UE 105 of the location request and allow the UE 105 to accept or reject the location request.

At stage 5, the (H-)GMLC 155H or V-GMLC 155V invokes a Namf_Location_ProvidePositioningInfo Request service operation to forward the location request received at stage 1 (for non-roaming) or stage 4 (for roaming) to the serving AMF 154 for UE 105 and includes the HGMLC contact address and LDR reference number. The (H-)GMLC 155H or V-GMLC 155V may also include a requirement to notify the UE 105 of the location request and allow the UE 105 to accept or reject the location request (e.g. if received at stage 4).

At stages 6-8, if the AMF 154 supports a deferred location request, the AMF 154 returns an acknowledgment to the external LCS client 130, via the (H-)GMLC 155H and, in the case of roaming, the V-GMLC 155V, indicating that the request for deferred location was accepted. The V-GMLC 155V, when used, may optionally release resources for the deferred location request at this point.

At stage 9, if the UE 105 is not currently reachable (e.g. is using Discontinuous Reception (DRX) or Power Saving Mode (PSM)), the AMF 154 waits for the UE 105 to become reachable.

It should be noted that in the event of mobility of the UE 105 to another AMF or to EPC when the UE 105 becomes reachable, the old AMF 154 can return an event indication to the (H-)GMLC 155H as at stages 19 and 20 and may include the address of the new serving AMF or MME if known. If a new serving AMF or MME is not known, the (H-)GMLC 155H can repeat stage 3 to query the UDM 156 and/or Home Subscriber Server (HSS) for the new AMF or MME address. If a new AMF address is received, the (H-)GMLC 155H can restart the procedure from stage 4.

It should be noted that if the AMF 154 decides to cancel the location request before the UE 105 becomes reachable (e.g. due to lack of AMF 154 resources or due to a timeout on the UE 105 becoming reachable), the AMF 154 skips stages 10-18 and proceeds to stage 19 to return an indication of location cancelation to the V-GMLC 155V or (H-)GMLC 155H.

At stage 10, once the UE 105 is reachable, if the UE 105 is then in CM IDLE state, the AMF 154 initiates a network triggered Service Request procedure as defined in 3GPP TS 23.502 to establish a signaling connection with the UE 105.

At stages 11-12, the AMF 154 notifies the UE 105 of the location request and may allow the UE 105 to verify privacy requirements if required by the location request received at stage 5 and if supported by the UE 105. The AMF 154 includes in the notification to the UE 105 the type of deferred location request in the case of periodic or triggered location.

At stage 13, the AMF 154 selects an LMF 152. The selection may take into account the type of deferred location request (e.g. whether periodic or triggered) and any parameters for the deferred location request (e.g. the number of event reports required and/or the duration).

At stage 14, the AMF 154 invokes a Nlmf_Location_DetermineLocation Request service operation towards the LMF 152 to initiate a request for deferred UE location. For a request for periodic or triggered location, the service operation includes all the information received in stage 4 or stage 5 including the HGMLC contact address and LDR reference number. For a request for the UE available location event, the H-GMLC contact address and LDR reference number are not included. In all cases, the service operation includes an LCS Correlation identifier, an AMF 154 identifier, the serving cell identity, the external client 130 or AF 163 type and may include an indication as to whether UE 105 supports LPP, the required QoS and supported GAD shapes.

At stage 15, the LMF 152 may perform one or more of positioning procedures using the UE Assisted and UE Based Positioning Procedure as described for FIG. 6, the Network Assisted Positioning Procedure as described for FIG. 7, and/or the procedure for obtaining non-UE associated network assistance data as described for FIG. 8. During stage 15, the LMF 152 may request and obtain the UE 105 positioning capabilities (e.g. which may indicate the type(s) of periodic and triggered location supported by the UE 105 and the access types supported by the UE 105 for event reporting). The LMF 152 may also obtain the UE 105 location—e.g. for a request for the UE available location event or when an initial location is requested for periodic or triggered UE location. For a request for the UE available location event, the LMF 152 skips stages 16 and 17.

At stage 16, if periodic or triggered location was requested, the LMF 152 sends an LCS Periodic-Triggered Invoke Request to the UE 105 via the serving AMF 154 by invoking an Namf_Communication_N1N2MessageTransfer service operation. The LCS Periodic-Triggered Location Invoke carries the location request information received from the AMF 154 at stage 14, including the H-GMLC contact address and LDR reference number. The LCS Periodic-Triggered Location Invoke also includes a routing identifier, referred to as a deferred routing identifier, which can be the identification of the LMF 152 when the LMF 152 will act as an anchor LMF (also referred to as a "serving LMF") or a default LMF identification otherwise. The LCS Periodic-Triggered Location Invoke may indicate and optionally prioritize the allowed access types for event reporting at stage 25 (e.g. one or more of NR, LTE connected to 5GCN, LTE connected to EPC, non-3GPP access (e.g. WLAN) connected to 5GCN) and may indicate certain allowed or required location measurements (or a location estimate) at stage 23 for each location event reported (e.g. based on the positioning capabilities of the UE 105 obtained in stage 15 and the allowed access types). As part of NAS transport of the LCS Periodic-Triggered Location Invoke from the serving AMF 154 to the UE 105, the serving AMF 154 includes a second routing identifier, referred to as an immediate routing identifier, in the NAS transport message identifying the LMF 152.

It should be noted that the deferred routing identifier may be global (e.g. an IP address or URI) or may be local. The deferred routing identifier is used for routing in stage 25. However, the immediate routing identifier included by the AMF 154 in stage 15 is used for routing in stage 17. The two routing identifiers may or may not be the same—e.g. may be different when the deferred routing identifier is for a default LMF or a LMF which is different to the current LMF.

At stage 17, if the request in stage 16 can be supported, the UE 105 returns an acknowledgment to the LMF 152, which is transferred via the serving AMF 154 using the immediate routing identifier and delivered to the LMF 152 using an Namf_Communication_N1MessageNotify service operation.

It should be noted that the LCS Periodic-Triggered Location Request sent at stage 16 and its acknowledgment at stage 17 may be messages for a positioning protocol (e.g. LPP) or may be messages for a separate protocol (e.g. a supplementary services protocol). In the latter case, each message may carry an embedded positioning protocol message (e.g. an LPP message) to enable the LMF 152 to request or allow specific location measurements from the UE 105 at stage 23 and to set up an initial location session for the location reporting at stage 25.

At stage 18, the LMF 152 invokes a Nlmf_Location_DetermineLocation Response service operation towards the AMF 154 to respond to the request at stage 14. For a request for the UE available location event, the response includes any UE location obtained at stage 15 and the LMF 152 then releases all resources. For a periodic or triggered location request, the response includes any location obtained at stage 15, a confirmation of whether periodic or triggered location was successfully activated in the UE 105 according to stages 16 and 17 and the identification of the LMF 152 in the case of successful activation with a serving LMF. The LMF 152 also retains state information and resources for later stages if the LMF 152 acts a serving LMF. If the UE 105 cannot support the periodic and triggered location request, the service operation returned to the AMF 154 may include a suitable error cause.

At stage 19, the AMF 154 invokes an Namf_Location_EventNotify service operation towards the V-GMLC 155V for roaming, or (H-)GMLC 155H for non-roaming, and includes any location received at stage 18 and, for periodic or triggered location, a confirmation of whether or not periodic or triggered location was successfully activated in the target UE 105. The V-GMLC 155V, if used, may be the same V-GMLC 155V used in stages 5 and 6 or may be a different V-GMLC. In the case of a different V-GMLC 155V, the AMF 154 includes the H-GMLC contact address and LDR reference number. The AMF 154 also includes the LMF identification if received at stage 18. The AMF 154 may then release all resources for the location request and cease support for the procedure.

Stage 20 is skipped for a non-roaming UE 105. At stage 20, for a roaming UE 105, the V-GMLC 155V forwards the response received at stage 19 to the H-GMLC 155H using the H-GMLC contact address received at stage 19 (for a different V-GMLC 155V) or received and stored at stage 4 (for the same V-GMLC 155V) and includes the LDR reference number and any LMF identification that was received. The V-GMLC 155V may then release all resources for the location request and cease support for the procedure.

It should be noted that as an optional optimization for a roaming UE 105, instead of performing stages 19 and 20, the AMF 154 may invoke the Namf_Location_EventNotify service operation directly towards the H-GMLC 155H (e.g. if a V-GMLC 155V is not used or if the V-GMLC 155V ceases support after stage 7).

At stage 21, the (H-)GMLC 155H forwards the response to the external LCS client 130 or AF 163 (via the NEF 159). If the location request at stage 1 was for the UE available location event, the procedure terminates here and further stages 22-31 are not performed.

At stage 22, for a periodic or triggered location request where stages 16 and 17 were successfully performed, the UE 105 monitors for occurrence of the trigger event or periodic event requested in stage 16. For the area event or motion event, the UE 105 monitors for the requested event at intervals equal to or less than the maximum event sampling interval. An event trigger may be detected by the UE 105 when any of the following occur: (i) a requested area event or motion event has been detected and the minimum reporting time interval has elapsed since the last report (if this is not the first event report); (ii) a requested periodic location event has occurred; or (iii) the maximum reporting time for an area event or motion event has expired. When a trigger or periodic event is detected and if the UE 105 is camped on or connected to (or can otherwise access) an access type allowed by the LMF 152 at stage 16, the UE 105 proceeds to stage 23. If the UE 105 cannot access an allowed access type, the UE 105 may skip reporting the trigger event or may report the trigger event at a later time when an allowed access type becomes available, according to requirements received from the LMF 152 at stage 16.

At stage 23, the UE 105 obtains any location measurements or a location estimate that were requested or allowed at stage 16. Stage 23 may be skipped if no location measurements or location estimate were requested at stage 16.

It should be noted that obtaining a location estimate when requested can also apply to the trigger event corresponding to expiration of the maximum reporting interval for an area event or motion event.

At stage 24, the UE 105 performs a UE triggered service request as defined in 3GPP TS 23.502 if in CM IDLE state in order to establish a signaling connection with the AMF 154.

At stage 25, the UE 105 sends an event report message to the LMF 152 which is transferred via the serving AMF 154 (which may be different to the original serving AMF 154 for stages 14-16) and is delivered to the LMF 152 using an Namf_Communication_N1MessageNotify service operation. The event report may indicate the type of event being reported (e.g. whether a normal event or expiration of the maximum reporting interval) and includes any location measurements or location estimate obtained at stage 23. The UE 105 also includes the deferred routing identifier received at stage 16 in the NAS Transport message used to transfer the event report from the UE 105 to the AMF 154. The AMF 154 then forwards the event report to either the serving LMF 152 or any suitable LMF based on whether the deferred routing identifier indicates a particular LMF or any (default) LMF. The UE 105 also includes the H-GMLC contact address, the LDR reference number, whether location estimates are to be reported and if so the location QoS in the event report.

It should be noted that when forwarding the event report message to the LMF 152 at stage 25, the AMF 154 may not include an LCS Correlation Identifier (because the AMF 154 does not have an LCS Correlation Identifier). To allow the AMF 154 to be aware that an LCS Correlation Identifier is not needed, the deferred routing identifier sent by the LMF 152 at stage 16 and possibly reassigned at stage 26 (as described below) can indicate that an LCS Correlation Identifier is not used. For example, a deferred routing identifier could include a flag or could be selected from a different range of identifiers to the immediate routing identifier sent by the AMF 154 at stage 16.

At stage 26, when the LMF 152 receives the event report and if it can handle this event report, the LMF 152 returns an acknowledgment for the event report to the UE 105. The acknowledgment may optionally include a new deferred routing identifier indicating a new serving LMF or a default (any) LMF. If the UE 105 does not receive any response from the LMF 152 after a predefined time, the UE 105 may re-send the event report one or more times.

It should be noted that the event report and acknowledgment sent at stages 25 and 26 may be messages for a positioning protocol (e.g. LPP) or may be messages for a separate protocol (e.g. a supplementary services protocol). In the latter case, the event report at stage 25 may carry an embedded UL positioning message (e.g. an LPP message) to enable the UE 105 to include any location measurements or location estimate obtained at stage 23.

It should be noted that inclusion of a new deferred routing identifier in the event report acknowledgment at stage 26 may be used to change the serving LMF (e.g. if a UE 105 moves into an area or to an access type that is better supported by a different LMF or if the serving LMF 152 is overloaded) or to enable a default LMF to become a serving LMF.

At stage 27, if a location estimate is needed for event reporting, the LMF 152 may perform one or more positioning procedures using the UE Assisted and UE Based Positioning Procedure as described for FIG. 6, the Network Assisted Positioning Procedure as described for FIG. 7, and/or the procedure for obtaining non-UE associated network assistance data as described for FIG. 8. The LMF 152 then determines the UE location using the location measurements and/or location estimate(s) obtained at this stage and/or received at stage 25.

At stage 28, in the case of roaming, the LMF 152 selects a V-GMLC 155V (which may be different to the V-GMLC 155V for stages 4-7 and stages 19-20), The LMF 152 then invokes an Nlmf_EventNotify service operation towards the selected V-GMLC 155V or (H-)GMLC 155H (if UE 105 is not roaming) with an indication of the type of event being reported, the H-GMLC contact address and LDR reference number, the identification of the LMF 152 if this is a serving LMF, and any location estimate obtained at stage 27.

It should be noted that in the case of roaming by UE 105, the LMF 152 may select the V-GMLC 155V for stage 28 using a Network Repository Function (NRF) service or using configuration information in the LMF 152 or may use the same V-GMLC 155V as for stages 4-7 (e.g. if the LMF 152 acts as a serving LMF and received the V-GMLC 155V address from the AMF 154 as part of stage 14).

Stage 29 is skipped for a non-roaming UE 105. At stage 29, for a roaming UE 105, the V-GMLC 155V invokes an Ngmlc_EventNotify service operation to forward the information received in stage 28 (e.g. including the type of event being reported, the LDR reference number and possibly the LMF identification) to the H-GMLC 155H which identifies the periodic and triggered location request from the LDR reference number.

It should be noted that as an optional optimization for a roaming UE 105, instead of performing stages 28 and 29, the LMF 152 may invoke the Nlmf_EventNotify service operation directly towards the H-GMLC 155H.

At stage 30, the (H-)GMLC 155H uses the LDR reference number received in stage 28 or stage 29 to identify the periodic and triggered location request received in stage 1 and then sends the type of event being reported and any location estimate to the external LCS client 130 or AF 163 (via the NEF 159). The (H-)GMLC 155H may also verify UE privacy requirements before reporting the event and any location to the external LCS client 130 or AF 163.

At stage 31, the UE 105 continues to monitor for further periodic or trigger events as at stage 22 and instigates stages 23-30 each time a trigger event is detected.

In some implementations of communication systems 100, 200 and 300 in FIGS. 1-3, a location server (LS) may be included in NG-RAN 112, e.g. as part of a gNB 110 or separate from but connected to one or more gNBs 110. A location server in NG-RAN 112 may be referred to as a Location Management Component (LMC) or as a Local LMF. An LS in NG-RAN 112 may receive a location request for UE 105, e.g. from AMF 154 via a gNB 110. The LS in NG-RAN 112 may then initiate a location session with UE 105 to transfer assistance data to UE 105, obtain location measurements from UE 105 and/or obtain a location estimate, or a series of periodic or triggered location estimates, for UE 105. The techniques described herein to support deferred location of UE 105 using a combined AMF and LMF based solution may apply, at least in part, to an LS in NG-RAN 112. For example, the procedure described for FIG. 9 above may be applicable when LMF 152 in FIG. 9 is replaced by an LS in NG-RAN 112, with the difference that the signaling messages exchanged between UE 105 and the LS in the NG-RAN 112 for stages 15-17 and stages 25-27 of FIG. 9 may be exchanged via NG-RAN 112 but not via AMF 154, and the signaling messages exchanged between VGMLC 155V (or HGMLC 155H) and the LS in the NG-RAN 112 for stage 28 of FIG. 9 may be exchanged via AMF 154 (or some other AMF in 5GCN 150) and not exchanged directly as in FIG. 9.

Figure 10:
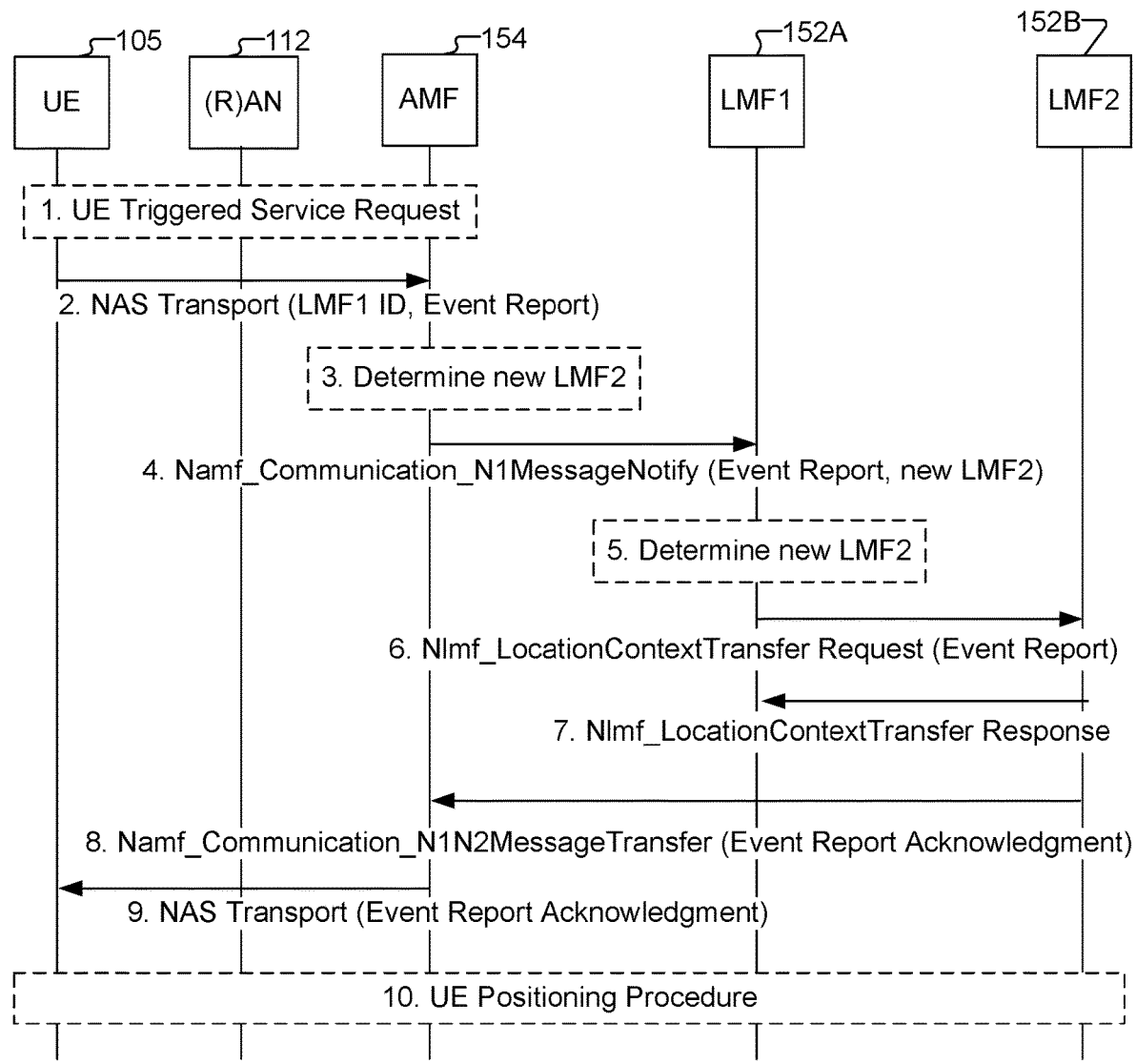
FIG. 10 shows a procedure for changing an anchor LMF for deferred UE location using a combined AMF and LMF based location solution.

FIG. 10 shows a procedure for when a serving LMF 152 is used for the procedure shown in FIG. 9 and mobility of the target UE 105 leads to a change of serving AMF 154 for which the original anchor LMF 152 is not suitable. For example, the anchor LMF 152 may be very remote from the AMF 154 leading to higher resource utilization for AMF 154 to LMF 152 signaling or the serving LMF 152 may not be configured with information (e.g., a cell database) for the current access network (e.g. serving and neighbor gNBs 110, ng-eNB 114 and/or a WLAN) for the UE 105 to enable location of UE 105. In such a case, the serving LMF 152 may need to change. FIG. 10 shows a procedure to enable change of the serving LMF 152 when a UE 105 sends an event report as at stage 25 in FIG. 9 at a time when the current serving LMF 152 for UE 105 is LMF1 152A in FIG. 10. As a precondition for the stages shown in FIG. 10, stages 1-23 in FIG. 9 may have already been performed and all of stages 22-30 may either not have been performed or have been performed or repeated.

At stage 1 in FIG. 10, the UE 105 performs a service request if needed as for stage 24 in FIG. 9.

At stage 2 in FIG. 10, the UE 105 sends a NAS Transport message containing an event report message to the serving AMF 154. The NAS Transport message includes a deferred routing identifier indicating LMF1 152A. Stage 2 may correspond to part of stage 25 for FIG. 9.

At stage 3, based on operator configuration and policy, AMF 154 may evaluate and determine that LMF1 152A is unsuitable or unable to support location for the current UE 105 access network or serving cell and determines LMF2 152B as being a more suitable LMF.

At stage 4, the AMF 154 invokes a Namf_Communication_N1MessageNotify service operation towards LMF1 152A. The service operation includes the event report received at stage 2. If AMF 154 determined at stage 3 that a new LMF2 152B should be used, an indication (e.g. an identity) of LMF2 152B is also included in the service operation.

At stage 5, if AMF 154 did not indicate a new LMF2 152B at stage 4, LMF1 152A determines that it is unsuitable or unable to support location for the current UE 105 access network or serving cell and determines LMF2 152B as being a more suitable LMF.

At stage 6, LMF1 152A invokes an Nlmf_LocationContextTransfer Request service operation towards LMF2 152B to provide the current location context of the UE 105 and includes the event report message received at stage 4. The service operation also includes the AMF 154 identity and all the information originally received by LMF1 152A for the periodic or triggered location request for UE 105 from either (i) the AMF 154 according to the procedure in FIG. 9 or (ii) an earlier anchor LMF according to this procedure. The service operation may also include the current status of event reporting (e.g. the number of event reports so far received from the UE 105 and/or the duration of event reporting so far) and may include location related information for the UE 105 such a previous location estimate or location measurements.

At stage 7, LMF2 152B informs LMF1 152A of successful receipt and acceptance of the location context transfer operation. LMF1 152A then discards all information for, and releases all resources for, the procedure At stage 8, LMF2 152B invokes an Namf_Communication_N1N2MessageTransfer service operation towards the AMF 154 to request the transfer of an Event Report Acknowledgment message to the UE 105. The Event Report Acknowledgment indicates a change of anchor LMF and includes a deferred routing identifier indicating the LMF2 152B.

At stage 9, the AMF 154 forwards the Event Report Acknowledgment to the UE 105 in a NAS Transport message.

At stage 10, if a location estimate for UE 105 is needed for event reporting, LMF2 152B may perform positioning of UE 105 and determines the UE 105 location as described for stage 27 in FIG. 9. The rest of the procedure in FIG. 9 may then continue from stage 28 in FIG. 9 with LMF2 152B retaining state information to enable support of subsequent event reports from UE 105.

Figure 11:
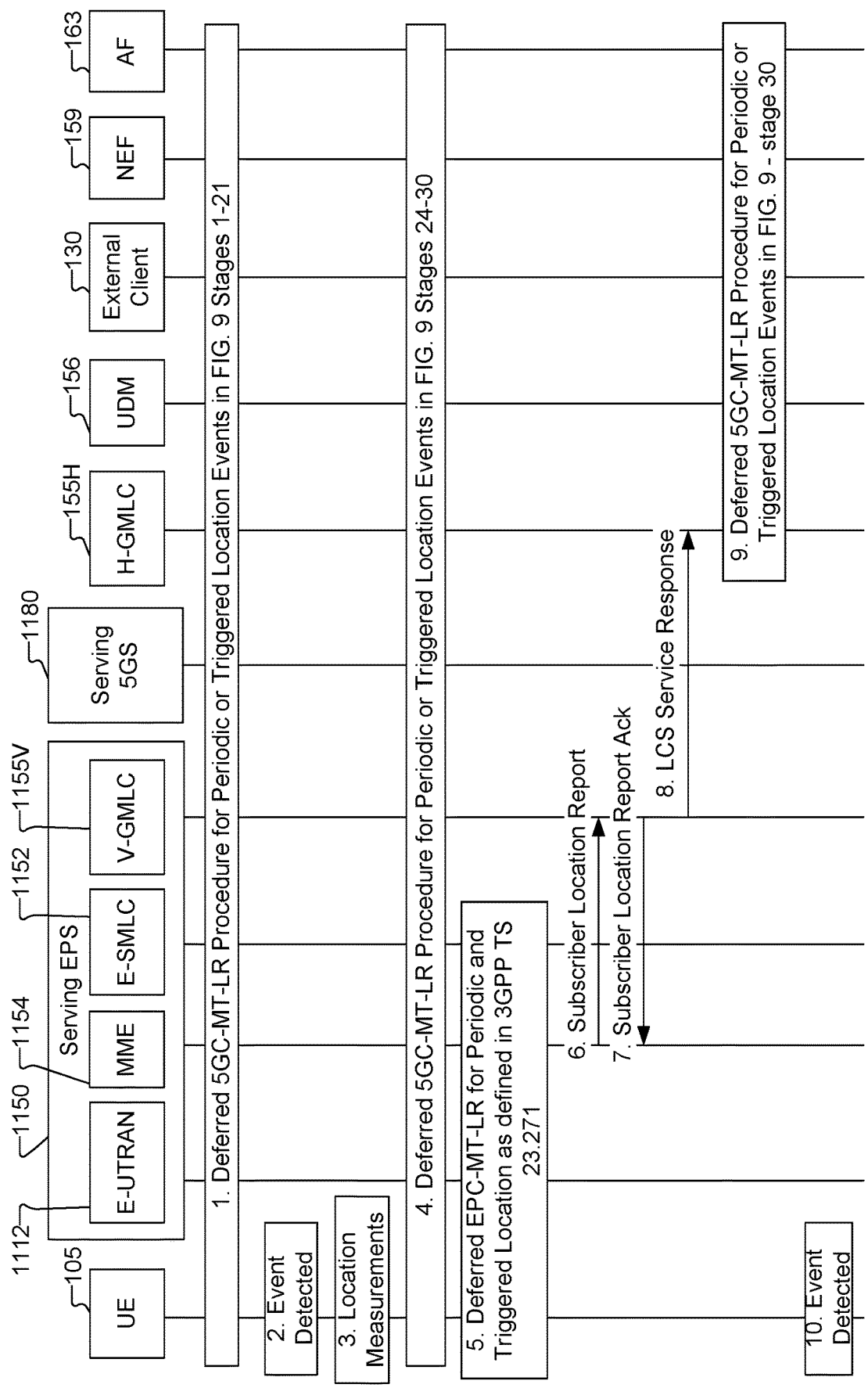
FIG. 11 shows a procedure for mobility of periodic or triggered location between a 5G system (5GS) and an Evolved Packet System (EPS).

FIG. 11 shows a procedure for mobility of periodic or triggered location for a UE 105 between a 5G system (5GS) and EPS. The procedure of FIG. 11 shows initiation and reporting of location events for a deferred 5GC-MT-LR for periodic or triggered location events, according to the combined AMF and LMF based location solution, in which event reporting is allowed using both 5GS and EPS. This procedure enables event reporting to continue in the presence of UE 105 mobility between 5GS and EPS. In FIG. 11, a serving EPS 1150 may be used in addition to or in place of a serving 5G system (5GS) 1180. The serving 5GS 1180 may correspond to NG-RAN 112 and 5GCN 150 in any of communication systems 100, 200 or 300 in FIGS. 1-3. The EPS 1150 may be as described earlier and may comprise: (i) an E-UTRAN 1112 containing eNBs, which may be used in place of NG-RAN 112 containing gNBs 110; and (ii) an EPC (not shown in FIG. 11) containing an MME 1154 which may be used in place of the AMF 154, an E-SMLC 1152 which may be used in place of the LMF 152, and a visited GMLC 1155V which may be similar to or identical to the VGMLC 155V.

At stage 1 in FIG. 11, stages 1-21 for the deferred 5GC-MT-LR procedure for periodic or triggered location events in FIG. 9, may be performed with the exception that at stage 16, the LCS Periodic-Triggered Location Invoke includes E-UTRAN (or LTE) connected to EPC in the allowed access types for event reporting and may include location measurements for E-UTRAN RAT dependent position methods (e.g. ECID for E-UTRAN or OTDOA for E-UTRAN) for each location event detected.

At stage 2 in FIG. 11, the UE 105 monitors for occurrence of a trigger or periodic event as described for stage 22 of FIG. 9. When a trigger or periodic event is detected and if the UE 105 is camped on or connected to (or can otherwise access) an access type allowed by the LMF 152 at stage 16 in FIG. 9, the UE 105 proceeds to stage 3 of FIG. 11.

At stage 3, the UE 105 obtains any location measurements or location estimate that were requested at stage 16 for FIG. 9 as described for stage 23 of FIG. 9. If the UE 105 can access a 5GS access type with equal or higher priority to E-UTRAN connected to EPC according to the allowed access types for stage 16 in FIG. 9 or if E-UTRAN connected to EPC is not available, the UE 105 proceeds to stage 4. Otherwise, if the UE can access E-UTRAN connected to EPC, the UE proceeds to stage 5.

At stage 4, the UE 105 reports the event using 5GS 1180 according to stages 24-30 of the deferred 5GC-MT-LR procedure for periodic or triggered location events in FIG. 9. Stages 5-9 of FIG. 11 are then skipped.

At stage 5, the UE 105 reports the event using E-UTRAN connected to EPC according to the procedure for a deferred EPC-MT-LR for Periodic and Triggered Location for EPS defined in 3GPP TS 23.271. With this procedure the following actions are performed: at action (i) the UE 105 obtains a signaling connection to the E-UTRAN 1112 and MME 1154 if the UE 105 does not yet have a signaling connection; at action (ii) the UE 105 sends an Mobile Originated Location Request (MO-LR) Invoke request to the MME 1154 via the E-UTRAN 1112 indicating an event report for a deferred periodic and triggered location request and includes the type of event being reported; at action (iii) if a location estimate is required, the MME 1154 requests location of the UE 105 from the E-SMLC 1152 which obtains a location of the UE 105 (e.g. using LPP and/or LPPa) and returns the location to the MME 1154; and at action (iv) the MME 1154 returns an MO-LR return result to the UE 105 to acknowledge the event report. It is noted that actions (i)-(iv) are not shown in FIG. 11, but may be as described in 3GPP TS 23.271, which is a publicly available document. In addition, at action (ii), the UE 105 may include in the MO-LR Invoke the LDR reference number, H-GMLC contact address, and any QoS and indication of whether a location estimate is required that were received from the LMF 152 in stage 16 in FIG. 9. The UE 105 may also include in the MO-LR Invoke any location estimate or location measurements obtained at stage 3 in FIG. 11. The H-GMLC contact address and LDR reference number for 5GS 1180 may be backward compatible with the corresponding parameters for the EPS 1150 or may be converted by UE 105 into parameters which are backward compatible with, or the same as, parameters used for a normal deferred EPC-MT-LR for Periodic and Triggered Location for EPS as defined in 3GPP TS 23.271.

At stage 6 in FIG. 11, the serving MME 1154 selects a V-GMLC 1155V in the same network in the case of roaming and sends a Subscriber Location Report to the V-GMLC 1155V for roaming or H-GMLC 155H for non-roaming (not explicitly shown in FIG. 11) with an indication of the type of event being reported, any location estimate obtained at action (iii) for stage 5 and other information received from the UE at action (ii) for stage 5.

At stage 7, the V-GMLC 1155V or H-GMLC 155H (not explicitly shown in FIG. 11) returns an acknowledgment to the MME 1554.

At stage 8, when the UE 105 is roaming, the V-GMLC 1155V forwards the information received in stage 6 to the H-GMLC 155H. Sending information to the H-GMLC 155H at stage 6 or stage 8 may use a protocol applicable to EPS 1150 and not 5GS 1180.

At stage 9, the H-GMLC 155H uses the LDR reference number received at stage 6 or stage 8 to identify the periodic and triggered location request and then sends the type of event being reported and any location estimate to the external LCS client 130 or AF 163 (via the NEF 159) as for stage 30 in FIG. 9.

At stage 10, the UE 105 continues to monitor for further periodic or trigger events as in stage 2 and instigates stage 3 and either stage 4 or stages 5-9 each time a trigger event is detected as described above.

The serving EPS 1150 in FIG. 11 may not maintain state information for the periodic or triggered location request for UE 105 (e.g. according to the procedure in 3GPP TS 23.271). This may allow the UE 105 to start and later stop event reporting using EPS without affecting the serving EPS 1150. For reporting via 5GS 1180 when a serving LMF 152 is used, the serving LMF 152 may maintain state information for the periodic or triggered location. However, the serving LMF 152 may assume that, when event reports are not received from the UE 105 at the expected periodicity for periodic reporting or following the maximum reporting time for triggered events, the UE 105 has no access to the serving 5GS 1180 and may be using EPS 1150 to return event reports.

Figure 12:
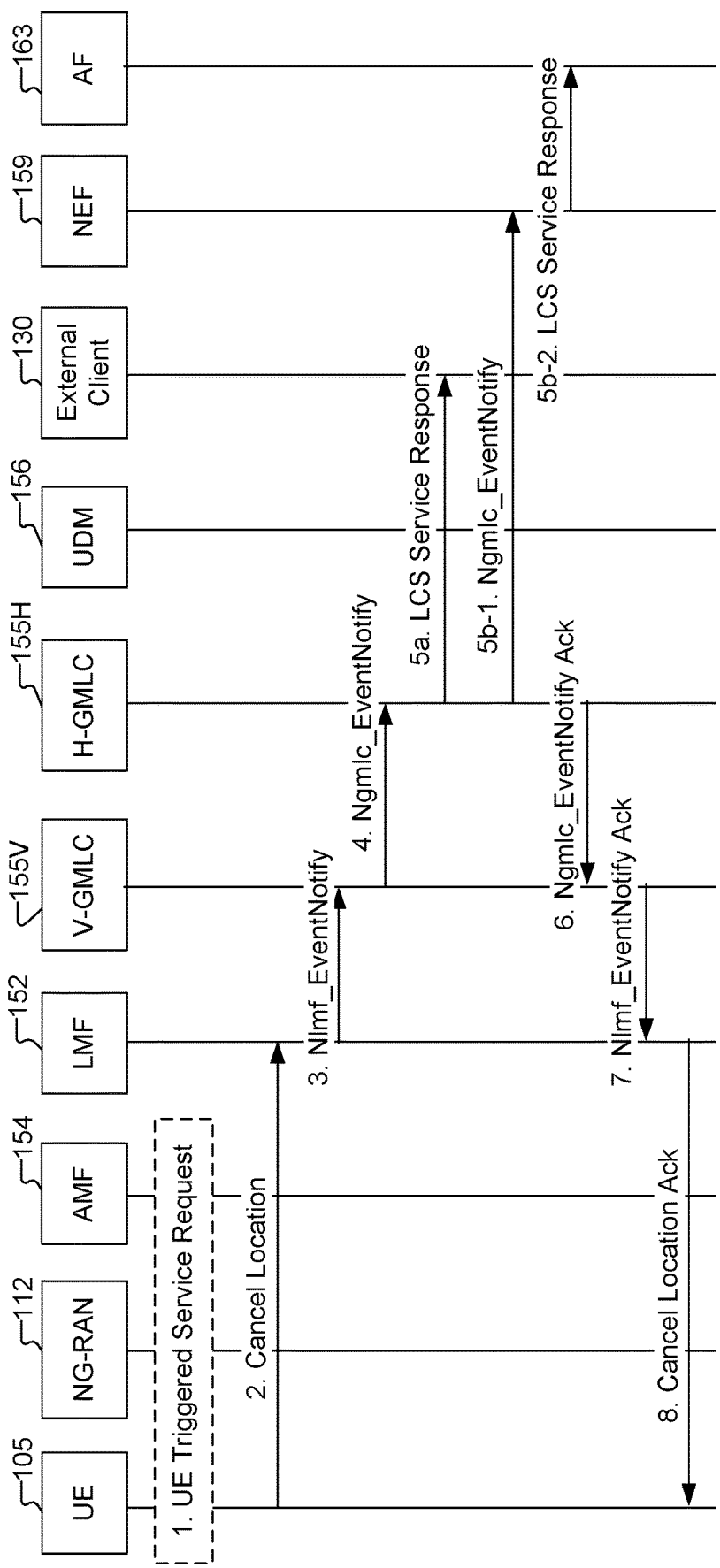
FIG. 12 shows a procedure for cancellation of a deferred periodic or triggered location by a UE.

FIG. 12 shows a procedure for cancellation of a deferred 5GC-MT-LR for periodic or triggered location events by a UE 105. The procedure of FIG. 12 enables a UE 105 to cancel a deferred 5GC-MT-LR procedure for periodic, or triggered location events (e.g., if the UE 105 is powered off or if the user of UE 105 wishes to cancel the location). It is assumed that a deferred 5GC-MT-LR for periodic or triggered location events has already been initiated in the UE 105, e.g., according to stages 1-17 for the procedure in FIG. 9. If a network entity (e.g. (H-)GMLC 155, AMF 154 or LMF 152) cancels a deferred 5GC-MT-LR procedure for periodic or triggered location events, part of the procedure shown in FIG. 13 below for cancellation by an AF 163 or external LCS Client 130 could be used to cancel towards the UE 105 and part of the procedure shown in FIG. 12 could be used to cancel towards the AF 163 or external LCS Client 130.

At stage 1 in FIG. 12, the UE 105 performs a UE triggered service request as defined in 3GPP TS 23.502 if in CM IDLE state in order to establish a signaling connection with the AMF 154.

At stage 2, the UE 105 sends a Cancel Location request message to the LMF 152 which is transferred via the serving AMF 154 and is delivered to the LMF 152 using an Namf_Communication_N1MessageNotify service operation. The UE 105 includes a deferred routing identifier originally received in stage 16 of the procedure in FIG. 9 (or as updated by stage 26 in FIG. 9 or by the procedure in FIG. 10) in the NAS Transport message used to transfer the cancel location request from the UE 105 to the AMF 154. The AMF 154 then forwards the cancel location request to either the serving LMF 152 or any suitable LMF 152 based on whether the deferred routing identifier indicates a particular LMF or any (default) LMF, respectively. The UE 105 also includes the H-GMLC contact address and the LDR reference number.

At stage 3, in the case of roaming, the LMF 152 selects a V-GMLC 155V. The LMF 152 then invokes an Nlmf_EventNotify service operation towards the selected V-GMLC 155V or (H-)GMLC 155 (if no V-GMLC 155V is selected) with an indication of the cancelation of location event reporting, the H-GMLC contact address and LDR reference number. In the case of roaming, the LMF 152 may select the V-GMLC 155V using an NRF service or using configuration information in the LMF 152 or may use the same V-GMLC 155V as for stages 4-7 of FIG. 9 (e.g. if the LMF 152 acts as a serving LMF and received the V-GMLC 155V address from the AMF 154 as part of stage 14 of FIG. 9).

Stage 4 is skipped for a non-roaming UE 105. At stage 4, for a roaming UE 105, the V-GMLC 155V invokes an Ngmlc_EventNotify service operation to forward the cancel location request (including the LDR reference number) to the H-GMLC 155H which identifies the periodic and triggered location request from the LDR reference number. For a roaming UE 105, instead of performing stages 3 and 4, the LMF 152 may invoke an Nlmf_EventNotify service operation directly towards the H-GMLC 155H.

At stage 5, including stages 5a, 5b-1 and 5b-2, the (H-)GMLC 155 uses the LDR reference number received in stage 3 or stage 4 to identify the periodic and triggered location request received in stage 1 of FIG. 9 and then forwards the cancel location to the external LCS client 130 or AF 163 (via the NEF 159).

At stage 6, for a roaming UE 105, the H-GMLC 155H returns an acknowledgment to the V-GMLC 155V.

At stage 7, the V-GMLC 155V or (H-)GMLC 155 returns an acknowledgment to the LMF 152.

At stage 8, the LMF 152 returns an acknowledgment to the UE 105 via the serving AMF 154.

Figure 13:
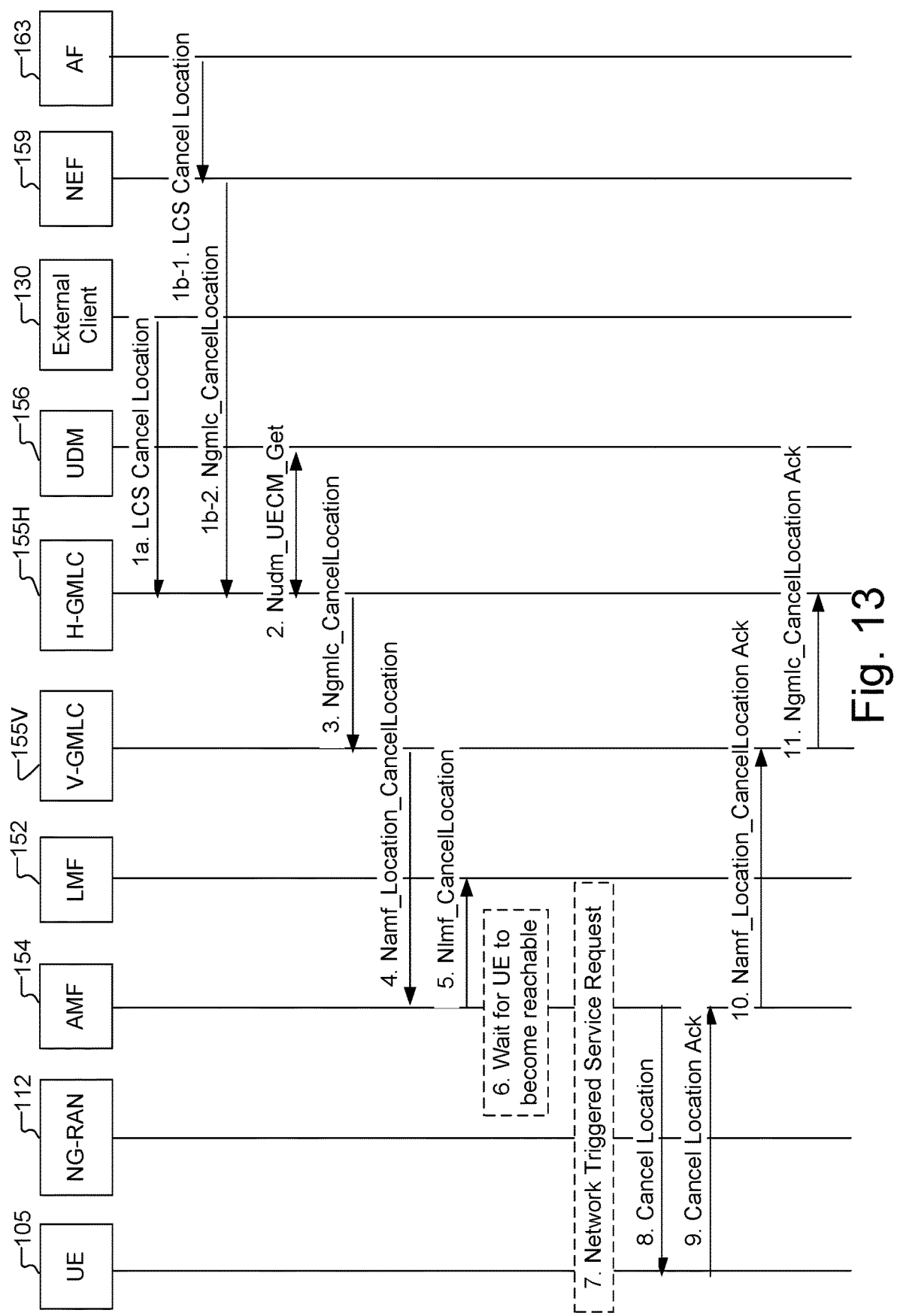
FIG. 13 shows a procedure for cancellation of a deferred periodic or triggered location by an Application Function (AF) or External Location Services (LCS) Client.

FIG. 13 shows a procedure for cancellation of a deferred 5GC-MT-LR for periodic or triggered location events by an AF or External LCS Client. The procedure of FIG. 13 enables an AF 163 or External LCS Client 130 to cancel a deferred 5GC-MT-LR procedure for periodic, or triggered location. It is assumed that a deferred 5GC-MT-LR for periodic or triggered location events has already been requested for a UE 105 according to the procedure in FIG. 9 up until at least stage 20 in FIG. 9.

At stage 1 in FIG. 13, including stages 1a, 1b-1, and 1b-2, the external LCS client 130 or AF 163 (via an NEF 159) sends a request to cancel the periodic or triggered location for UE 105 to the (H-)GMLC 155.

At stage 2, the (H-)GMLC 155H queries the UDM 156 to determine the serving AMF 154 address as in stage 3 of FIG. 9.

At stage 3, for a roaming UE 105, the H-GMLC 155H obtains a V-GMLC 155V address if not received at stage 2 and invokes an Ngmlc_CancelLocation service operation to forward the cancellation request to the V-GMLC 155V. The H-GMLC 155 also includes the H-GMLC contact address and the LDR reference number in the request and the latest LMF identification received at stage 20 or stage 29 in FIG. 9 if either stage has occurred and included an LMF identification.

At stage 4, the (H-)GMLC 155 or V-GMLC 155V invokes the Namf_Location_CancelLocation service operation to forward the cancellation request to the serving AMF 154 and includes the H-GMLC contact address, LDR reference number and LMF identification if available.

At stage 5, if an LMF identification was included in stage 4, the AMF 154 forwards the cancelation request to the indicated LMF 152 by invoking an Nlmf_CancelLocation service operation and includes the H-GMLC contact address and LDR reference number. The LMF 152 then ceases support for and releases all resources for the location request.

At stage 6, if the UE 105 is not currently reachable (e.g. is using DRX or PSM), the AMF 154 waits for the UE 105 to become reachable.

At stage 7, once the UE 105 is reachable, if the UE 105 is then in CM IDLE state, the AMF 154 initiates a network triggered Service Request procedure as defined in 3GPP TS 23.502 to establish a signaling connection with the UE.

At stage 8, the AMF 154 sends the cancelation request to the target UE 105 and includes the H-GMLC contact address and the LDR reference number. The UE 105 then ceases support for and releases all resources for the location request.

At stage 9, the UE 105 returns an acknowledgment to the AMF 154.

At stage 10, the AMF 154 returns an acknowledgment to the V-GMLC 155V or (H-)GMLC 155.

At stage 11, for a roaming UE 105, the V-GMLC 155V returns an acknowledgment to the H-GMLC 155H.

Figure 14:
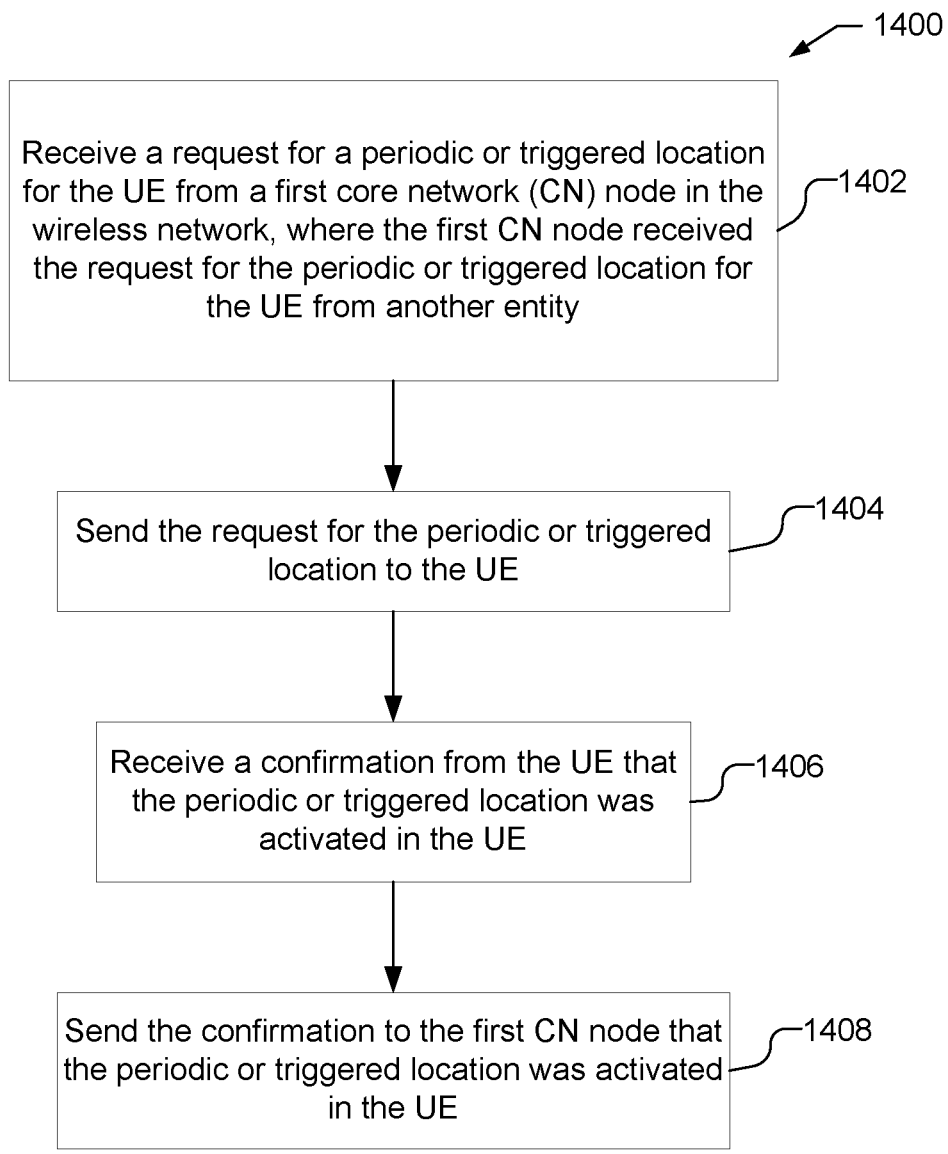
FIG. 14 shows a process flow illustrating a method for supporting deferred UE location using a combined AMF and LMF based location solution and performed by a location server.

FIG. 14 shows a process flow 1400 illustrating a method for supporting location services for a user equipment (UE), such as the UE 105, performed by a first location server, such as an LMF (e.g. LMF 152) according to the combined AMF and LMF location solution discussed above. Process flow 1400 may start at block 1402, where a first location server (e.g. an LMF 152) receives a request for a periodic or triggered location for the UE from a first core network (CN) node in the wireless network, where the first CN node received the request for the periodic or triggered location for the UE from another entity, e.g., as described at stage 14 in FIG. 9. At block 1404, the request for the periodic or triggered location is sent to the UE, e.g., as described at stage 16 in FIG. 9. In some implementations, the request for the periodic or triggered location sent to the UE at block 1404 may comprise an identification of the first location server, an identification of a default location server, and/or an identification of an other location server different from the first location server (e.g. as described for stage 16 in FIG. 9).

At block 1406, a confirmation is received from the UE that the periodic or triggered location was activated in the UE, e.g., as described at stage 17 in FIG. 9. At block 1408, the confirmation is sent to the first CN node that the periodic or triggered location was activated in the UE, e.g., as described at stage 18 in FIG. 9.

The CN node, the first location server and the other entity may be part of a Fifth Generation Core network (5GCN) and may be, e.g., an Access and Mobility Management Function (e.g. AMF 154), a Location Management Function (e.g. LMF 152) and a Gateway Mobile Location Center (e.g. GMLC 155V or GMLC 155H), respectively. In some embodiments, the other entity may be an HGMLC (e.g. HGMLC 155H) and the first CN node may receive the request for the periodic or triggered location for the UE from the other entity via a VGMLC (e.g. VGMLC 155V).

In some implementations, the method may further include the first location server retaining information for the periodic or triggered location request after sending the confirmation to the first CN node that the periodic or triggered location was activated in the UE, e.g., as described for stage 18 in FIG. 9. The first location server may receive a plurality of periodic or triggered location event reports (also referred to as a plurality of event reports) from the UE, wherein each of the plurality of periodic or triggered location event reports comprises at least one of location measurements, a location estimate, a type of detected triggering event, or a combination thereof, e.g., as described for stages 25 and 31 of FIG. 9. The first location server may send a plurality of corresponding periodic or triggered location event reports to the other entity, e.g., as described at stages 28 and 29 of FIG. 9. In these implementations, the method may further comprise including an indication of sending location event reports to the first location server in the request for the periodic or triggered location sent to the UE at block 1404 (e.g. as described for stage 16 in FIG. 9).

In some embodiments, the other entity may be an HGMLC (e.g. HGMLC 155H) and the first location server may send the plurality of corresponding periodic or triggered location event reports to the other entity via a VGMLC (e.g. VGMLC 155V).

In some implementations where the first location server receives a plurality of periodic or triggered location event reports from the UE, the method may further include: receiving a periodic or triggered location event report from the UE via a second CN node (e.g. as at stage 4 in FIG. 10); sending a location context to a second location server, where the location context comprises the periodic or triggered location event report and information for the request for the periodic or triggered location for the UE received from the first CN node (e.g. as at stage 6 in FIG. 10); and discarding information and releasing resources for the periodic or triggered location request after sending the location context to the second location server (e.g. as described for stage 7 in FIG. 10). In these implementations, the first location server may determine the second location server (e.g. as described for stage 5 of FIG. 10). For example, the second location server may be more suitable for the periodic or triggered location event report than the first location server. The second CN node may comprise the first CN node. The second location server may send the periodic or triggered location event report to the other entity either directly or via a VGMLC (e.g. VGMLC 155V).

In some implementations, the first location server may determine a location of the UE in response to receiving a periodic or triggered location event report from the UE, and may include the location in a corresponding periodic or triggered location event report sent to the other entity, e.g., as described at stages 27 and 28 of FIG. 9.

In some implementations, the plurality of periodic or triggered location event reports are received from the UE via a second CN node, which may be different to the first CN node, e.g., as discussed at stage 25 of FIG. 9.

In some implementations, the process may further include the first location server discarding information and releasing resources for the periodic or triggered location request after sending the confirmation to the first CN node that the periodic or triggered location was activated in the UE, e.g., as described at stage 18 of FIG. 9. In some implementations, the process may include the first location server including an indication of sending location event reports to any location server (or to a default location server) in the request for the periodic or triggered location sent to the UE, e.g., as described at stage 16 of FIG. 9.

In one implementation, the first location server may determine a location of the UE in response to receiving the request for the periodic or triggered location for the UE from the first CN node, and may include the location in the confirmation sent to the first CN node that the periodic or triggered location was activated in the UE, e.g., as described at stages 15 and 18 in FIG. 9.

Figure 15:
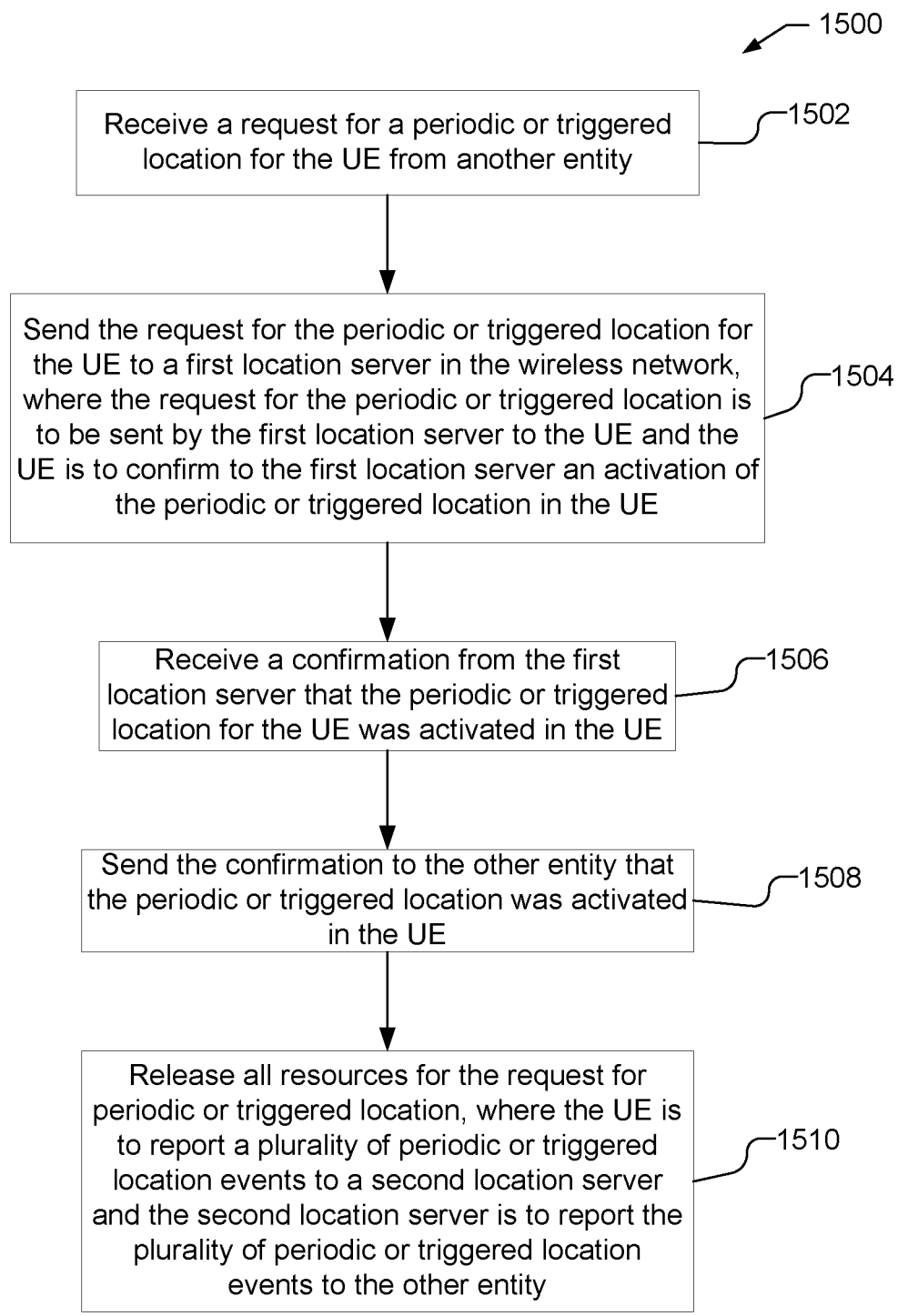
FIG. 15 shows a process flow illustrating a method for supporting deferred UE location using a combined AMF and LMF based location solution and performed by a core network (CN) node, such as an AMF.

FIG. 15 shows a process flow 1500 illustrating a method for supporting location services for a user equipment (UE), such as the UE 105, performed by a core network (CN) node, such as an AMF (e.g. AMF 154) according to the combined AMF and LMF location solution discussed above. Process flow 1500 may start at block 1502, where the CN node (e.g. an AMF 154) receives a request for a periodic or triggered location for the UE from another entity (e.g., GMLC 155, VGLMC 155V or HGMLC 155H), as discussed at stage 5 of FIG. 9.

At block 1504, the CN node sends the request for the periodic or triggered location for the UE to a first location server in the wireless network, where the request for the periodic or triggered location is to be sent by the first location server to the UE and the UE is to confirm to the first location server an activation of the periodic or triggered location in the UE, e.g., as discussed at stages 14, 16 and 17 of FIG. 9. At block 1506, the CN node receives a confirmation from the first location server that the periodic or triggered location for the UE was activated in the UE, e.g., as discussed at stage 18 of FIG. 9. At block 1508, the CN node sends the confirmation to the other entity that the periodic or triggered location was activated in the UE, e.g. as discussed at stage 19 of FIG. 9. At block 1510, the CN node releases all resources for the request for periodic or triggered location, where the UE is to report a plurality of periodic or triggered location events to a second location server and the second location server is to report the plurality of periodic or triggered location events to the other entity, e.g., as discussed at stages 19, 25 and 28 of FIG. 9.

The CN node, the first location server, the other entity, and the second location server may be part of a Fifth Generation Core network (5GCN) and may be an Access and Mobility Management Function (e.g. AMF 154), a Location Management Function (e.g. LMF 152), a Gateway Mobile Location Center (e.g. GMLC 155, GMLC 155V or GMLC 155H), and an LMF (e.g. LMF 152), respectively. In some implementations, the second location server may be the first location server, e.g. as described for stage 25 in FIG. 9.

In one embodiment, the other entity may be an HGMLC (e.g. HGMLC 155H) and the CN node may receive the request for the periodic or triggered location for the UE from the other entity via a VGMLC (e.g. VGMLC 155V). In this embodiment, the second location server may report the plurality of periodic or triggered location events to the other entity via a VGMLC (e.g. VGMLC 155V).

In one implementation, the CN node may return an acknowledgment to the other entity indicating that the request for the periodic or triggered location was accepted, e.g., as discussed at stage 6 of FIG. 9. The CN node may wait until the UE becomes reachable from the CN node before sending the request for the periodic or triggered location for the UE to the first location server, e.g., as discussed at stage 9 of FIG. 9.

In one implementation, the CN node may receive at least one of the plurality of periodic or triggered location events from the UE, and may forward the at least one of the plurality of periodic or triggered location events to the second location server, e.g., as discussed at stage 25 of FIG. 9. In some implementations, the at least one of the plurality of periodic or triggered location events may indicate the second location server, e.g., as discussed at stage 25 of FIG. 9. In some implementations, the at least one of the plurality of periodic or triggered location events does not indicate the second location server, and the CN node may determine the second location server, e.g., as discussed at stage 25 of FIG. 9.

In one implementation, the request for the periodic or triggered location received from the other entity may include a plurality of parameters and the CN node may include at least some of the plurality of parameters in the request for the periodic or triggered location sent to the first location server, e.g., as discussed at stages 4, 5 and 14 of FIG. 9. For example, the plurality of parameters may include a contact address for the other entity (e.g. an HGMLC contact address), a reference number (e.g. an LDR reference number), an indication of the first location server (e.g. an address or identifier for an LMF 152), a type of location reporting (e.g. periodic location reporting or triggered location reporting for an area event or motion event), a location Quality of Service (QoS), a maximum duration of event reporting, a maximum number of event reports, a request for location estimate inclusion in event reports, a minimum and/or a maximum time interval between successive event reports, a maximum event sampling interval, an indication of whether only one event report is required or more than one, or some combination of these. In some implementations, the plurality of parameters does not include an indication of the first location server, and the CN node may then determine the first location server, e.g., as discussed at stage 13 of FIG. 9.

Figure 16:
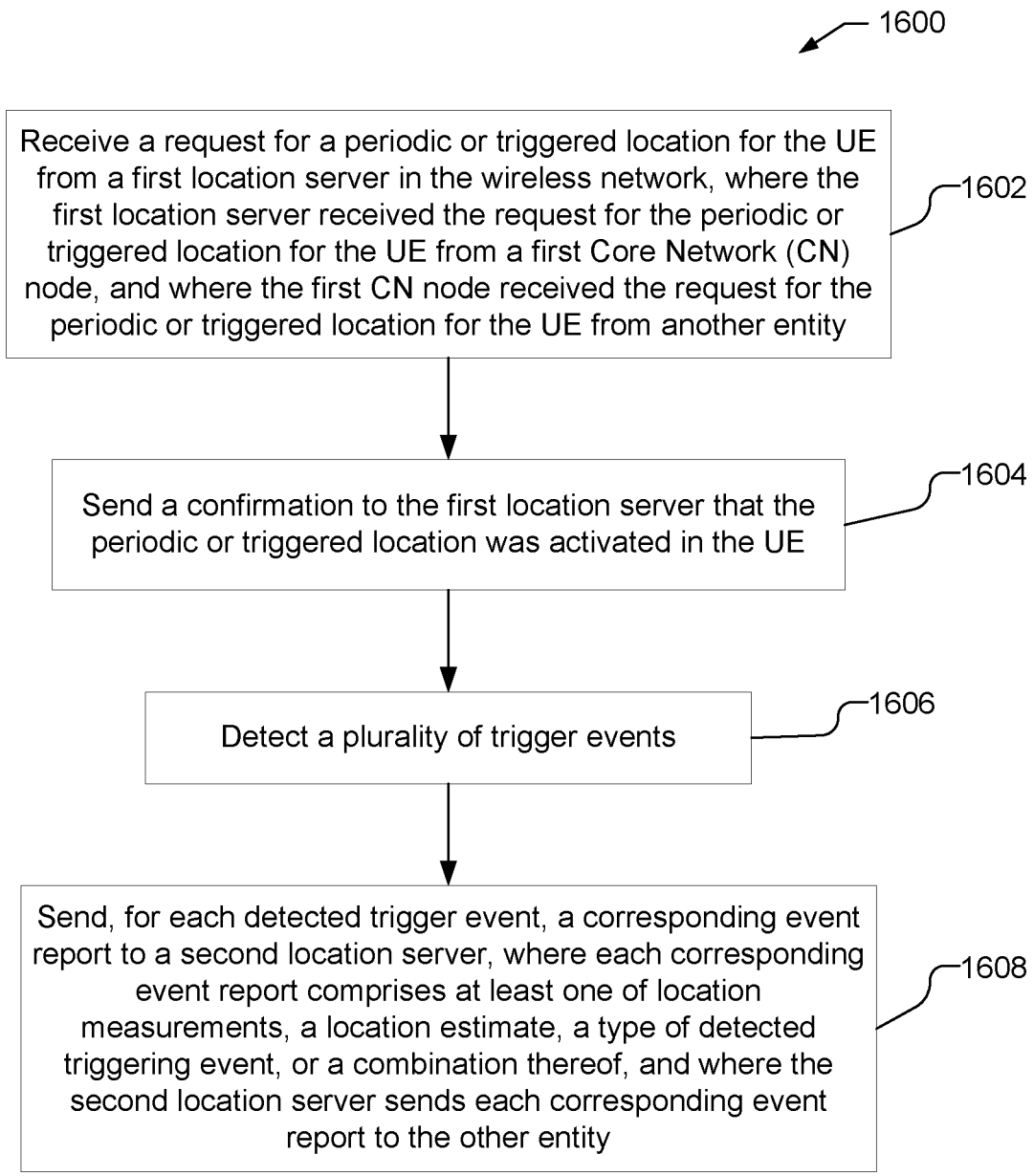
FIG. 16 shows a process flow illustrating a method for supporting deferred UE location using a combined AMF and LMF based location solution and performed by a UE.

FIG. 16 shows a process flow 1600 illustrating a method for supporting location services for a user equipment (UE) that is accessing a wireless network, such as the UE 105, performed by the UE according to the combined AMF and LMF location solution discussed above. Process flow 1600 may start at block 1602, where the UE receives a request for a periodic or triggered location for the UE from a first location server in the wireless network, where the first location server received the request for the periodic or triggered location for the UE from a first Core Network (CN) node, and where the first CN node received the request for the periodic or triggered location for the UE from another entity, as discussed at stages 5, 14, and 16 of FIG. 9.

At block 1604, the UE sends a confirmation to the first location server that the periodic or triggered location was activated in the UE, as discussed at stage 17 of FIG. 9. At block 1606, the UE detects a plurality of trigger events, as discussed at stages 22 and 31 of FIG. 9. At block 1608, the UE sends, for each detected trigger event, a corresponding event report (also referred to as a periodic or triggered location event report) to a second location server, where each corresponding event report comprises at least one of location measurements, a location estimate, a type of detected triggering event, or a combination thereof, and where the second location server sends each corresponding event report to the other entity, as discussed at stages 25 and 28 of FIG. 9.

In some implementations, the request for the periodic or triggered location received at block 1602 may comprise an identification of the first location server, an identification of a default location server or an identification of another location server different from the first location server (e.g. as described for stage 16 in FIG. 9).

The first CN node, the first location server, the other entity and the second location server may be part of a Fifth Generation Core network (5GCN), and may be an Access and Mobility Management Function (e.g. AMF 154), a Location Management Function (e.g. LMF 152), a Gateway Location Mobile Center (e.g. GMLC 155, VGMLC 155V or HGMLC 155H), and an LMF (e.g. LMF 152), respectively.

In one embodiment, the other entity may be an HGMLC (e.g. HGMLC 155H) and the first CN node may receive the request for the periodic or triggered location for the UE from the other entity via a VGMLC (e.g. VGMLC 155V). In this embodiment, the second location server may send each corresponding event report to the other entity via a VGMLC (e.g. VGMLC 155V).

In one implementation, the second location server may be the first location server, and the request for the periodic or triggered location received from the first location server at block 1602 may then indicate sending of event reports to the first location server, e.g., as discussed at stage 16 of FIG. 9. For example, the indication of sending of event reports to the first location server may comprise an identification or address for the first location server in the request for the periodic or triggered location received at block 1602.

In one implementation, the second location server may be different to the first location server, and the request for the periodic or triggered location received from the first location server may then indicate sending of event reports to any location server (e.g. a default location server), e.g., as discussed at stage 16 of FIG. 9. For example, the indication of sending of event reports to any location server may comprise an identification for a default location server in the request for the periodic or triggered location received at block 1602.

In one implementation, the request for the periodic or triggered location received from the first location server may include a contact address for the other entity (e.g. an HGMLC contact address) and a reference number (e.g. an LDR reference number), and the UE may include the contact address for the other entity and the reference number in each event report sent to the second location server, as discussed at stage 25 of FIG. 9.

In one implementation, the request for the periodic or triggered location for the UE is received from the first location server via the first CN node, where for at least some of the detected plurality of trigger events, a corresponding event report is sent to the second location server via a second CN node, where the second CN node is different to the first CN node, as discussed at stage 25 of FIG. 9.

Figure 17:
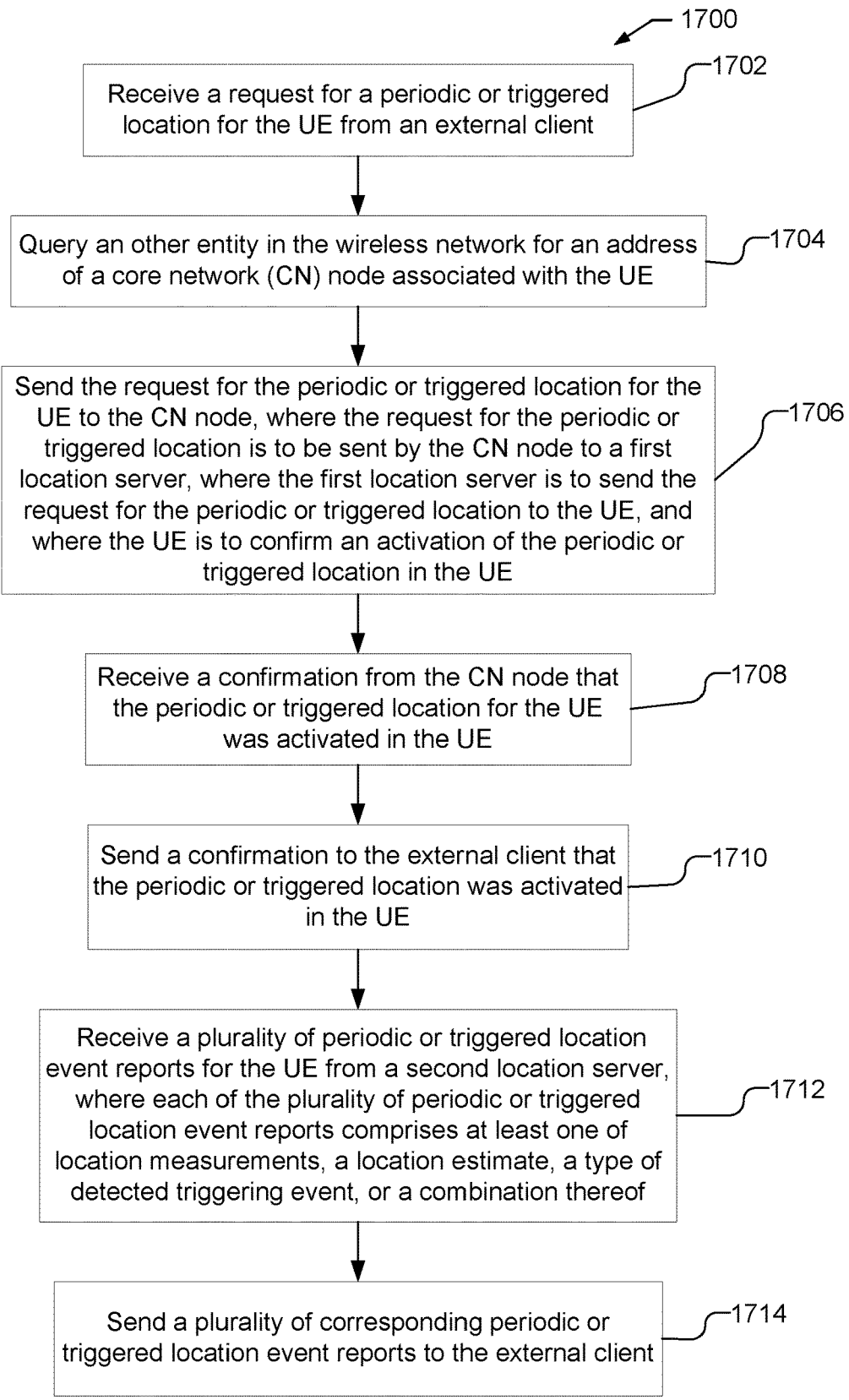
FIG. 17 shows a process flow illustrating a method for supporting deferred UE location using a combined AMF and LMF based location solution and performed by an entity in a wireless network, such as a GMLC.

FIG. 17 shows a process flow 1700 illustrating a method for supporting location services for a user equipment (UE), such as the UE 105, performed by an entity in a wireless network (e.g., a GMLC 155 or HGMLC 155H) according to the combined AMF and LMF location solution discussed above. Process flow 1700 may start at block 1702, where the entity receives a request for a periodic or triggered location for the UE from an external client, e.g., external client 130 or AF 163, e.g., as discussed at stage 1 of FIG. 9.

At block 1704, the entity queries an other entity (e.g., UDM 156) in the wireless network for an address of a core network (CN) node (e.g., AMF 154) associated with the UE, as discussed at stage 3 of FIG. 9. At block 1706, the entity sends the request for the periodic or triggered location for the UE to the CN node, where the request for the periodic or triggered location is to be sent by the CN node to a first location server, where the first location server is to send the request for the periodic or triggered location to the UE, and where the UE is to confirm an activation of the periodic or triggered location in the UE, as discussed at stages 4, 5, 14, 16 and 17 of FIG. 9.

At block 1708, the entity receives a confirmation from the CN node that the periodic or triggered location for the UE was activated in the UE, as discussed at stages 19 and 20 of FIG. 9. At block 1710, the entity sends a confirmation to the external client that the periodic or triggered location was activated in the UE, as discussed at stage 21 in FIG. 9. At block 1712, the entity receives a plurality of periodic or triggered location event reports for the UE from a second location server, where each of the plurality of periodic or triggered location event reports comprises at least one of location measurements, a location estimate, a type of detected triggering event, or a combination thereof, as discussed at stages 28 and 29 of FIG. 9. At block 1714, the entity sends a plurality of corresponding periodic or triggered location event reports to the external client, as discussed at stage 30 of FIG. 9.

The entity, the CN node, the first location server, the other entity and the second location server may each be part of a Visited Fifth Generation Core network (5GCN) or a Home 5GCN, and may then be a Gateway Mobile Location Center (e.g. GMLC 155, GMLC 155V or GMLC 155H), an Access and Mobility Management Function (e.g. AMF 154), a Location Management Function (e.g. LMF 152), a Unified Data Management (e.g. UDM 156), and an LMF (e.g. LMF 152), respectively. In some implementations, the second location server may comprise the first location server, as discussed for stage 25 of FIG. 9.

In some embodiments, the entity is a Home GMLC (e.g. HGMLC 155H) and the request for the periodic or triggered location for the UE is sent to the CN node at block 1706 via a Visited GMLC (e.g. VGMLC 155V), e.g. as described for stages 4 and 5 of FIG. 9. In some embodiments, the entity is a Home GMLC (e.g. HGMLC 155H) and the plurality of periodic or triggered location event reports for the UE is received from the second location server at block 1712 via a Visited GMLC (e.g. VGMLC 155V), e.g. as described for stages 28 and 29 of FIG. 9.

In one implementation, the entity may determine the first location server and may include an address for the first location server in the request for the periodic or triggered location for the UE sent to the CN node. For example, this may occur for communication system 300 of FIG. 3 when LMF 152 is in the HPLMN 5GCN 140-2.

In one implementation, the entity may receive an acknowledgement from the CN node indicating that the request for the periodic or triggered location was accepted by the CN node, and may send the acknowledgement indicating that the request for the periodic or triggered location was accepted by the CN node to the external client, e.g., as discussed at stages 6, 7, and 8 of FIG. 9.

In one implementation, the entity may include a plurality of parameters in the request for the periodic or triggered location sent to the CN node, e.g., as discussed at stages 4 and 5. For example, the plurality of parameters may comprise a contact address for the entity (e.g. an HGMLC contact address), a reference number (e.g. an LDR reference number), an indication of the first location server (e.g. an address or identifier for an LMF 152), a type of location reporting (e.g. periodic location reporting or triggered location reporting for an area event or motion event), a location Quality of Service (QoS), a maximum duration of event reporting, a maximum number of event reports, a request for location estimate inclusion in location event reports, a minimum and/or a maximum time interval between successive location event reports, a maximum event sampling interval, an indication of whether only one location event report is required or more than one, or some combination of these.

Figure 18:
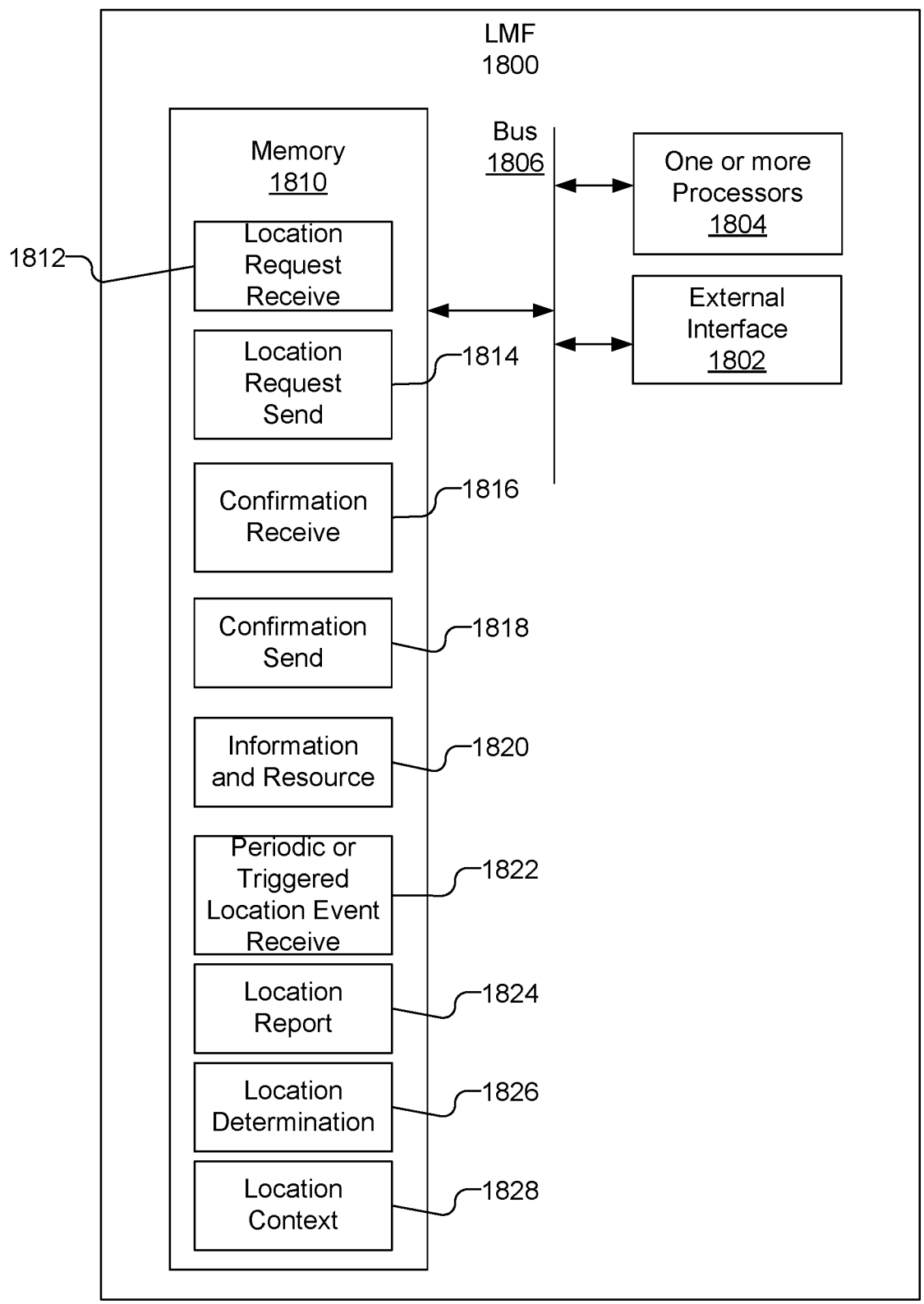
FIG. 18 is a block diagram of an embodiment of an LMF capable of supporting a combined AMF and LMF based location solution.

FIG. 18 is a diagram illustrating an example of a hardware implementation of an LMF 1800, such as LMF 152 shown in FIGS. 1-3. The LMF 1800 may be, e.g., part of a wireless network such as a 5G Core network (5GCN). The LMF 1800 includes, e.g., hardware components such as an external interface 1802, which may be a wired or wireless interface capable of connecting to a GMLC, such as GMLC 155, VGMLC 155V or HGMLC 155H, and an AMF, such as AMF 154. The LMF 1800 includes one or more processors 1804 and memory 1810, which may be coupled together with bus 1806. The memory 1810 may contain executable code or software instructions that when executed by the one or more processors 1804 cause the one or more processors 1804 to operate as a special purpose computer programmed to perform the procedures and techniques disclosed herein (e.g. such as the process flow 1400).

As illustrated in FIG. 18, the memory 1810 includes one or more components or modules that when implemented by the one or more processors 1804 implements the methodologies described herein. While the components or modules are illustrated as software in memory 1810 that is executable by the one or more processors 1804, it should be understood that the components or modules may be dedicated hardware or firmware either in the processors 1804 or off processor. As illustrated, the memory 1810 may include a location request receive unit 1812 that enables the one or more processors 1804 to receive via the external interface 1802 and process a periodic or triggered location request for a UE (e.g. UE 105) transmitted by a first core network (CN) node in the wireless network, such as AMF 154. The first CN node, for example, may receive the request for the periodic or triggered location for the UE from another entity, such as GMLC 155, VGMLC 155V or HGMLC 155H. A location request send unit 1814 enables the one or more processors 1804 to send via the external interface 1802 the periodic or triggered location request for the UE to the UE. The request for the periodic or triggered location sent to the UE may include an indication that location event reports are to be sent by the UE to the LMF 1800. The request for the periodic or triggered location sent to the UE may include an indication that location event reports are to be sent to any location server (e.g. any LMF).

The memory 1810 may include a confirmation receive unit 1816 that enables the one or more processors 1804 to receive via the external interface 1802 and process a confirmation from the UE that the periodic or triggered location was activated in the UE. The memory 1810 may further include a confirmation send unit 1818 that that enables the one or more processors 1804 to send via the external interface 1802 a confirmation that to the first CN node that the periodic or triggered location was activated in the UE.

The memory 1810 may include an information and resource unit 1820 that enables the one or more processors 1804 to either retain information, e.g., in memory 1810, and resources for the periodic or triggered location request after sending the confirmation to the first CN node that the periodic or triggered location was activated in the UE, e.g., when the request for the periodic or triggered location sent to the UE includes an indication that location event reports are to be sent to LMF 1800, or to discard information and release resources for the periodic or triggered location request after sending the confirmation to the first CN node that the periodic or triggered location was activated in the UE, e.g., when the request for the periodic or triggered location sent to the UE includes an indication that the location event reports are to be sent to any location server.

The memory 1810 may include a periodic or triggered location event receive unit 1822 that enables the one or more processors 1804 to receive via the external interface 1802 and process a plurality of periodic or triggered location event reports sent from the UE. The periodic or triggered location event reports, for example, may include at least one of location measurements, a location estimate, a type of detected triggering event, or a combination thereof. The plurality of periodic or triggered location event reports may be received from the UE via the first CN node or via a different CN node. The memory 1810 may further include a location report unit 1824 that enables the one or more processors 1804 to send via the external interface 1802 a plurality of corresponding periodic or triggered location event reports to the other entity, e.g., GMLC 155, VGMLC 155V or HGMLC 155H.

The memory 1810 may include a periodic or triggered location event receive unit 1822 that enables the one or more processors 1804 to determine a location of the UE. For example, the location of the UE may be determined in response to receiving the request for the periodic or triggered location for the UE from the first CN node and the location may be included in the confirmation sent to the first CN node that the periodic or triggered location was activated in the UE. The location of the UE may also or instead be determined in response to receiving each periodic or triggered location event report from the UE, and the location may be included in each corresponding periodic or triggered location event report sent to the other entity.

The memory 1810 may include a location context unit 1828 that enables the one or more processors 1804 to send via the external interface 1802 a location context for the UE to a second location server, where the location context comprises a location event report for the UE received from the UE via a CN node and information for the request for the periodic or triggered location for the UE received from the first core network (CN) node. The information and resource unit 1820 may enable the one or more processors 1804 to discard information and release resources for the periodic or triggered location request after sending the location context to the second location server.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1810) and executed by one or more processor units (e.g. processors 1804), causing the processor units to operate as a special purpose computer programmed to perform the techniques and procedures disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1810, and are configured to cause the one or more processors (e.g. processors 1804) to operate as a special purpose computer programmed to perform the techniques and procedures disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a location server (e.g. an LMF 1800) capable of supporting location services for a user equipment (UE), may include a means for receiving a request for a periodic or triggered location for the UE from a first core network (CN) node in the wireless network, wherein the first CN node received the request for the periodic or triggered location for the UE from another entity, which may be, e.g., the external interface 1802 and one or more processors 1804 with dedicated hardware or implementing executable code or software instructions in memory 1810 such as the location request receive unit 1812. A means for sending the request for the periodic or triggered location to the UE may be, e.g., the external interface 1802 and one or more processors 1804 with dedicated hardware or implementing executable code or software instructions in memory 1810 such as the location request send unit 1814. A means for receiving a confirmation from the UE that the periodic or triggered location was activated in the UE may be, e.g., the external interface 1802 and one or more processors 1804 with dedicated hardware or implementing executable code or software instructions in memory 1810 such as the confirmation receive unit 1816. A means for sending the confirmation to the first CN node that the periodic or triggered location was activated in the UE may be, e.g., the external interface 1802 and one or more processors 1804 with dedicated hardware or implementing executable code or software instructions in memory 1810 such as the confirmation send unit 1818.

In one implementation, the location server may include a means for retaining information for the periodic or triggered location request after sending the confirmation to the first CN node that the periodic or triggered location was activated in the UE, which may be, e.g., the external interface 1802 and one or more processors 1804 with dedicated hardware or implementing executable code or software instructions in memory 1810 such as the information and resource unit 1820. A means for receiving a plurality of periodic or triggered location event reports from the UE, wherein each of the plurality of periodic or triggered location event reports comprises at least one of location measurements, a location estimate, a type of detected triggering event, or a combination thereof, may be, e.g., the external interface 1802 and one or more processors 1804 with dedicated hardware or implementing executable code or software instructions in memory 1810 such as the periodic or triggered location event receive unit 1822. A means for sending a plurality of corresponding periodic or triggered location event reports to the other entity may be, e.g., the external interface 1802 and one or more processors 1804 with dedicated hardware or implementing executable code or software instructions in memory 1810 such as the location report unit 1824. In some implementations, a means for including an indication of sending location event reports to the location server in the request for the periodic or triggered location sent to the UE may be, e.g., the external interface 1802 and one or more processors 1804 with dedicated hardware or implementing executable code or software instructions in memory 1810 such as the location request send unit 1814. In one implementation, a means for determining a location of the UE in response to receiving each periodic or triggered location event report from the UE may be, e.g., the external interface 1802 and one or more processors 1804 with dedicated hardware or implementing executable code or software instructions in memory 1810, such as the location determination unit 1826. A means for including the location in a corresponding periodic or triggered location event report sent to the other entity may be, e.g., the external interface 1802 and one or more processors 1804 with dedicated hardware or implementing executable code or software instructions in memory 1810, such as the location request send unit 1814.

In some implementations, a means for sending a location context (e.g. comprising a location event report and information for the request for the periodic or triggered location for the UE received from the first CN node) to a second location server may be, e.g., the external interface 1802 and one or more processors 1804 with dedicated hardware or implementing executable code or software instructions in memory 1810 such as the location context unit 1828. A means for discarding information and releasing resources for the periodic or triggered location request after sending the location context to the second location server may be, e.g., the external interface 1802 and one or more processors 1804 with dedicated hardware or implementing executable code or software instructions in memory 1810 such as the information and resource unit 1820.

In some implementations, the location server may include a means for discarding information and releasing resources for the periodic or triggered location request after sending the confirmation to the first CN node that the periodic or triggered location was activated in the UE, which may be, e.g., the external interface 1802 and one or more processors 1804 with dedicated hardware or implementing executable code or software instructions in memory 1810 such as the information and resource unit 1820. The location server may include a means for including an indication of sending location event reports to any location server in the request for the periodic or triggered location sent to the UE, which may be, e.g., the external interface 1802 and one or more processors 1804 with dedicated hardware or implementing executable code or software instructions in memory 1810, such as the location request send unit 1814.

In one implementation, the location server includes a means for determining a location of the UE in response to receiving the request for the periodic or triggered location for the UE from the first CN node, which may be, e.g., the external interface 1802 and one or more processors 1804 with dedicated hardware or implementing executable code or software instructions in memory 1810, such as the location determination unit 1826. A means for including the location in the confirmation sent to the first CN node that the periodic or triggered location was activated in the UE may be, e.g., the external interface 1802 and one or more processors 1804 with dedicated hardware or implementing executable code or software instructions in memory 1810, such as the confirmation send unit 1818.

Figure 19:
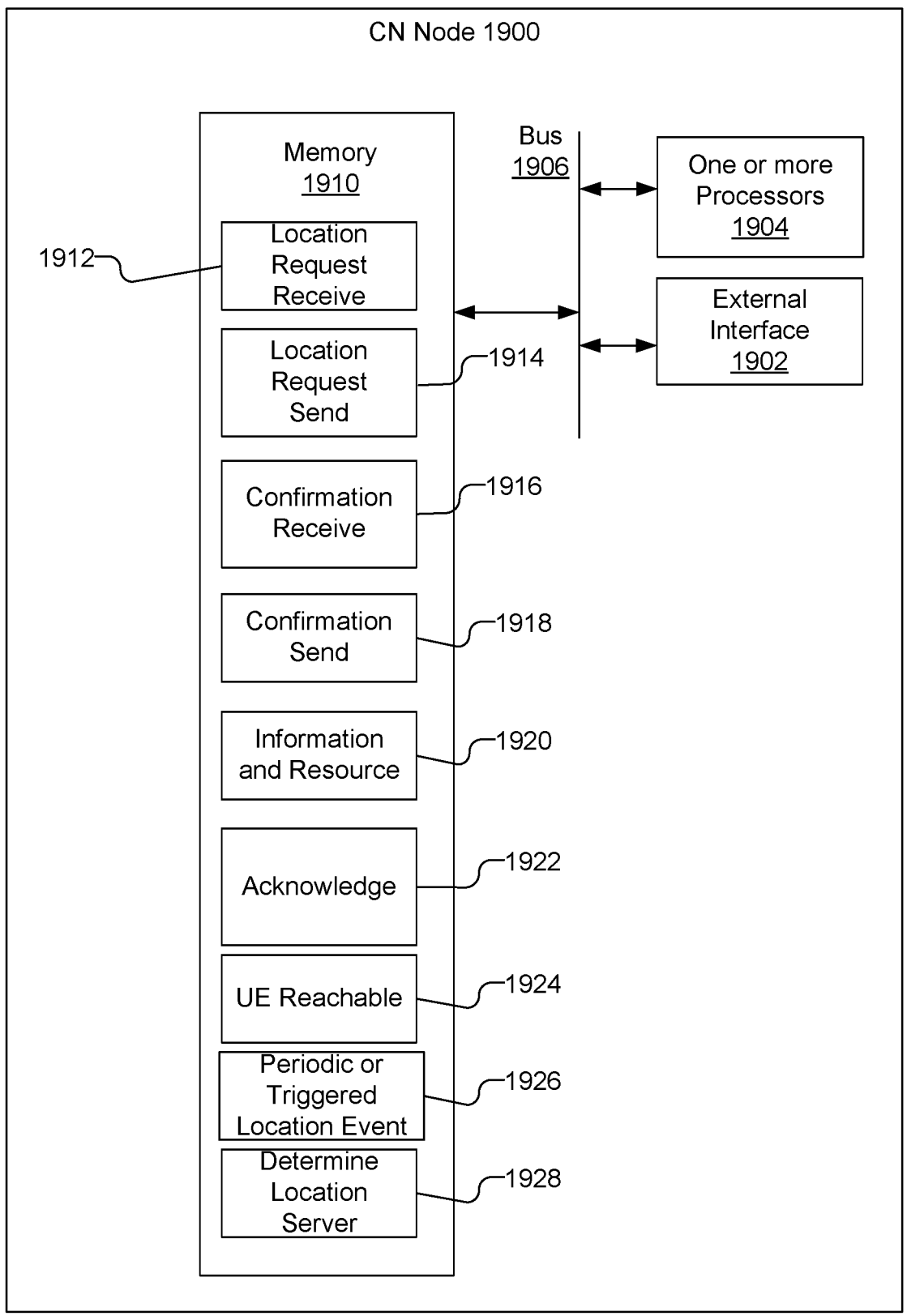
FIG. 19 is a block diagram of an embodiment of an Access and Mobility Management Function (AMF) capable of supporting a combined AMF and LMF based location solution.

FIG. 19 is a diagram illustrating an example of a hardware implementation of a core network (CN) node 1900, such as AMF 154 shown in FIGS. 1-3. The CN Node 1900 includes, e.g., hardware components such as an external interface 1902, which may be a wired or wireless interface capable of connecting to an LMF, such as LMF 152 shown in FIGS. 1-3, and to a RAN or NG-RAN, such as NG-RAN 112, and to a GMLC, such as GMLC 155, VGMLC 155V or HGMLC 155H. The CN node 1900 includes one or more processors 1904 and memory 1910, which may be coupled together with bus 1906. The memory 1910 may contain executable code or software instructions that when executed by the one or more processors 1904 cause the one or more processors 1904 to operate as a special purpose computer programmed to perform the procedures and techniques disclosed herein (e.g. such as the process flow 1500).

As illustrated in FIG. 19, the memory 1910 includes one or more components or modules that when implemented by the one or more processors 1904 implements the methodologies as described herein. While the components or modules are illustrated as software in memory 1910 that is executable by the one or more processors 1904, it should be understood that the components or modules may be dedicated hardware or firmware either in the processor or off processor. As illustrated, the memory 1910 may include a location request receive unit 1912 that enables the one or more processors 1904 to receive via the external interface 1902 a request for a periodic or triggered location for a UE (e.g. UE 105) from another entity (e.g. a GMLC 155). A location request send unit 1914 enables the one or more processors 1904 to send via the external interface 1902 the request for the periodic or triggered location for the UE to a first location server in the wireless network (e.g. an LMF 152).

The memory 1910 may include a confirmation receive unit 1916 that enables the one or more processors 1904 to receive via the external interface 1902 and process a confirmation from the first location server that the periodic or triggered location for the UE was activated in the UE. The memory 1910 may further include a confirmation send unit 1918 that that enables the one or more processors 1904 to send via the external interface 1902 a confirmation to the other entity that the periodic or triggered location was activated in the UE.

The memory 1910 may further include an information and resource unit 1920 that enables the one or more processors 1904 to release all resources for the request for periodic or triggered location. The UE may report a plurality of periodic or triggered location events to a second location server and the second location server may report the plurality of periodic or triggered location events to the other entity.

The memory 1910 may further include an acknowledge unit 1922 that enables the one or more processors 1904 to return via the external interface 1902 an acknowledgment to the other entity indicating that the request for the periodic or triggered location was accepted. The memory 1910 may further include a UE reachable unit 1924 that enables the one or more processors 1904 to wait until the UE becomes reachable from the CN node before sending the request for the periodic or triggered location for the UE to the first location server.

The memory 1910 may further include a periodic or triggered location event unit 1926 that enables the one or more processors 1904 to receive via the external interface 1902 at least one of the plurality of periodic or triggered location events from the UE and forward the at least one of the plurality of periodic or triggered location events to the second location server.

The memory 1910 may further include a determine location server unit 1928 that enables the one or more processors 1904 to determine the first location server and/or the second location server, e.g., if the plurality of periodic or triggered location events do not indicate the second location server or if the request for the periodic or triggered location does not include a parameter with an indication of the first location server.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1910, and are configured to cause the one or more processors to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a core network (CN) entity, such as CN node 1900, capable of supporting location services for a user equipment (UE), may include a means for receiving a request for a periodic or triggered location for the UE from another entity, such as GMLC 155, VGMLC 155V or HGMLC 155H, which may be, e.g., the external interface 1902 and one or more processors 1904 with dedicated hardware or implementing executable code or software instructions in memory 1910 such as the location request receive unit 1912. A means for sending the request for the periodic or triggered location for the UE to a first location server, e.g., LMF 152, in the wireless network, wherein the request for the periodic or triggered location is to be sent by the first location server to the UE and the UE is to confirm to the first location server an activation of the periodic or triggered location in the UE, which may be, e.g., the external interface 1902 and one or more processors 1904 with dedicated hardware or implementing executable code or software instructions in memory 1910 such as the location request send unit 1914. A means for receiving a confirmation from the first location server that the periodic or triggered location for the UE was activated in the UE may be, e.g., the external interface 1902 and one or more processors 1904 with dedicated hardware or implementing executable code or software instructions in memory 1910 such as the confirmation receive unit 1916. A means for sending a confirmation to the other entity that the periodic or triggered location was activated in the UE may be, e.g., the external interface 1902 and one or more processors 1904 with dedicated hardware or implementing executable code or software instructions in memory 1910 such as the confirmation send unit 1918. A means for releasing all resources for the request for periodic or triggered location, wherein the UE is to report a plurality of periodic or triggered location events to a second location server, which may be the first location server or a different location server, and the second location server is to report the plurality of periodic or triggered location events to the other entity may be, e.g., the external interface 1902 and one or more processors 1904 with dedicated hardware or implementing executable code or software instructions in memory 1910, such as the information and resource unit 1920.

In one implementation, the CN node may include a means for returning an acknowledgment to the other entity indicating that the request for the periodic or triggered location was accepted, which may be, e.g., the external interface 1902 and one or more processors 1904 with dedicated hardware or implementing executable code or software instructions in memory 1910 such as the acknowledge unit 1922. A means for waiting until the UE becomes reachable from the CN node before sending the request for the periodic or triggered location for the UE to the first location server may be, e.g., the external interface 1902 and one or more processors 1904 with dedicated hardware or implementing executable code or software instructions in memory 1910 such as the UE reachable unit 1924.

In one implementation, the CN node includes a means for receiving at least one of the plurality of periodic or triggered location events from the UE, which may be, e.g., the external interface 1902 and one or more processors 1904 with dedicated hardware or implementing executable code or software instructions in memory 1910 such as the periodic or triggered location event unit 1926. A means for forwarding the at least one of the plurality of periodic or triggered location events to the second location server may be, e.g., the external interface 1902 and one or more processors 1904 with dedicated hardware or implementing executable code or software instructions in memory 1910 such as the periodic or triggered location event unit 1926. For example, the at least one of the plurality of periodic or triggered location events may indicate the second location server. In another example, the at least one of the plurality of periodic or triggered location events does not indicate the second location server, and the CN node further includes a means for determining the second location server, which may be, e.g., the external interface 1902 and one or more processors 1904 with dedicated hardware or implementing executable code or software instructions in memory 1910 such as the determine location server unit 1928.

In one implementation, the request for the periodic or triggered location received from the other entity comprises a plurality of parameters, and the CN node includes a means for including at least some of the plurality of parameters in the request for the periodic or triggered location sent to the first location server, which may be, e.g., the external interface 1902 and one or more processors 1904 with dedicated hardware or implementing executable code or software instructions in memory 1910 such as the location request send unit 1914. In one implementation, the plurality of parameters does not include an indication of the first location server, and the CN node includes a means for determining the first location server, which may be, e.g., the external interface 1902 and one or more processors 1904 with dedicated hardware or implementing executable code or software instructions in memory 1910 such as the determine location server unit 1928.

Figure 20:
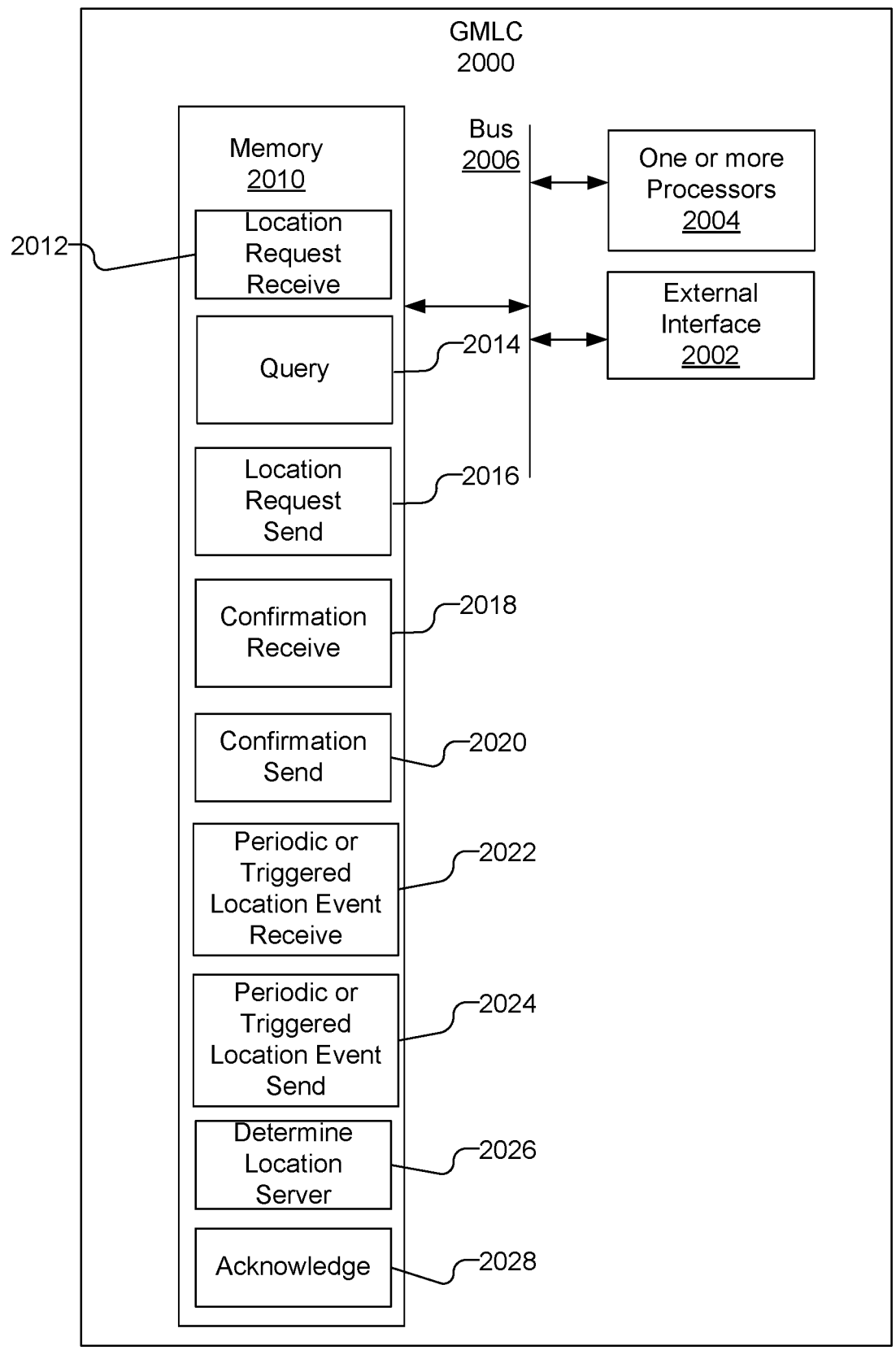
FIG. 20 is a block diagram of an embodiment of a GMLC capable of supporting a combined AMF and LMF based location solution.

FIG. 20 is a diagram illustrating an example of a hardware implementation of a GMLC 2000, such as GMLC 155, VGMLC 155V and HGMLC 155H shown in FIGS. 1-3. The GMLC 2000 may be, e.g., part of a wireless network such as a 5G Core network (5GCN) 150 or 5GCN 140. The GMLC 2000 includes, e.g., hardware components such as an external interface 2002, which may be a wired or wireless interface capable of connecting to an external client 130, to LMF 152 shown in FIGS. 1-3, to another GMLC, such as VGMLC 155V or HGMLC 155H, to an NEF 159 shown in FIGS. 1-3, to AMF 154 shown in FIGS. 1-3, and to UDM 156. The GMLC 2000 includes one or more processors 2004 and memory 2010, which may be coupled together with bus 2006. The memory 2010 may contain executable code or software instructions that when executed by the one or more processors 2004 cause the one or more processors to operate as a special purpose computer programmed to perform the procedures and techniques disclosed herein (e.g. such as the process flow 1700).

As illustrated in FIG. 20, the memory 2010 includes one or more components or modules that when implemented by the one or more processors 2004 implements the methodologies as described herein. While the components or modules are illustrated as software in memory 2010 that is executable by the one or more processors 2004, it should be understood that the components or modules may be dedicated hardware or firmware either in the processors 2004 or off processor. As illustrated, the memory 2010 may include a location request receive unit 2012 that enables the one or more processors 2004 to receive via the external interface 2002 and process a request for a periodic or triggered location for the UE from an external client or AF. The memory 2010 may include a query unit 2014 that enables the one or more processors 2004 to query via the external interface 2002 another entity, e.g., UDM 156, in the wireless network for an address of a core network (CN) node, e.g., AMF 154, associated with the UE. A location request send unit 2016 enables the one or more processors 2004 to send via the external interface 2002 the request for the periodic or triggered location for the UE to the CN node, wherein the request for the periodic or triggered location is to be sent by the CN node to a first location server, wherein the first location server is to send the request for the periodic or triggered location to the UE and the UE is to confirm an activation of the periodic or triggered location in the UE.

The memory 2010 may include a confirmation receive unit 2018 that enables the one or more processors 2004 to receive via the external interface 2002 and process a confirmation from the CN node that the periodic or triggered location for the UE was activated in the UE. A confirmation send unit 2020 enables the one or more processors 2004 to send via the external interface 2002 the confirmation to the external client or AF that the periodic or triggered location was activated in the UE.

The memory 2010 may further include a periodic or triggered location event receive unit 2022 that enables the one or more processors 2004 to receive via the external interface 2002 and process a plurality of periodic or triggered location event reports for the UE from a second location server, where each of the plurality of periodic or triggered location event reports comprises at least one of location measurements, a location estimate, a type of detected triggering event, or a combination thereof. A periodic or triggered location event send unit 2024 enables the one or more processors 2004 to send via the external interface 2002 a plurality of corresponding periodic or triggered location event reports to the external client or AF.

The memory 2010 may further include a determine location server unit 2026 that enables the one or more processors 2004 to determine the first location server and include an address for the first location server in the request for the periodic or triggered location for the UE sent to the CN node.

The memory 2010 may further include an acknowledge unit 2028 that enables the one or more processors 2004 to receive via the external interface 2002 and process an acknowledgement from the CN node indicating that the request for the periodic or triggered location was accepted by the CN node, and send the acknowledgement indicating that the request for the periodic or triggered location was accepted by the CN node to the external client or AF.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 2010, and are configured to cause the one or more processors 2004 to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, an entity in a wireless network, such as GMLC 2000, capable of supporting location services for a user equipment (UE), may include a means for receiving a request for a periodic or triggered location for the UE from an external client, such as external client 130, which may be, e.g., the external interface 2002 and one or more processors 2004 with dedicated hardware or implementing executable code or software instructions in memory 2010 such as the location request receive unit 2012. A means for querying another entity in the wireless network, such as UDM 156, for an address of a core network (CN) node, such as AMF 154, associated with the UE may be, e.g., the external interface 2002 and one or more processors 2004 with dedicated hardware or implementing executable code or software instructions in memory 2010 such as the query unit 2014. A means for sending the request for the periodic or triggered location for the UE to the CN node, wherein the request for the periodic or triggered location is to be sent by the CN node to a first location server, wherein the first location server is to send the request for the periodic or triggered location to the UE and the UE is to confirm an activation of the periodic or triggered location in the UE may be, e.g., the external interface 2002 and one or more processors 2004 with dedicated hardware or implementing executable code or software instructions in memory 2010 such as the location request send unit 2016. A means for receiving a confirmation from the CN node that the periodic or triggered location for the UE was activated in the UE may be, e.g., the external interface 2002 and one or more processors 2004 with dedicated hardware or implementing executable code or software instructions in memory 2010 such as the confirmation receive unit 2018. A means for sending a confirmation to the external client that the periodic or triggered location was activated in the UE may be, e.g., the external interface 2002 and one or more processors 2004 with dedicated hardware or implementing executable code or software instructions in memory 2010 such as the confirmation send unit 2020. A means for receiving a plurality of periodic or triggered location event reports for the UE from a second location server, wherein each of the plurality of periodic or triggered location event reports comprises at least one of location measurements, a location estimate, a type of detected triggering event, or a combination thereof may be, e.g., the external interface 2002 and one or more processors 2004 with dedicated hardware or implementing executable code or software instructions in memory 2010 such as the periodic or triggered location event receive unit 2022. A means for sending a plurality of corresponding periodic or triggered location event reports to the external client may be, e.g., the external interface 2002 and one or more processors 2004 with dedicated hardware or implementing executable code or software instructions in memory 2010 such as the periodic or triggered location event send unit 2024.

In one implementation, the entity may include a means for determining the first location server and including an address for the first location server in the request for the periodic or triggered location for the UE sent to the CN node, which may be, e.g., the external interface 2002 and one or more processors 2004 with dedicated hardware or implementing executable code or software instructions in memory 2010, such as the determine location server unit 2026.

In one implementation, the entity may include a means for receiving an acknowledgement from the CN node indicating that the request for the periodic or triggered location was accepted by the CN node, which may be, e.g., the external interface 2002 and one or more processors 2004 with dedicated hardware or implementing executable code or software instructions in memory 2010, such as the acknowledge unit 2028. A means for sending the acknowledgement indicating that the request for the periodic or triggered location was accepted by the CN node to the external client may be, e.g., the external interface 2002 and one or more processors 2004 with dedicated hardware or implementing executable code or software instructions in memory 2010, such as the acknowledge unit 2028.

Figure 21:
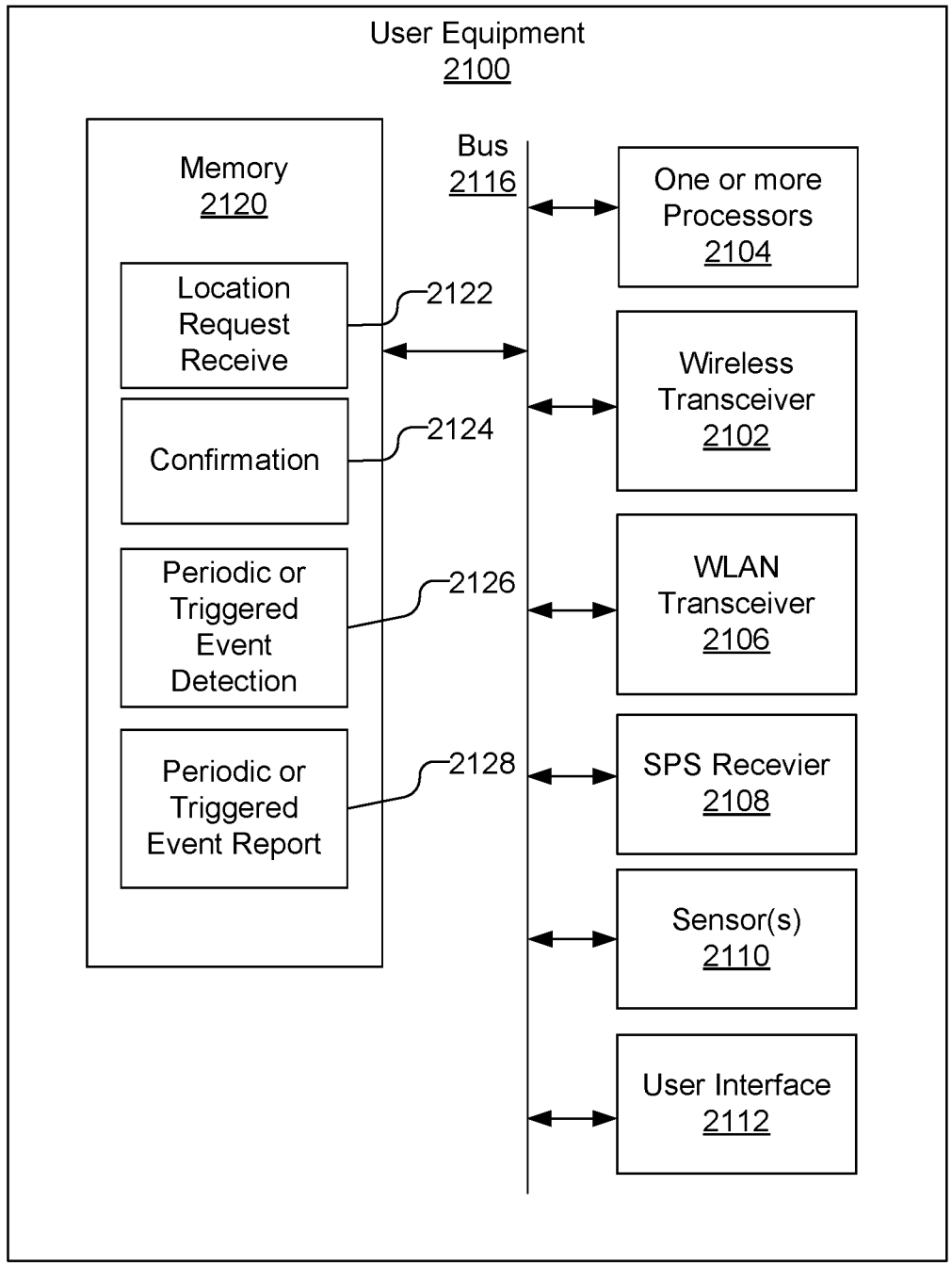
FIG. 21 is a block diagram of an embodiment of a UE capable of supporting a combined AMF and LMF based location solution.

FIG. 21 is a diagram illustrating an example of a hardware implementation of a UE 2100, such as UE 105 shown in FIGS. 1-13. The UE 2100 may include a wireless transceiver 2102 to wirelessly communicate with an NG-RAN 112, e.g., base stations such as gNB 110 or ng-eNB 114 (shown in FIGS. 1-3). The UE 2100 may also include additional transceivers, such a wireless local area network (WLAN) transceiver 2106, as well as an SPS receiver 2108 for receiving and measuring signals from SPS SVs 190 (shown in FIGS. 1-3). The UE 2100 may further include one or more sensors 2110, such as cameras, accelerometers, gyroscopes, electronic compass, magnetometer, barometer, etc. The UE 2100 may further include a user interface 2112 that may include e.g., a display, a keypad or other input device, such as virtual keypad on the display, through which a user may interface with the UE 2100. The UE 2100 further includes one or more processors 2104 and memory 2120, which may be coupled together with bus 2116. The one or more processors 2104 and other components of the UE 2100 may similarly be coupled together with bus 2116, a separate bus, or may be directly connected together or coupled using a combination of the foregoing. The memory 2120 may contain executable code or software instructions that when executed by the one or more processors 2104 cause the one or more processors to operate as a special purpose computer programmed to perform the methods and procedures disclosed herein (e.g. such as the process flow 1600).

As illustrated in FIG. 21, the memory 2120 may include one or more components or modules that may be implemented by the one or more processors 2104 to perform the methodologies described herein. While the components or modules are illustrated as software in memory 2120 that is executable by the one or more processors 2104, it should be understood that the components or modules may be dedicated hardware or firmware either in the one or more processors 2104 or off the processors. As illustrated, the memory 2120 may include a location request receive unit 2122 that enables the one or more processors 2104 to receive via the wireless transceiver 2102 and process a request for a periodic or triggered location for the UE 2100 from a first location server, e.g., LMF 152, in the wireless network, where the first location server received the request for the periodic or triggered location for the UE 2100 from a first Core Network (CN) node, e.g., AMF 154, where the first CN node received the request for the periodic or triggered location for the UE 2100 from another entity, e.g., GMLC 155, VGMLC 155V or HGMLC 155H. A confirmation unit 2124 enables the one or more processors 2104 to send via the wireless transceiver 2102 a confirmation to the first location server that the periodic or triggered location was activated in the UE 2100. A periodic or triggered event detection unit 2126 enables the one or more processors 2104 to detect a plurality of trigger events, e.g., using wireless transceiver 2102, WLAN transceiver 2106, SPS receiver 2108, and/or sensors 2110. The periodic or triggered event detection unit 2126 when implemented by the one or more processors 2104 configures the one or more processors 2104 to receive and monitor trigger parameters, e.g., provided in the request for location information from the location server. The trigger parameters may include, e.g., a trigger evaluation interval, a periodic maximum reporting interval, and one or more location triggers, such as a change of location, an entry into, an exit from or a remaining within a defined geographic area, a movement by more than a threshold linear distance from a previous location, etc. A periodic or triggered event report unit 2128 enables the one or more processors 2104 to send via the wireless transceiver 2102, for each detected trigger event, a corresponding periodic or triggered location event report to a second location server, each corresponding location event report comprising at least one of location measurements, a location estimate, a type of detected triggering event, or a combination thereof, where the second location server sends each corresponding location event report to the other entity.

The methodologies described herein may be implemented by various means depending upon the application. For example, these methodologies may be implemented in hardware, firmware, software, or any combination thereof. For a hardware implementation, the one or more processors 2104 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 2100 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 2120) and executed by one or more processors 2104, causing the one or more processors 2104 to operate as a special purpose computer programmed to perform the techniques disclosed herein. Memory may be implemented within the one or processors 2104 or external to the one or more processors 2104. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 2100 may be stored as one or more instructions or code on a non-transitory computer-readable storage medium such as memory 2120. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 2100 may be provided as signals on transmission media included in a communication apparatus. For example, a communication apparatus comprising part or all of UE 2100 may include a transceiver having signals indicative of instructions and data. The instructions and data are stored on non-transitory computer readable media, e.g., memory 2120, and are configured to cause the one or more processors 2104 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a UE, such as UE 2100, capable of supporting location services for the UE, may include a means for receiving a request for a periodic or triggered location for the UE from a first location server, such as LMF 152, in the wireless network, where the first location server received the request for the periodic or triggered location for the UE from a first Core Network (CN) node, such as AMF 154, where the first CN node received the request for the periodic or triggered location for the UE from another entity, such as GMLC 155, VGMLC 155V or HGMLC 155H, which may be, e.g., the wireless transceiver 2102 and one or more processors 2104 with dedicated hardware or implementing executable code or software instructions in memory 2120, such as the location request receive unit 2122. A means for sending a confirmation to the first location server that the periodic or triggered location was activated in the UE may be, e.g., the wireless transceiver 2102 and one or more processors 2104 with dedicated hardware or implementing executable code or software instructions in memory 2120, such as the confirmation unit 2124. A means for detecting a plurality of trigger events may be, e.g., one or more of the wireless transceiver 2102, WLAN transceiver 2106, SPS receiver 2108, sensors 2110, and one or more processors 2104 with dedicated hardware or implementing executable code or software instructions in memory 2120, such as the periodic or triggered event detection unit 2126. A means for sending, for each detected trigger event, a corresponding periodic or triggered location event report to a second location server, each corresponding location event report comprising at least one of location measurements, a location estimate, a type of detected triggering event, or a combination thereof, where the second location server sends each corresponding location event report to the other entity may be, e.g., the wireless transceiver 2102 and one or more processors 2104 with dedicated hardware or implementing executable code or software instructions in memory 2120, such as the periodic or triggered event report unit 2128.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

One implementation (1) may be a method for supporting location services for a user equipment (UE) performed by a first location server in a wireless network, the method comprising: receiving a request for a periodic or triggered location for the UE from a first core network (CN) node in the wireless network, wherein the first CN node received the request for the periodic or triggered location for the UE from another entity; sending the request for the periodic or triggered location to the UE; receiving a confirmation from the UE that the periodic or triggered location was activated in the UE; and sending the confirmation to the first CN node that the periodic or triggered location was activated in the UE.

There may be some implementations (2) of the above-described method (1), further comprising: retaining information for the periodic or triggered location request after sending the confirmation to the first CN node that the periodic or triggered location was activated in the UE; receiving a plurality of periodic or triggered location event reports from the UE, wherein each of the plurality of periodic or triggered location event reports comprises at least one of location measurements, a location estimate, a type of detected triggering event, or a combination thereof; and sending a plurality of corresponding periodic or triggered location event reports to the other entity.

There may be some implementations (3) of the above-described method (2), further comprising including an indication of sending location event reports to the first location server in the request for the periodic or triggered location sent to the UE.

There may be some implementations (4) of the above-described method (2), further comprising: receiving a periodic or triggered location event report from the UE via a second CN node; sending a location context to a second location server, wherein the location context comprises the periodic or triggered location event report and information for the request for the periodic or triggered location for the UE received from the first CN node; and discarding information and releasing resources for the periodic or triggered location request after sending the location context to the second location server.

There may be some implementations (5) of the above-described method (4), further comprising determining the second location server.

There may be some implementations (6) of the above-described method (4), wherein the second location server is more suitable for the periodic or triggered location event report than the first location server.

There may be some implementations (7) of the above-described method (4), wherein the second CN node comprises the first CN node.

There may be some implementations (8) of the above-described method (1), further comprising discarding information and releasing resources for the periodic or triggered location request after sending the confirmation to the first CN node that the periodic or triggered location was activated in the UE.

There may be some implementations (9) of the above-described method (8), further comprising including an indication of sending location event reports to any location server in the request for the periodic or triggered location sent to the UE.

There may be some implementations (10) of the above-described method (1), further comprising: determining a location of the UE in response to receiving the request for the periodic or triggered location for the UE from the first CN node; and including the location in the confirmation sent to the first CN node that the periodic or triggered location was activated in the UE.

There may be some implementations (11) of the above-described method (2), further comprising: determining a location of the UE in response to receiving a periodic or triggered location event report from the UE; and including the location in a corresponding periodic or triggered location event report sent to the other entity.

There may be some implementations (12) of the above-described method (2), wherein the plurality of periodic or triggered location event reports are received from the UE via a second CN node.

There may be some implementations (13) of the above-described method (12), wherein the second CN node is different to the first CN node.

There may be some implementations (14) of the above-described method (1), wherein the first CN node, the first location server and the other entity are part of a Fifth Generation Core network (5GCN).

There may be some implementations (15) of the above-described method (14), wherein the first CN node is an Access and Mobility Management Function (AMF), the first location server is a Location Management Function (LMF) and the other entity is a Gateway Mobile Location Center (GMLC).

One implementation (16) may be a first location server in a wireless network for supporting location services for a user equipment (UE) comprising: an external interface for receiving and sending messages to entities in a network; at least one memory; and at least one processor coupled to the external interface and the at least one memory, the at least one processor configured to: receive a request for a periodic or triggered location for the UE from a first core network (CN) node in the wireless network, wherein the first CN node received the request for the periodic or triggered location for the UE from another entity; send the request for the periodic or triggered location to the UE; receive a confirmation from the UE that the periodic or triggered location was activated in the UE; and send the confirmation to the first CN node that the periodic or triggered location was activated in the UE.

There may be some implementations (17) of the above-described first location server (16), wherein the at least one processor is further configured to: retain information for the periodic or triggered location request after sending the confirmation to the first CN node that the periodic or triggered location was activated in the UE; receive a plurality of periodic or triggered location event reports from the UE, wherein each of the plurality of periodic or triggered location event reports comprises at least one of location measurements, a location estimate, a type of detected triggering event, or a combination thereof; and send a plurality of corresponding periodic or triggered location event reports to the other entity.

There may be some implementations (18) of the above-described first location server (17), wherein the at least one processor is further configured to include an indication of sending location event reports to the first location server in the request for the periodic or triggered location sent to the UE.

There may be some implementations (19) of the above-described first location server (17), wherein the at least one processor is further configured to: receive a periodic or triggered location event report from the UE via a second CN node; send a location context to a second location server, wherein the location context comprises the periodic or triggered location event report and information for the request for the periodic or triggered location for the UE received from the first CN node; and discard information and releasing resources for the periodic or triggered location request after sending the location context to the second location server.

There may be some implementations (20) of the above-described first location server (19), wherein the at least one processor is further configured to determine the second location server.

There may be some implementations (21) of the above-described first location server (19), wherein the second location server is more suitable for the periodic or triggered location event report than the first location server.

There may be some implementations (22) of the above-described first location server (19), wherein the second CN node comprises the first CN node.

There may be some implementations (23) of the above-described first location server (16), wherein the at least one processor is further configured to discard information and release resources for the periodic or triggered location request after sending the confirmation to the first CN node that the periodic or triggered location was activated in the UE.

There may be some implementations (24) of the above-described first location server (23), wherein the at least one processor is further configured to include an indication of sending location event reports to any location server in the request for the periodic or triggered location sent to the UE.

There may be some implementations (25) of the above-described first location server (16), wherein the at least one processor is further configured to: determine a location of the UE in response to receiving the request for the periodic or triggered location for the UE from the first CN node; and include the location in the confirmation sent to the first CN node that the periodic or triggered location was activated in the UE.

There may be some implementations (26) of the above-described first location server (17), wherein the at least one processor is further configured to: determine a location of the UE in response to receiving a periodic or triggered location event report from the UE; and include the location in a corresponding periodic or triggered location event report sent to the other entity.

There may be some implementations (27) of the above-described first location server (17), wherein the plurality of periodic or triggered location event reports are received from the UE via a second CN node.

There may be some implementations (28) of the above-described first location server (27), wherein the second CN node is different to the first CN node.

There may be some implementations (29) of the above-described first location server (16), wherein the first CN node, the first location server and the other entity are part of a Fifth Generation Core network (5GCN).

There may be some implementations (30) of the above-described first location server (29), wherein the first CN node is an Access and Mobility Management Function (AMF), the first location server is a Location Management Function (LMF) and the other entity is a Gateway Mobile Location Center (GMLC).

One implementation (31) may be a first location server in a wireless network for supporting location services for a user equipment (UE) comprising: means for receiving a request for a periodic or triggered location for the UE from a first core network (CN) node in the wireless network, wherein the first CN node received the request for the periodic or triggered location for the UE from another entity; means for sending the request for the periodic or triggered location to the UE; means for receiving a confirmation from the UE that the periodic or triggered location was activated in the UE; and means for sending the confirmation to the first CN node that the periodic or triggered location was activated in the UE.

There may be some implementations (32) of the above-described first location server (31), further comprising: means for retaining information for the periodic or triggered location request after sending the confirmation to the first CN node that the periodic or triggered location was activated in the UE; means for receiving a plurality of periodic or triggered location event reports from the UE, wherein each of the plurality of periodic or triggered location event reports comprises at least one of location measurements, a location estimate, a type of detected triggering event, or a combination thereof; and means for sending a plurality of corresponding periodic or triggered location event reports to the other entity.

There may be some implementations (33) of the above-described first location server (32), further comprising means for including an indication of sending location event reports to the first location server in the request for the periodic or triggered location sent to the UE.

There may be some implementations (34) of the above-described first location server (32), further comprising: means for receiving a periodic or triggered location event report from the UE via a second CN node; means for sending a location context to a second location server, wherein the location context comprises the periodic or triggered location event report and information for the request for the periodic or triggered location for the UE received from the first CN node; and means for discarding information and releasing resources for the periodic or triggered location request after sending the location context to the second location server.

There may be some implementations (35) of the above-described first location server (34), further comprising means for determining the second location server.

There may be some implementations (36) of the above-described first location server (34), wherein the second location server is more suitable for the periodic or triggered location event report than the first location server.

There may be some implementations (37) of the above-described first location server (34), wherein the second CN node comprises the first CN node.

There may be some implementations (38) of the above-described first location server (31), further comprising means for discarding information and releasing resources for the periodic or triggered location request after sending the confirmation to the first CN node that the periodic or triggered location was activated in the UE.

There may be some implementations (39) of the above-described first location server (38), further comprising means for including an indication of sending location event reports to any location server in the request for the periodic or triggered location sent to the UE.

There may be some implementations (40) of the above-described first location server (31), further comprising: means for determining a location of the UE in response to receiving the request for the periodic or triggered location for the UE from the first CN node; and means for including the location in the confirmation sent to the first CN node that the periodic or triggered location was activated in the UE.

There may be some implementations (41) of the above-described first location server (32), further comprising: means for determining a location of the UE in response to receiving a periodic or triggered location event report from the UE; and means for including a location in the corresponding periodic or triggered location event report sent to the other entity.

There may be some implementations (42) of the above-described first location server (32), wherein the plurality of periodic or triggered location event reports are received from the UE via a second CN node.

There may be some implementations (43) of the above-described first location server (42), wherein the second CN node is different to the first CN node.

There may be some implementations (44) of the above-described first location server (31), wherein the first CN node, the first location server and the other entity are part of a Fifth Generation Core network (5GCN).

There may be some implementations (45) of the above-described first location server (44), wherein the first CN node is an Access and Mobility Management Function (AMF), the first location server is a Location Management Function (LMF) and the other entity is a Gateway Mobile Location Center (GMLC).

One implementation (46) may be a non-transitory storage medium including program code stored thereon, the program code is operable to cause at least one processor in a first location server in a wireless network to support location services for a user equipment (UE) comprising: program code to receive a request for a periodic or triggered location for the UE from a first core network (CN) node in the wireless network, wherein the first CN node received the request for the periodic or triggered location for the UE from another entity; program code to send the request for the periodic or triggered location to the UE; program code to receive a confirmation from the UE that the periodic or triggered location was activated in the UE; and program code to send the confirmation to the first CN node that the periodic or triggered location was activated in the UE.

There may be some implementations (47) of the above-described non-transitory storage medium of (46), further comprising: program code to retain information for the periodic or triggered location request after sending the confirmation to the first CN node that the periodic or triggered location was activated in the UE; program code to receive a plurality of periodic or triggered location event reports from the UE, wherein each of the plurality of periodic or triggered location event reports comprises at least one of location measurements, a location estimate, a type of detected triggering event, or a combination thereof;

and program code to send a plurality of corresponding periodic or triggered location event reports to the other entity.

There may be some implementations (48) of the above-described non-transitory storage medium of (47), further comprising program code to include an indication of sending location event reports to the first location server in the request for the periodic or triggered location sent to the UE.

There may be some implementations (49) of the above-described non-transitory storage medium of (47), further comprising: program code to receive a periodic or triggered location event report from the UE via a second CN node; program code to send a location context to a second location server, wherein the location context comprises the periodic or triggered location event report and information for the request for the periodic or triggered location for the UE received from the first CN node; and program code to discard information and releasing resources for the periodic or triggered location request after sending the location context to the second location server.

There may be some implementations (50) of the above-described non-transitory storage medium of (49), further comprising program code to determine the second location server.

There may be some implementations (51) of the above-described non-transitory storage medium of (49), wherein the second location server is more suitable for the periodic or triggered location event report than the first location server.

There may be some implementations (52) of the above-described non-transitory storage medium of (49), wherein the second CN node comprises the first CN node.

There may be some implementations (53) of the above-described non-transitory storage medium of (46), further comprising program code to discard information and releasing resources for the periodic or triggered location request after sending the confirmation to the first CN node that the periodic or triggered location was activated in the UE.

There may be some implementations (54) of the above-described non-transitory storage medium of (53), further comprising program code to include an indication of sending location event reports to any location server in the request for the periodic or triggered location sent to the UE.

There may be some implementations (55) of the above-described non-transitory storage medium of (46), further comprising: program code to determine a location of the UE in response to receiving the request for the periodic or triggered location for the UE from the first CN node; and program code to include the location in the confirmation sent to the first CN node that the periodic or triggered location was activated in the UE.

There may be some implementations (56) of the above-described non-transitory storage medium of (47), further comprising: program code to determine a location of the UE in response to receiving a periodic or triggered location event report from the UE; and program code to include a location in the corresponding periodic or triggered location event report sent to the other entity.

There may be some implementations (57) of the above-described non-transitory storage medium of (47), wherein the plurality of periodic or triggered location event reports are received from the UE via a second CN node.

There may be some implementations (58) of the above-described non-transitory storage medium of (57), wherein the second CN node is different to the first CN node.

There may be some implementations (59) of the above-described non-transitory storage medium of (46), wherein the first CN node, the first location server and the other entity are part of a Fifth Generation Core network (5GCN).

There may be some implementations (60) of the above-described non-transitory storage medium of (59), wherein the first CN node is an Access and Mobility Management Function (AMF), the first location server is a Location Management Function (LMF) and the other entity is a Gateway Mobile Location Center (GMLC).

One implementation (61) may be a method for supporting location services for a user equipment (UE) performed by a core network (CN) node in a wireless network, the method comprising: receiving a request for a periodic or triggered location for the UE from another entity; sending the request for the periodic or triggered location for the UE to a first location server in the wireless network, wherein the request for the periodic or triggered location is to be sent by the first location server to the UE and the UE is to confirm to the first location server an activation of the periodic or triggered location in the UE; receiving a confirmation from the first location server that the periodic or triggered location for the UE was activated in the UE; sending the confirmation to the other entity that the periodic or triggered location was activated in the UE; and releasing all resources for the request for periodic or triggered location, wherein the UE is to report a plurality of periodic or triggered location events to a second location server and the second location server is to report the plurality of periodic or triggered location events to the other entity.

There may be some implementations (62) of the above-described method (61), further comprising: returning an acknowledgment to the other entity indicating that the request for the periodic or triggered location was accepted; and waiting until the UE becomes reachable from the CN node before sending the request for the periodic or triggered location for the UE to the first location server.

There may be some implementations (63) of the above-described method (61), wherein the CN node, the first location server, the other entity and the second location server are part of a Fifth Generation Core network (5GCN).

There may be some implementations (64) of the above-described method (63), wherein the CN node is an Access and Mobility Management Function (AMF), the first location server is a Location Management Function (LMF), the other entity is a Gateway Mobile Location Center (GMLC) and the second location server is an LMF.

There may be some implementations (65) of the above-described method (61), wherein the second location server comprises the first location server.

There may be some implementations (66) of the above-described method (61), further comprising: receiving at least one of the plurality of periodic or triggered location events from the UE; and forwarding the at least one of the plurality of periodic or triggered location events to the second location server.

There may be some implementations (67) of the above-described method (66), wherein the at least one of the plurality of periodic or triggered location events indicates the second location server.

There may be some implementations (68) of the above-described method (66), wherein the at least one of the plurality of periodic or triggered location events does not indicate the second location server, and further comprising determining the second location server.

There may be some implementations (69) of the above-described method (61), wherein the request for the periodic or triggered location received from the other entity comprises a plurality of parameters and further comprising including at least some of the plurality of parameters in the request for the periodic or triggered location sent to the first location server.

There may be some implementations (70) of the above-described method (69), wherein the plurality of parameters comprises a contact address for the other entity, a location deferred request (LDR) reference number, an indication of the first location server, a type of location reporting, a location Quality of Service, a maximum duration, a maximum number of event reports, a request for location estimate inclusion in event reports, or some combination of these.

There may be some implementations (71) of the above-described method (69), wherein the plurality of parameters does not include an indication of the first location server, and further comprising determining the first location server.

One implementation (72) may be a core network (CN) node in a wireless network for supporting location services for a user equipment (UE) comprising: an external interface for receiving and sending messages to entities in a network; at least one memory; and at least one processor coupled to the external interface and the at least one memory, the at least one processor configured to: receive a request for a periodic or triggered location for the UE from another entity; send the request for the periodic or triggered location for the UE to a first location server in the wireless network, wherein the request for the periodic or triggered location is to be sent by the first location server to the UE and the UE is to confirm to the first location server an activation of the periodic or triggered location in the UE; receive a confirmation from the first location server that the periodic or triggered location for the UE was activated in the UE; send the confirmation to the other entity that the periodic or triggered location was activated in the UE; and release all resources for the request for periodic or triggered location, wherein the UE is to report a plurality of periodic or triggered location events to a second location server and the second location server is to report the plurality of periodic or triggered location events to the other entity.

There may be some implementations (73) of the above-described CN Node of (72), wherein the at least one processor is further configured to: return an acknowledgment to the other entity indicating that the request for the periodic or triggered location was accepted; and wait until the UE becomes reachable from the CN node before sending the request for the periodic or triggered location for the UE to the first location server.

There may be some implementations (74) of the above-described CN Node of (72), wherein the CN node, the first location server, the other entity and the second location server are part of a Fifth Generation Core network (5GCN).

There may be some implementations (75) of the above-described CN Node of (74), wherein the CN node is an Access and Mobility Management Function (AMF), the first location server is a Location Management Function (LMF), the other entity is a Gateway Mobile Location Center (GMLC) and the second location server is an LMF.

There may be some implementations (76) of the above-described CN Node of (72), wherein the second location server comprises the first location server.

There may be some implementations (77) of the above-described CN Node of (72), wherein the at least one processor is further configured to: receive at least one of the plurality of periodic or triggered location events from the UE; and forward the at least one of the plurality of periodic or triggered location events to the second location server.

There may be some implementations (78) of the above-described CN Node of (77), wherein the at least one of the plurality of periodic or triggered location events indicates the second location server.

There may be some implementations (79) of the above-described CN Node of (77), wherein the at least one of the plurality of periodic or triggered location events does not indicate the second location server, and wherein the at least one processor is further configured to determine the second location server.

There may be some implementations (80) of the above-described CN Node of (72), wherein the request for the periodic or triggered location received from the other entity comprises a plurality of parameters and wherein the at least one processor is further configured to include at least some of the plurality of parameters in the request for the periodic or triggered location sent to the first location server.

There may be some implementations (81) of the above-described CN Node of (80), wherein the plurality of parameters comprises a contact address for the other entity, a location deferred request (LDR) reference number, an indication of the first location server, a type of location reporting, a location Quality of Service, a maximum duration, a maximum number of event reports, a request for location estimate inclusion in event reports, or some combination of these.

There may be some implementations (82) of the above-described CN Node of (80), wherein the plurality of parameters does not include an indication of the first location server, and wherein the at least one processor is further configured to determine the first location server.

One implementation (83) may be a core network (CN) node in a wireless network for supporting location services for a user equipment (UE) comprising: means for receiving a request for a periodic or triggered location for the UE from another entity; means for sending the request for the periodic or triggered location for the UE to a first location server in the wireless network, wherein the request for the periodic or triggered location is to be sent by the first location server to the UE and the UE is to confirm to the first location server an activation of the periodic or triggered location in the UE; means for receiving a confirmation from the first location server that the periodic or triggered location for the UE was activated in the UE; means for sending the confirmation to the other entity that the periodic or triggered location was activated in the UE; and means for releasing all resources for the request for periodic or triggered location, wherein the UE is to report a plurality of periodic or triggered location events to a second location server and the second location server is to report the plurality of periodic or triggered location events to the other entity.

There may be some implementations (84) of the above-described CN Node of (83), further comprising: means for returning an acknowledgment to the other entity indicating that the request for the periodic or triggered location was accepted; and means for waiting until the UE becomes reachable from the CN node before sending the request for the periodic or triggered location for the UE to the first location server.

There may be some implementations (85) of the above-described CN Node of (83), wherein the CN node, the first location server, the other entity and the second location server are part of a Fifth Generation Core network (5GCN).

There may be some implementations (86) of the above-described CN Node of (85), wherein the CN node is an Access and Mobility Management Function (AMF), the first location server is a Location Management Function (LMF), the other entity is a Gateway Mobile Location Center (GMLC) and the second location server is an LMF.

There may be some implementations (87) of the above-described CN Node of (83), wherein the second location server comprises the first location server.

There may be some implementations (88) of the above-described CN Node of (83), further comprising: means for receiving at least one of the plurality of periodic or triggered location events from the UE; and means for forwarding the at least one of the plurality of periodic or triggered location events to the second location server.

There may be some implementations (89) of the above-described CN Node of (88), wherein the at least one of the plurality of periodic or triggered location events indicates the second location server.

There may be some implementations (90) of the above-described CN Node of (88), wherein the at least one of the plurality of periodic or triggered location events does not indicate the second location server, and further comprising determining the second location server.

There may be some implementations (91) of the above-described CN Node of (83), wherein the request for the periodic or triggered location received from the other entity comprises a plurality of parameters and further comprising including at least some of the plurality of parameters in the request for the periodic or triggered location sent to the first location server.

There may be some implementations (92) of the above-described CN Node of (91), wherein the plurality of parameters comprises a contact address for the other entity, a location deferred request (LDR) reference number, an indication of the first location server, a type of location reporting, a location Quality of Service, a maximum duration, a maximum number of event reports, a request for location estimate inclusion in event reports, or some combination of these.

There may be some implementations (93) of the above-described CN Node of (91), wherein the plurality of parameters does not include an indication of the first location server, and further comprising determining the first location server.

One implementation (94) may be a non-transitory storage medium including program code stored thereon, the program code is operable to cause at least one processor in core network (CN) node in a wireless network to support location services for a user equipment (UE) comprising: program code to receive a request for a periodic or triggered location for the UE from another entity; program code to send the request for the periodic or triggered location for the UE to a first location server in the wireless network, wherein the request for the periodic or triggered location is to be sent by the first location server to the UE and the UE is to confirm to the first location server an activation of the periodic or triggered location in the UE; program code to receive a confirmation from the first location server that the periodic or triggered location for the UE was activated in the UE; program code to send the confirmation to the other entity that the periodic or triggered location was activated in the UE; and program code to release all resources for the request for periodic or triggered location, wherein the UE is to report a plurality of periodic or triggered location events to a second location server and the second location server is to report the plurality of periodic or triggered location events to the other entity.

There may be some implementations (95) of the above-described non-transitory storage medium of (94), further comprising: program code to return an acknowledgment to the other entity indicating that the request for the periodic or triggered location was accepted; and program code to wait until the UE becomes reachable from the CN node before sending the request for the periodic or triggered location for the UE to the first location server.

There may be some implementations (96) of the above-described non-transitory storage medium of (94), wherein the CN node, the first location server, the other entity and the second location server are part of a Fifth Generation Core network (5GCN).

There may be some implementations (97) of the above-described non-transitory storage medium of (96), wherein the CN node is an Access and Mobility Management Function (AMF), the first location server is a Location Management Function (LMF), the other entity is a Gateway Mobile Location Center (GMLC) and the second location server is an LMF.

There may be some implementations (98) of the above-described non-transitory storage medium of (94), wherein the second location server comprises the first location server.

There may be some implementations (99) of the above-described non-transitory storage medium of (94), further comprising: program code to receive at least one of the plurality of periodic or triggered location events from the UE; and program code to forward the at least one of the plurality of periodic or triggered location events to the second location server.

There may be some implementations (100) of the above-described non-transitory storage medium of (99), wherein the at least one of the plurality of periodic or triggered location events indicates the second location server.

There may be some implementations (101) of the above-described non-transitory storage medium of (99), wherein the at least one of the plurality of periodic or triggered location events does not indicate the second location server, and further comprising determining the second location server.

There may be some implementations (102) of the above-described non-transitory storage medium of (94), wherein the request for the periodic or triggered location received from the other entity comprises a plurality of parameters and further comprising including at least some of the plurality of parameters in the request for the periodic or triggered location sent to the first location server.

There may be some implementations (103) of the above-described non-transitory storage medium of (102), wherein the plurality of parameters comprises a contact address for the other entity, a location deferred request (LDR) reference number, an indication of the first location server, a type of location reporting, a location Quality of Service, a maximum duration, a maximum number of event reports, a request for location estimate inclusion in event reports, or some combination of these.

There may be some implementations (104) of the above-described non-transitory storage medium of (102), wherein the plurality of parameters does not include an indication of the first location server, and further comprising determining the first location server.

One implementation (105) may be a method for supporting location services for a user equipment (UE) performed by an entity in a wireless network, the method comprising: receiving a request for a periodic or triggered location for the UE from an external client; querying an other entity in the wireless network for an address of a core network (CN) node associated with the UE; sending the request for the periodic or triggered location for the UE to the CN node, wherein the request for the periodic or triggered location is to be sent by the CN node to a first location server, wherein the first location server is to send the request for the periodic or triggered location to the UE and the UE is to confirm an activation of the periodic or triggered location in the UE; receiving a confirmation from the CN node that the periodic or triggered location for the UE was activated in the UE; sending a confirmation to the external client that the periodic or triggered location was activated in the UE; receiving a plurality of periodic or triggered location event reports for the UE from a second location server, wherein each of the plurality of periodic or triggered location event reports comprises at least one of location measurements, a location estimate, a type of detected triggering event, or a combination thereof; and sending a plurality of corresponding periodic or triggered location event reports to the external client.

There may be some implementations (106) of the above-described method (105), further comprising: determining the first location server and including an address for the first location server in the request for the periodic or triggered location for the UE sent to the CN node.

There may be some implementations (107) of the above-described method (105), further comprising: receiving an acknowledgement from the CN node indicating that the request for the periodic or triggered location was accepted by the CN node; and sending the acknowledgement indicating that the request for the periodic or triggered location was accepted by the CN node to the external client.

There may be some implementations (108) of the above-described method (105), wherein the entity, the CN node, the first location server, the other entity and the second location server are each part of a Visited Fifth Generation Core network (5GCN) or a Home 5GCN.

There may be some implementations (109) of the above-described method (108), wherein the entity is a Gateway Mobile Location Center (GMLC), the CN node is an Access and Mobility Management Function (AMF), the first location server is a Location Management Function (LMF), the other entity is a Unified Data Management (UDM), and the second location server is an LMF.

There may be some implementations (110) of the above-described method (109), wherein the entity is a Home GMLC, wherein the request for the periodic or triggered location for the UE is sent to the CN node via a Visited GMLC.

There may be some implementations (111) of the above-described method (109), wherein the entity is a Home GMLC, wherein the plurality of periodic or triggered location event reports for the UE is received from the second location server via a Visited GMLC.

There may be some implementations (112) of the above-described method (105), wherein the second location server comprises the first location server.

There may be some implementations (113) of the above-described method (105), further comprising including a plurality of parameters in the request for the periodic or triggered location for the UE sent to the CN node, wherein the plurality of parameters comprises a contact address for the entity, a location deferred request (LDR) reference number, an indication of the first location server, a type of location reporting, a location Quality of Service, a maximum duration, a maximum number of event reports, a request for location estimate inclusion in event reports, or some combination of these.

One implementation (114) may be an entity in a wireless network for supporting location services for a user equipment (UE) comprising: an external interface for receiving and sending messages to entities in a network; at least one memory; and at least one processor coupled to the external interface and the at least one memory, the at least one processor configured to: receive a request for a periodic or triggered location for the UE from an external client; query an other entity in the wireless network for an address of a core network (CN) node associated with the UE; send the request for the periodic or triggered location for the UE to the CN node, wherein the request for the periodic or triggered location is to be sent by the CN node to a first location server to the UE and the UE is to confirm an activation of the periodic or triggered location in the UE; receive a confirmation from the CN node that the periodic or triggered location for the UE was activated in the UE; send a confirmation to the external client that the periodic or triggered location was activated in the UE; receive a plurality of periodic or triggered location event reports for the UE from a second location server, wherein each of the plurality of periodic or triggered location event reports comprises at least one of location measurements, a location estimate, a type of detected triggering event, or a combination thereof; and send a plurality of corresponding periodic or triggered location event reports to the external client.

There may be some implementations (115) of the above-described entity of (114), wherein the at least one processor is further configured to: determine the first location server and including an address for the first location server in the request for the periodic or triggered location for the UE sent to the CN node.

There may be some implementations (116) of the above-described entity of (114), wherein the at least one processor is further configured to: receive an acknowledgement from the CN node indicating that the request for the periodic or triggered location was accepted by the CN node; and send the acknowledgement indicating that the request for the periodic or triggered location was accepted by the CN node to the external client.

There may be some implementations (117) of the above-described entity of (114), wherein the entity, the CN node, the first location server, the other entity and the second location server are each part of a Visited Fifth Generation Core network (5GCN) or a Home 5GCN.

There may be some implementations (118) of the above-described entity of (117), wherein the entity is a Gateway Mobile Location Center (GMLC), the CN node is an Access and Mobility Management Function (AMF), the first location server is a Location Management Function (LMF), the other entity is a Unified Data Management (UDM), and the second location server is an LMF.

There may be some implementations (119) of the above-described entity of (118), wherein the entity is a Home GMLC, wherein the request for the periodic or triggered location for the UE is sent to the CN node via a Visited GMLC.

There may be some implementations (120) of the above-described entity of (118), wherein the entity is a Home GMLC, wherein the plurality of periodic or triggered location event reports for the UE is received from the second location server via a Visited GMLC.

There may be some implementations (121) of the above-described entity of (114), wherein the second location server comprises the first location server.

There may be some implementations (122) of the above-described entity of (114), wherein the request for the periodic or triggered location received from the external client comprises a plurality of parameters and wherein the at least one processor is further configured to include the plurality of parameters in the request for the periodic or triggered location sent to the CN node, wherein the plurality of parameters comprises a contact address for the entity, a location deferred request (LDR) reference number, an indication of the first location server, a type of location reporting, a location Quality of Service, a maximum duration, a maximum number of event reports, a request for location estimate inclusion in event reports, or some combination of these.

One implementation (123) may be an entity in a wireless network for supporting location services for a user equipment (UE) comprising: means for receiving a request for a periodic or triggered location for the UE from an external client; means for querying an other entity in the wireless network for an address of a core network (CN) node associated with the UE; means for sending the request for the periodic or triggered location for the UE to the CN node, wherein the request for the periodic or triggered location is to be sent by the CN node to a first location server, wherein the first location server is to send the request for the periodic or triggered location to the UE and the UE is to confirm an activation of the periodic or triggered location in the UE; means for receiving a confirmation from the CN node that the periodic or triggered location for the UE was activated in the UE; means for sending a confirmation to the external client that the periodic or triggered location was activated in the UE; means for receiving a plurality of periodic or triggered location event reports for the UE from a second location server, wherein each of the plurality of periodic or triggered location event reports comprises at least one of location measurements, a location estimate, a type of detected triggering event, or a combination thereof; and means for sending a plurality of corresponding periodic or triggered location event reports to the external client.

There may be some implementations (124) of the above-described entity of (123), further comprising: means for determining the first location server and including an address for the first location server in the request for the periodic or triggered location for the UE sent to the CN node.

There may be some implementations (125) of the above-described entity of (123), further comprising: means for receiving an acknowledgement from the CN node indicating that the request for the periodic or triggered location was accepted by the CN node; and means for sending the acknowledgement indicating that the request for the periodic or triggered location was accepted by the CN node to the external client.

There may be some implementations (126) of the above-described entity of (123), wherein the entity, the CN node, the first location server, the other entity and the second location server are each part of a Visited Fifth Generation Core network (5GCN) or a Home 5GCN.

There may be some implementations (127) of the above-described entity of (126), wherein the entity is a Gateway Mobile Location Center (GMLC), the CN node is an Access and Mobility Management Function (AMF), the first location server is a Location Management Function (LMF), the other entity is a Unified Data Management (UDM), and the second location server is an LMF.

There may be some implementations (128) of the above-described entity of (127), wherein the entity is a Home GMLC, wherein the request for the periodic or triggered location for the UE is sent to the CN node via a Visited GMLC.

There may be some implementations (129) of the above-described entity of (127), wherein the entity is a Home GMLC, wherein the plurality of periodic or triggered location event reports for the UE is received from the second location server via a Visited GMLC.

There may be some implementations (130) of the above-described entity of (123), wherein the second location server comprises the first location server.

There may be some implementations (131) of the above-described entity of (123), further comprising means for including a plurality of parameters in the request for the periodic or triggered location for the UE sent to the CN node, wherein the plurality of parameters comprises a contact address for the entity, a location deferred request (LDR) reference number, an indication of the first location server, a type of location reporting, a location Quality of Service, a maximum duration, a maximum number of event reports, a request for location estimate inclusion in event reports, or some combination of these.

One implementation (132) may be a non-transitory storage medium including program code stored thereon, the program code is operable to cause at least one processor in an entity in a wireless network to support location services for a user equipment (UE) comprising: program code to receive a request for a periodic or triggered location for the UE from an external client; program code to query an other entity in the wireless network for an address of a core network (CN) node associated with the UE; program code to send the request for the periodic or triggered location for the UE to the CN node, wherein the request for the periodic or triggered location is to be sent by the CN node to a first location server, wherein the first location server is to send the request for the periodic or triggered location to the UE and the UE is to confirm an activation of the periodic or triggered location in the UE; program code to receive a confirmation from the CN node that the periodic or triggered location for the UE was activated in the UE; program code to send a confirmation to the external client that the periodic or triggered location was activated in the UE; program code to receive a plurality of periodic or triggered location event reports for the UE from a second location server, wherein each of the plurality of periodic or triggered location event reports comprises at least one of location measurements, a location estimate, a type of detected triggering event, or a combination thereof; and program code to send a plurality of corresponding periodic or triggered location event reports to the external client.

There may be some implementations (133) of the above-described non-transitory storage medium of (132), further comprising: program code to determine the first location server and including an address for the first location server in the request for the periodic or triggered location for the UE sent to the CN node.

There may be some implementations (134) of the above-described non-transitory storage medium of (132), further comprising: program code to receive an acknowledgement from the CN node indicating that the request for the periodic or triggered location was accepted by the CN node; and program code to send the acknowledgement indicating that the request for the periodic or triggered location was accepted by the CN node to the external client.

There may be some implementations (135) of the above-described non-transitory storage medium of (132), wherein the entity, the CN node, the first location server, the other entity and the second location server are each part of a Visited Fifth Generation Core network (5GCN) or a Home 5GCN.

There may be some implementations (136) of the above-described non-transitory storage medium of (135), wherein the entity is a Gateway Mobile Location Center (GMLC), the CN node is an Access and Mobility Management Function (AMF), the first location server is a Location Management Function (LMF), the other entity is a Unified Data Management (UDM), and the second location server is an LMF.

There may be some implementations (137) of the above-described non-transitory storage medium of (136), wherein the entity is a Home GMLC, wherein the request for the periodic or triggered location for the UE is sent to the CN node via a Visited GMLC.

There may be some implementations (138) of the above-described non-transitory storage medium of (136), wherein the entity is a Home GMLC, wherein the plurality of periodic or triggered location event reports for the UE is received from the second location server via a Visited GMLC.

There may be some implementations (139) of the above-described non-transitory storage medium of (132), wherein the second location server comprises the first location server.

There may be some implementations (140) of the above-described non-transitory storage medium of (132), further comprising program code to include a plurality of parameters in the request for the periodic or triggered location for the UE sent to the CN node, wherein the plurality of parameters comprises a contact address for the entity, a location deferred request (LDR) reference number, an indication of the first location server, a type of location reporting, a location Quality of Service, a maximum duration, a maximum number of event reports, a request for location estimate inclusion in event reports, or some combination of these.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for supporting location services for a user equipment (UE) performed by the UE, the method comprising:
   receiving a request for a periodic or triggered location for the UE from a first location server in a wireless network, wherein the first location server received the request for the periodic or triggered location for the UE from a first Core Network (CN) node, wherein the first CN node received the request for the periodic or triggered location for the UE from another entity;
   sending a confirmation to the first location server that the periodic or triggered location was activated in the UE;
   detecting a plurality of trigger events; and
   sending, for each detected trigger event, a corresponding event report to a second location server, each corresponding event report comprising at least one of location measurements, a location estimate, a type of detected triggering event, or a combination thereof, wherein the second location server sends each corresponding event report to the other entity.

2. The method of claim 1, wherein the second location server is the first location server, wherein the request for the periodic or triggered location received from the first location server indicates sending of event reports to the first location server.

3. The method of claim 1, wherein the second location server is different to the first location server, wherein the request for the periodic or triggered location received from the first location server indicates sending of event reports to any location server.

4. The method of claim 3, wherein the request for the periodic or triggered location received from the first location server comprises a contact address for the other entity and a location deferred request (LDR) reference number, and further comprising including the contact address for the other entity and the LDR reference number in each event report sent to the second location server.

5. The method of claim 1, wherein the request for the periodic or triggered location for the UE is received from the first location server via the first CN node, wherein for at least some of the detected plurality of trigger events, a corresponding event report is sent to the second location server via a second CN node, wherein the second CN node is different to the first CN node.

6. The method of claim 1, wherein the first CN node, the first location server, the other entity and the second location server are part of a Fifth Generation Core network (5GCN).

7. The method of claim 6, wherein the first CN node is an Access and Mobility Management Function (AMF), the first location server is a Location Management Function (LMF), the other entity is a Gateway Location Mobile Center (GMLC) and the second location server is an LMF.

8. A user equipment (UE) for supporting location services for the UE, the UE comprising:
   at least one wireless transceiver configured to wirelessly communicate with at least one wireless network;
   at least one memory; and
   at least one processor coupled to the at least one wireless transceiver and the at least one memory, the at least one processor configured to:
   receive a request for a periodic or triggered location for the UE from a first location server in the wireless network, wherein the first location server received the request for the periodic or triggered location for the UE from a first Core Network (CN) node, wherein the first CN node received the request for the periodic or triggered location for the UE from another entity;
   send a confirmation to the first location server that the periodic or triggered location was activated in the UE;
   detect a plurality of trigger events; and
   send, for each detected trigger event, a corresponding event report to a second location server, each corresponding event report comprising at least one of location measurements, a location estimate, a type of detected triggering event, or a combination thereof, wherein the second location server sends each corresponding event report to the other entity.

9. The UE of claim 8, wherein the second location server is the first location server, wherein the request for the periodic or triggered location received from the first location server indicates sending of event reports to the first location server.

10. The UE of claim 8, wherein the second location server is different to the first location server, wherein the request for the periodic or triggered location received from the first location server indicates sending of event reports to any location server.

11. The UE of claim 10, wherein the request for the periodic or triggered location received from the first location server comprises a contact address for the other entity and a location deferred request (LDR) reference number, and wherein the at least one processor is further configured to include the contact address for the other entity and the LDR reference number in each event report sent to the second location server.

12. The UE of claim 8, wherein the request for the periodic or triggered location for the UE is received from the first location server via the first CN node, wherein for at least some of the detected plurality of trigger events, a corresponding event report is sent to the second location server via a second CN node, wherein the second CN node is different to the first CN node.

13. The UE of claim 8, wherein the first CN node, the first location server, the other entity and the second location server are part of a Fifth Generation Core network (5GCN).

14. The UE of claim 13, wherein the first CN node is an Access and Mobility Management Function (AMF), the first location server is a Location Management Function (LMF), the other entity is a Gateway Location Mobile Center (GMLC) and the second location server is an LMF.

15. A user equipment (UE) for supporting location services for the UE, the UE comprising:
means for receiving a request for a periodic or triggered location for the UE from a first location server in a wireless network, wherein the first location server received the request for the periodic or triggered location for the UE from a first Core Network (CN) node, wherein the first CN node received the request for the periodic or triggered location for the UE from another entity;
means for sending a confirmation to the first location server that the periodic or triggered location was activated in the UE;
means for detecting a plurality of trigger events; and
means for sending, for each detected trigger event, a corresponding event report to a second location server, each corresponding event report comprising at least one of location measurements, a location estimate, a type of detected triggering event, or a combination thereof, wherein the second location server sends each corresponding event report to the other entity.

16. The UE of claim 15, wherein the second location server is the first location server, wherein the request for the periodic or triggered location received from the first location server indicates sending of event reports to the first location server.

17. The UE of claim 15, wherein the second location server is different to the first location server, wherein the request for the periodic or triggered location received from the first location server indicates sending of event reports to any location server.

18. The UE of claim 17, wherein the request for the periodic or triggered location received from the first location server comprises a contact address for the other entity and a location deferred request (LDR) reference number, and further comprising including the contact address for the other entity and the LDR reference number in each event report sent to the second location server.

19. The UE of claim 15, wherein the request for the periodic or triggered location for the UE is received from the first location server via the first CN node, wherein for at least some of the detected plurality of trigger events, a corresponding event report is sent to the second location server via a second CN node, wherein the second CN node is different to the first CN node.

20. The UE of claim 15, wherein the first CN node, the first location server, the other entity and the second location server are part of a Fifth Generation Core network (5GCN).

21. The UE of claim 20, wherein the first CN node is an Access and Mobility Management Function (AMF), the first location server is a Location Management Function (LMF), the other entity is a Gateway Location Mobile Center (GMLC) and the second location server is an LMF.

22. A non-transitory storage medium including program code stored thereon, the program code is operable to cause at least one processor in a user equipment (UE) to support location services for the UE comprising:
program code to receive a request for a periodic or triggered location for the UE from a first location server in a wireless network, wherein the first location server received the request for the periodic or triggered location for the UE from a first Core Network (CN) node, wherein the first CN node received the request for the periodic or triggered location for the UE from another entity;
program code to send a confirmation to the first location server that the periodic or triggered location was activated in the UE;
program code to detect a plurality of trigger events; and
program code to send, for each detected trigger event, a corresponding event report to a second location server, each corresponding event report comprising at least one of location measurements, a location estimate, a type of detected triggering event, or a combination thereof, wherein the second location server sends each corresponding event report to the other entity.

23. The non-transitory storage medium of claim 22, wherein the second location server is the first location server, wherein the request for the periodic or triggered location received from the first location server indicates sending of event reports to the first location server.

24. The non-transitory storage medium of claim 22, wherein the second location server is different to the first location server, wherein the request for the periodic or triggered location received from the first location server indicates sending of event reports to any location server.

25. The non-transitory storage medium of claim 24, wherein the request for the periodic or triggered location received from the first location server comprises a contact address for the other entity and a location deferred request (LDR) reference number, and further comprising including the contact address for the other entity and the LDR reference number in each event report sent to the second location server.

26. The non-transitory storage medium of claim 22, wherein the request for the periodic or triggered location for the UE is received from the first location server via the first CN node, wherein for at least some of the detected plurality of trigger events, a corresponding event report is sent to the second location server via a second CN node, wherein the second CN node is different to the first CN node.

27. The non-transitory storage medium of claim 22, wherein the first CN node, the first location server, the other entity and the second location server are part of a Fifth Generation Core network (5GCN).

28. The non-transitory storage medium of claim 27, wherein the first CN node is an Access and Mobility Management Function (AMF), the first location server is a Location Management Function (LMF), the other entity is a Gateway Location Mobile Center (GMLC) and the second location server is an LMF.

\* \* \* \* \*